United States Patent
Xie et al.

(10) Patent No.: US 12,044,562 B2
(45) Date of Patent: Jul. 23, 2024

(54) MULTIPHASE FLOWMETER AND RELATED METHODS

(71) Applicant: Schlumberger Technology Corporation, Sugar Land, TX (US)

(72) Inventors: Cheng-Gang Xie, Singapore (SG);
Jianhua Zhu, Singapore (SG);
Guillaume Jolivet, Singapore (SG)

(73) Assignee: Schlumberger Technology Corporation, Sugar Land, TX (US)

( * ) Notice: Subject to any disclaimer, the term of this patent is extended or adjusted under 35 U.S.C. 154(b) by 257 days.

(21) Appl. No.: 17/359,702

(22) Filed: Jun. 28, 2021

(65) Prior Publication Data
US 2021/0404849 A1 Dec. 30, 2021

Related U.S. Application Data

(60) Provisional application No. 62/705,426, filed on Jun. 26, 2020.

(51) Int. Cl.
*G01F 1/74* (2006.01)
*G01F 1/44* (2006.01)
*G01F 1/88* (2006.01)

(52) U.S. Cl.
CPC .................. *G01F 1/74* (2013.01); *G01F 1/44* (2013.01); *G01F 1/88* (2013.01)

(58) Field of Classification Search
CPC ..... G01F 1/74; G01F 1/00; G01F 1/44; G01F 1/34; G01F 1/88; G01F 1/86; G01F 1/76; G01F 15/06
See application file for complete search history.

(56) References Cited

U.S. PATENT DOCUMENTS 5,051,922 A 9/1991 Toral et al.
7,617,055 B2 11/2009 Henry et al.
(Continued)

FOREIGN PATENT DOCUMENTS

WO 2016003985 A1 1/2016

OTHER PUBLICATIONS

Andrianov, N., "A Machine Learning Approach for Virtual Flow Metering and Forecasting", Proceedings of the 3rd IFAC Workshop on Automatic Control in Offshore Oil and Gas Production, Esbjerg, Denmark, May 30-Jun. 1, 2018, 15 pages.
Bikmukhametov, T. et al., "First Principles and Machine Learning Virtual Flow Metering: A Literature Review", Journal of Petroleum Science Engineering, 2020, 184, 26 pages.
Hosgor, F. B. et al., "Multiphase Flow Metering—A Case Study from Badra Oil Field", SPE-191532, presented at the SPE Russian Petroleum Technology Conference, Moscow, Russia, Oct. 2018, 14 pages.
(Continued)

*Primary Examiner* — Mohamed Charioui
(74) *Attorney, Agent, or Firm* — Trevor G. Grove

(57) ABSTRACT

Multiphase flowmeters and related methods are disclosed herein. An example multiphase flowmeter includes a microwave transmitter to transmit a signal through a fluid, a microwave receiver to determine at least one of attenuation or phase shift, a sensor to obtain at least one of pressure, temperature, or differential pressure, an intermediate-output generator to determine intermediate flow parameters, and a flow rate generator to determine a flow rate for respective phases in the fluid, and a model selector to select at least one of a physics model or a machine learning model for determining the intermediate flow parameters or the flow rates, the physics model to determine a first value of the intermediate flow parameters or the flow rates, and, in response to an error not being less than a threshold, the machine learning model to determine a second value of the intermediate flow parameters or the flow rates.

20 Claims, 19 Drawing Sheets

(56) References Cited

U.S. PATENT DOCUMENTS

| | | | |
|---|---|---|---|
| 7,908,930 B2 | 3/2011 | Xie et al. | |
| 8,536,883 B2 | 9/2013 | Xie et al. | |
| 9,927,270 B2 | 3/2018 | Xie | |
| 2007/0006640 A1* | 1/2007 | Gysling | G01F 15/08 |
| | | | 73/861.04 |
| 2007/0124091 A1* | 5/2007 | Wee | G01F 1/74 |
| | | | 702/49 |
| 2007/0157737 A1* | 7/2007 | Gysling | G01F 15/005 |
| | | | 73/861.23 |
| 2016/0076926 A1* | 3/2016 | McCann | G01F 1/60 |
| | | | 73/861.04 |

OTHER PUBLICATIONS

Omrani, P. et al., "Improving the Accuracy of Virtual Flow Metering and Back-Allocation through Machine Learning", SPE-192819-MS, presented at the Abu Dhabi International Petroleum Exhibition Conference, Abu Dhabi, UAE, Nov. 2018, 15 pages.

Toral, H. et al., "In-Situ Validation of ESMER MPFMs", presented at the 34th International North Sea Flow Measurement Workshop, St Andrews, 2016, 20 pages.

Xie C-G: "Measurement of Multiphase Flow Water Fraction and Water Cut", AIP Conference Proceedings, 2007, 914, presented at the 5th International Symposium on Measurement Techniques for Multiphase Flows, Macau, China, Dec. 2006, pp. 232-239.

\* cited by examiner

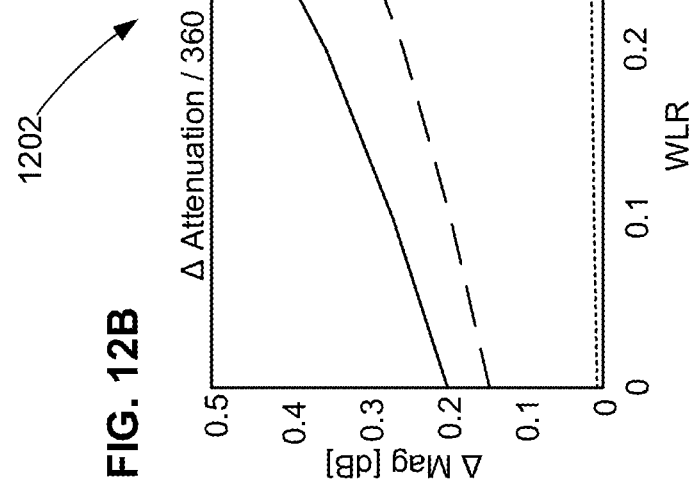
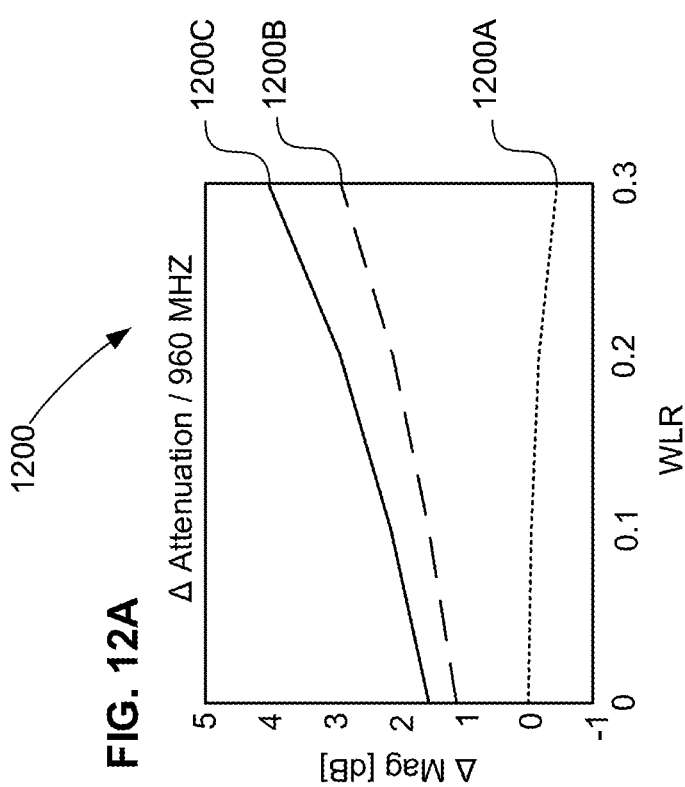

Recommended (upper) limits of RF electronics high operating frequency $F_2$ (for oil-continuous flows) and low operating frequency $F_1$ (for water-continuous flows)

| Venturi throat diameter $D_T$ | High frequency [a] $F_2$ | Low frequency [b] $F_1$ |
|---|---|---|
| 56 mm | < 740 MHz | < 350 MHz |
| 40 mm | < 1000 MHz | < 490 MHz |
| 29 mm | 1400 MHz | 680 MHz |
| 19 mm | 2200 MHz | 1000 MHz |

[a] Calculated based on phase-inversion $WLR_c = 70\%$. [b] Calculated based on $WLR = 100\%$.

FIG. 14

Transmitter-receiver arc-separation and its ratio to wavelength in pure water, indicating an estimate of phase wrapping at 800 MHz frequency.

| Receiver angle $\theta$ (degree) | Transmitter-Receiver arc length $L_\theta$ | $L_\theta$ (for 4"ID) (cm) | $L_\theta/\lambda_w$ ratio (for 4"ID) ($\lambda_w$=4.2cm) |
|---|---|---|---|
| 30 | $\pi R/6$ | 2.66 | 0.64 |
| 60 | $\pi R/3$ | 5.32 | 1.28 |
| 90 | $\pi R/2$ | 7.98 | 1.91 |
| 120 | $2\pi R/3$ | 10.63 | 2.55 |
| 150 | $5\pi R/6$ | 13.29 | 3.19 |
| 180 | $\pi R$ | 15.95 | 3.83 |

FIG. 15

MULTIPHASE FLOWMETER AND RELATED METHODS

This application claims priority to and the benefit of U.S. Provisional Application No. 62/705,426, filed on Jun. 26, 2020, the entirety of which is incorporated herein by reference. This disclosure relates generally to flowmeters and, more particularly, to machine-learning multiphase flowmeters and related methods.

BACKGROUND

Description of the Related Art

Hydrocarbons are widely used as a primary source of energy and have a great impact on the world economy. Consequently, the efficient production of hydrocarbon resources is increasingly noteworthy. During typical operations, a borehole is drilled into the earth, whether on land or below the sea, to reach a reservoir containing hydrocarbons. Such hydrocarbons are typically in the form of a multiphase fluid containing oil, gas, water, or mixtures thereof that may be brought to the surface through the borehole in a production pipeline. In some instances, multiphase flowmeters are installed on production pipelines, at surface or subsea, to monitor the flow rates and additional flow parameters associated with respective phases in the multiphase fluid.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Example 1 includes a multiphase flowmeter to determine flow parameters of a fluid. The multiphase flowmeter of Example 1 includes a microwave transmitter to transmit a signal through a fluid, a microwave receiver to, in response to receiving the signal, determine at least one of attenuation data or phase shift data based on the signal, a sensor to obtain at least one of pressure data, temperature data, or differential pressure data associated with the fluid, an intermediate-output generator to determine intermediate flow parameters based on at least one of the attenuation data, the phase shift data, the pressure data, the temperature data, or the differential pressure data, the intermediate flow parameters including at least one of a water liquid ratio, a gas volume fraction, a gas holdup, a permittivity, a conductivity, a viscosity, a salinity, or a density associated with the fluid, a flow rate generator to determine a flow rate for respective phases in the fluid based on at least one of the attenuation data, the phase shift data, the pressure data, the temperature data, the differential pressure data, or the intermediate flow parameters, and a model selector to select at least one of a physics model or a machine learning model for determining at least one of the intermediate flow parameters or the flow rates, the model selector to invoke the physics model to determine a first value of at least one of intermediate flow parameters or the one or more flow rates, and, in response to an error corresponding to the first value not being less than a threshold, invoke the machine learning model to determine a second value of the intermediate flow parameters or the one or more flow rates.

Example 2 includes the multiphase flowmeter of Example 1, where the threshold is a first threshold, and further includes a frequency selector for selecting the frequency of the signal transmitted between the microwave transmitter and the microwave receiver, the frequency selector to compare unwrapped phase shift data to a second threshold, determine whether the fluid is water-continuous or oil-continuous based on whether the unwrapped phase shift data satisfies the second threshold, in response to determining that the fluid is water-continuous, select one or more first frequencies of the signal, and, in response to determining that the fluid is oil-continuous, select one or more second frequencies of the signal, the one or more second frequencies greater than the one or more first frequencies, the signal to be generated based on the one or more first frequencies or the one or more second frequencies.

Example 3 includes the multiphase flowmeter of Example 2, where the microwave transmitter is coupled to a pipe at a first position of a first cross-section of the pipe, the pipe including the fluid, the fluid to flow through the pipe, and the microwave receiver is coupled to the pipe at a second position at the first cross-section of the pipe.

Example 4 includes the multiphase flowmeter of Example 3, where the microwave receiver is a first microwave receiver, and further includes one or more second microwave receivers coupled to the pipe at the first cross-section at respective distances away from the microwave transmitter, the one or more second microwave receivers to measure second attenuation data and second phase shift data.

Example 5 includes the multiphase flowmeter of Example 4, where the microwave transmitter is a first microwave transmitter, and further includes a second microwave transmitter coupled to the pipe at a first position of a second cross-section of the pipe, and one or more third microwave receivers coupled to the pipe at respective second positions of the second cross-section of the pipe, the second positions at respective distances away from the second microwave transmitter, the one or more third microwave receivers to measure third attenuation data and third phase shift data.

Example 6 includes the multiphase flowmeter of Example 5, and further includes a microwave reflection sensor coupled to the pipe at a third cross-section downstream or upstream from the first cross-section and the second cross-section, the microwave reflection sensor to measure fourth attenuation data and fourth phase shift data based on the fluid proximate a wall of the pipe, the intermediate-output generator to determine at least one of the permittivity, the conductivity of the fluid proximate the wall of the pipe, the salinity, or the water liquid ratio associated with the fluid flowing through the pipe based on the fourth attenuation data and the fourth phase shift data.

Example 7 includes the multiphase flowmeter of Example 6, where the sensor is a Venturi meter coupled to the pipe upstream relative to the microwave transmitter and the microwave receiver, the Venturi meter coupled to the pipe between a fourth cross-section of the pipe and a fifth cross-section of the pipe downstream from the fourth cross-section, a diameter of the fourth cross-section larger than a diameter of the fifth cross-section, the diameter of the fifth cross-section equal to the diameter of the first cross-section and the second cross-section, and the Venturi meter to measure at least one of the differential pressure between the fourth cross-section and the fifth cross-section.

Example 8 includes the multiphase flowmeter of Example 5, further including a velocity calculator to calculate a velocity of the fluid flowing through the pipe based on cross correlation of combined attenuation data or combined unwrapped phase shift data, the combined attenuation data or the combined unwrapped phase shift data to include at least one of the attenuation data and the phase shift data from the first microwave receiver, the second attenuation data and the second phase shift data from the one or more second microwave receivers, or the third attenuation data and the third phase shift data from the one or more third microwave receivers.

Example 9 includes the multiphase flowmeter of Example 8, where the machine learning model is a neural network, and further includes a machine learning controller to train the neural network using a first portion of an input feature dataset by adjusting weights associated with the neural network to produce an output pattern, the output pattern to mathematically correlate the input data from the first portion of the input feature dataset to respective reference output intermediate flow parameters from the first portion of the input feature dataset, the input data to include at least one of the combined attenuation data, the combined unwrapped phase shift data, the temperature data, the pressure data, the differential pressure data, the permittivity, the conductivity, the viscosity, or the density, the output intermediate flow parameters to include at least one of the water liquid ratio, the gas volume fraction, the gas holdup, or the salinity, and validate the neural network based on the input data from a second portion of the input feature dataset as inputs to the trained neural network, the validating including predicting the output intermediate flow parameters using the trained neural network, calculating an error between predicted output intermediate flow parameters and the reference intermediate flow parameters from the second portion of the input feature dataset, and accepting the trained neural network in response to the error being less than a third threshold.

Example 10 includes the multiphase flowmeter of Example 9, where the fluid is from a first fluid flow, and where the input feature dataset includes data from at least one of the physics model, a second multiphase flowmeter coupled to a second fluid flow that has a substantially same phase mass flowrate as the first fluid, or a gamma ray multiphase flowmeter coupled to the first fluid flow or the second fluid flow, the gamma ray multiphase flowmeter including a gamma ray sensor.

Example 11 includes the multiphase flowmeter of Example 5, where the machine learning model is a neural network, and further includes a data processor to unwrap baseline phase shift data, the baseline phase shift data based on a second signal received by a near receiver, the second signal having a lower of the one or more first frequencies, the near receiver being one of the first microwave receiver or one of the one or more second microwave receivers at a smallest distance from the first microwave transmitter, further unwrap, based on the unwrapped baseline phase shift data, water-continuous fluid phase shift data, the water-continuous fluid phase shift data based on a third signal received by a far receiver, the third signal having a higher of the one or more first frequencies, the far receiver being a second one of the first microwave receiver or one of the one or more second microwave receivers at a far distance from the first microwave transmitter larger than the smallest distance, unwrapped water-continuous fluid phase shift data greater than the unwrapped baseline phase shift data, and train the neural network using a first portion of an input feature dataset by adjusting weights associated with the neural network to produce an output pattern, the output pattern to mathematically correlate reference wrapped phase shift data from the first portion of the input feature dataset to respective reference unwrapped phase shift data from the first portion of the input feature dataset, the reference wrapped phase shift data to include at least one of the baseline phase shift data or the water-continuous fluid phase shift data, the reference unwrapped phase shift data to include at least one of the unwrapped baseline phase shift data or the unwrapped water-continuous fluid phase shift data, and validate the neural network based on a second portion of the input feature dataset as inputs to the trained neural network, the validating including predicting unwrapped phase shift data using the trained neural network, calculating an error between predicted unwrapped phase shift data and the reference unwrapped phase shift data from the second portion of the reference dataset, and accepting the trained neural network in response to the error being less than a third threshold.

Example 12 includes the multiphase flowmeter of Example 1, where the threshold is a first threshold, the machine learning model is a neural network, and further includes a machine learning controller to train the neural network using a first portion of an input feature dataset by adjusting weights associated with the neural network to produce an output pattern, the output pattern to mathematically correlate reference intermediate flow parameters to respective reference flow rates of the first portion of the input feature dataset, and validate the neural network based on reference intermediate flow parameters from a second portion of the input feature dataset as inputs to the trained neural network, the validating including predicting flow rates using the trained neural network, calculating an error between predicted flow rates and the reference flow rates of the second portion of the input feature dataset, and accepting the trained neural network in response to the error being less than a second threshold.

Example 13 includes a method to determine fluid flow parameters from a multiphase flow. The method of Example 13 includes transmitting a signal through a fluid flow using a microwave transmitter, in response to receiving the signal at a microwave receiver, determining at least one of attenuation data or phase shift data based on the signal, obtaining at least one of pressure data, temperature data, or differential pressure data associated with the fluid, determining intermediate flow parameters based on at least one of the attenuation data, the phase shift data, the pressure data, the temperature data, or the differential pressure data, the intermediate flow parameters including at least one of a water liquid ratio, a gas volume fraction, a gas holdup, a permittivity, a conductivity, a viscosity, a salinity, or a density associated with the fluid, determining a flow rate for respective phases in the fluid based on at least one of the attenuation data, the phase shift data, the pressure data, the temperature data, the differential pressure data, or the intermediate flow parameters, and selecting at least one of a physics model or a machine learning model for determining at least one of the intermediate flow parameters or the flow rates by invoking the physics model to determine a first value of at least one of the intermediate flow parameters or the one or more flow rates, and, in response to the first value not satisfying an error being less than a threshold, invoking the machine learning model to determine a second value of the intermediate flow parameters or the one or more flow rates.

Example 14 includes the method of Example 13, where the threshold is a first threshold, and further includes unwrapping the phase shift data, comparing the unwrapped phase shift data to a second threshold, determining whether the fluid is water-continuous or oil-continuous based on whether the unwrapped phase shift data satisfies the second threshold, in response to determining that the fluid is water-continuous, selecting one or more first frequencies of the signal and, in response to determining that the fluid is oil-continuous, selecting one or more second frequencies of the signal, the second one or more frequencies greater than the first one or more frequencies, the signal to be generated based on the one or more first frequencies or the one or more second frequencies.

Example 15 includes the method of Example 14, where the microwave transmitter is coupled to a pipe at a first position at a first cross-section of a pipe, the pipe including the fluid, the fluid to flow through the pipe, and the microwave receiver is coupled to a second position at the first cross-section of the pipe.

Example 16 includes the method of Example 15, where the microwave receiver is a first microwave receiver, and one or more second microwave receivers are coupled to the pipe at the first cross-section at respective distances away from the microwave transmitter, the one or more second microwave receivers to measure second attenuation data and second phase shift data.

Example 17 includes the method of Example 16, where the microwave transmitter is a first microwave transmitter, and a second microwave transmitter is coupled to the pipe at a first position of a second cross-section of the pipe, and one or more third microwave receivers are coupled to the pipe at respective second positions of a second cross-section of the pipe, the second positions at respective distances away from the second microwave transmitter, the one or more third microwave receivers to measure third attenuation data and third phase shift data.

Example 18 includes the method of Example 17, where a microwave reflection sensor is coupled to a third cross-section of the pipe downstream or upstream from the first cross-section and the second cross-section, the microwave reflection sensor to measure fourth attenuation data and fourth phase shift data based on fluid proximate a wall of the pipe, at least one of the salinity or the water liquid ratio to be determined based on the fourth attenuation data and the fourth phase shift data.

Example 19 includes the method of Example 17, and further includes calculating a velocity of the fluid flowing through the pipe based on cross correlation of combined attenuation data or combined unwrapped phase shift data, the combined attenuation data or the combined unwrapped phase shift data to include at least one of the attenuation data and the phase shift data from the first microwave receiver, the second attenuation data and the second phase shift data from the one or more second microwave receivers, or the third attenuation data and the third phase shift data from the one or more third microwave receivers.

Example 20 includes the method of Example 18, where a Venturi meter is coupled to a pipe upstream relative to the microwave transmitter and the microwave receiver, the Venturi meter coupled to the pipe between a fourth cross-section of the pipe and a fifth cross-section of the pipe downstream from the fourth cross-section, a first diameter of the fourth cross-section larger than a second diameter of the fifth cross-section, the diameter of the fifth cross-section equal to the diameter of the first cross-section and the second cross-section, and the Venturi meter to measure the differential pressure between the fourth cross-section and the fifth cross-section.

Example 21 includes the method of Example 19, where the machine learning model is a neural network, and further includes training the neural network using a first portion of an input feature dataset by adjusting weights associated with the neural network to produce an output pattern, the output pattern to mathematically correlate input data from the first portion of the input feature dataset to respective reference output intermediate flow parameters from the first portion of the input feature dataset, the input data to include at least one of the combined attenuation data, the combined unwrapped phase shift data, the temperature data, the pressure data, the differential pressure data, the permittivity, the conductivity, the viscosity, or the density, the output intermediate flow parameters to include at least one of the water liquid ratio, the gas volume fraction, the gas holdup, or the salinity, and validating the neural network based on the input data from a second portion of the input feature dataset as inputs to the trained neural network, the validating including predicting intermediate flow parameters using the trained neural network, calculating an error between the predicted intermediate flow parameters and the reference output intermediate flow parameters from the second portion of the input feature dataset, and accepting the trained neural network in response to the error being less than a third threshold.

Example 22 includes the method of Example 21, where the fluid is from a first fluid flow, where the input feature dataset includes data from at least one of the physics model, a second multiphase flowmeter coupled to a second fluid flow that has a substantially same phase mass flowrate as the first fluid, or a gamma ray multiphase flowmeter coupled to the first fluid flow or the second fluid flow, the gamma ray multiphase flowmeter including a gamma ray sensor.

Example 23 includes the method of Example 14, and further includes unwrapping reference phase shift data at the lower of the one or more first frequencies and for the microwave receiver with a smallest spacing from the microwave transmitter, further unwrapping, based on the above reference phase shift data, water-continuous fluid phase shift data at the higher of the one or more first frequencies, for the microwave receiver with the same or a larger spacing from the microwave transmitter, by ensuring that the unwrapped phase shift data at a higher first frequency or a larger transmitter-receiver spacing be more than the unwrapped phase shift data at a lower first frequency or a smaller transmitter-receiver spacing, and training and validating a machine learning neural network model to unwrap the phase shift data.

Example 24 includes the method of Example 14, where the machine learning model is a neural network, and further includes training the neural network using a first portion of an input feature dataset by adjusting weights associated with the neural network to produce an output pattern, the output pattern to correlate reference intermediate flow parameters to respective reference flow rates of the first portion of the input feature dataset, and validating the neural network based on reference intermediate flow parameters from a second portion of the input feature dataset as inputs to the trained neural network, the validating including predicting flow rates using the trained neural network, calculating an error between the predicted flow rates and the reference flow rates of the second portion of the input feature dataset, and accepting the trained neural network in response to the error being less than a third threshold.

Example 25 includes a non-transitory computer readable storage medium for determining fluid flow parameters. The non-transitory computer readable storage medium of Example 25 includes instructions that, when executed, cause a machine to at least transmit a signal through a fluid flow using a microwave transmitter, in response to receiving the signal at a microwave receiver, determine at least one of attenuation data or phase shift data based on the signal, obtain at least one of pressure data, temperature data, or differential pressure data associated with the fluid, determine intermediate flow parameters based on at least one of the attenuation data, the phase shift data, the pressure data, the temperature data, or the differential pressure data, the intermediate flow parameters including at least one of a water liquid ratio, a gas volume fraction, a gas holdup, a permittivity, a conductivity, a viscosity, a salinity, or a density associated with the fluid, determine a flow rate for respective phases in the fluid based on at least one of the attenuation data, the phase shift data, the pressure data, the temperature data, the differential pressure data, or the intermediate flow parameters, and select at least one of a physics model or a machine learning model for determining at least one of the intermediate flow parameters or the flow rates by invoking the physics model to determine a first value of at least one of the intermediate flow parameters or the one or more flow rates, and, in response to the first value not satisfying an error being less than a threshold, invoking the machine learning model to determine a second value of the intermediate flow parameters or the one or more flow rates.

Example 26 includes the non-transitory computer readable storage medium of Example 25, where the threshold is a first threshold, and the instructions, when executed, cause the machine to unwrap the phase shift data, compare the unwrapped phase shift data to a second threshold, determine whether the fluid is water-continuous or oil-continuous based on whether the phase shift data satisfies the second threshold, in response to determining that the fluid is water-continuous, select one or more a first frequency of the signal, and, in response to determining that the fluid is oil-continuous, select one or more a second frequency of the signal, the second frequency greater than the first frequency, the signal to be generated based on the first frequency or the second frequency.

Example 27 includes the non-transitory computer readable storage medium of Example 26, where the microwave transmitter is coupled to a pipe at a first position at a first cross-section of a pipe, the pipe including the fluid, the fluid to flow through the pipe, the microwave receiver is coupled to a second position at the first cross-section of the pipe, and the instructions, when executed, cause the machine to determine at least one of attenuation data or phase shift data based on the signal received at the microwave receiver.

Example 28 includes the non-transitory computer readable storage medium of Example 27, where the microwave receiver is a first microwave receiver and one or more second microwave receivers are coupled to the pipe at the cross-section at respective distances away from the microwave transmitter, and the instructions, when executed, cause the machine to determine second attenuation data and second phase shift data from the signal received at the one or more second microwave receivers.

Example 29 includes the non-transitory computer readable storage medium of Example 28, where the microwave transmitter is a first microwave transmitter, and a second microwave transmitter is coupled to the pipe at a first position of a second cross-section of the pipe, and one or more third microwave receivers are coupled to the pipe at respective second positions of a second cross-section of the pipe, the second positions at respective distances away from the second microwave transmitter, and the instructions, when executed, cause the machine to determine third attenuation data and third phase shift data from the signal received at the one or more third microwave receivers.

Example 30 includes the non-transitory computer readable storage medium of Example 29, where a microwave reflection sensor is coupled to a third cross-section of the pipe downstream or upstream from the first cross-section and the second cross-section, the microwave reflection sensor to measure fourth attenuation data and fourth phase shift data based on fluid proximate a wall of the pipe, and the instructions, when executed, to determine at least one of the salinity or the water liquid ratio based on the fourth attenuation data and the fourth phase shift data.

Example 31 includes the non-transitory computer readable storage medium of Example 30, where a Venturi meter coupled to the pipe upstream relative to the microwave transmitter and the microwave receiver, the Venturi meter coupled to the pipe between a fourth cross-section of the pipe and a fifth cross-section of the pipe downstream from the fourth cross-section, a first diameter of the fourth cross-section larger than a second diameter of the fifth cross-section, the diameter of the fifth cross-section equal to the diameter of the first cross-section and the second cross-section, and the instructions, when executed, cause the machine to obtain from the Venturi meter the differential pressure data between the fourth cross-section and the fifth cross-section.

Example 32 includes the non-transitory computer readable storage medium of Example 29, wherein the instructions, when executed, cause the machine to calculate a velocity of the fluid flowing through the pipe based on cross correlation of combined attenuation data or combined unwrapped phase shift data, the combined attenuation data or the combined unwrapped phase shift data to include at least one of the attenuation data and the phase shift data from the first microwave receiver, the second attenuation data and the second phase shift data from the one or more second microwave receivers, or the third attenuation data and the third phase shift data from the one or more third microwave receivers.

Example 33 includes the non-transitory computer readable storage medium of Example 32, where the machine learning model is a neural network model, and where the instructions, when executed, cause the machine to train the neural network using a first portion of an input feature dataset by adjusting weights associated with the neural network to produce an output pattern, the output pattern to mathematically correlate input data from the first portion of the input feature dataset to respective reference output intermediate flow parameters from the first portion of the input feature dataset, the input data to include at least one of the combined attenuation data, the combined unwrapped phase shift data, the temperature data, the pressure data, the differential pressure data, the permittivity, the conductivity, the viscosity, or the density, the output intermediate flow parameters to include at least one of the water liquid ratio, the gas volume fraction, the gas holdup, or the salinity, and validate the neural network based on the input data from a second portion of the input feature dataset as inputs to the trained neural network, including causing the machine to predict intermediate flow parameters using the trained neural network, calculate an error between the predicted intermediate flow parameters and the reference output intermediate flow parameters of the second portion of the reference dataset, and accept the trained neural network in response to the error being less than a third threshold.

Example 34 includes the non-transitory computer readable storage medium of Example 33, where the fluid is from a first fluid flow, where the input feature dataset includes data from at least one of the physics model, a second multiphase flowmeter coupled to a second fluid flow that has a substantially same phase mass flowrate as the first fluid, or a gamma ray multiphase flowmeter coupled to the first fluid flow or the second fluid flow, the gamma ray multiphase flowmeter including a gamma ray sensor.

Example 35 includes the non-transitory computer readable storage medium of Example 26, wherein the instructions, when executed, cause the machine to unwrap reference phase shift data at the lower of the one or more first frequencies and for the microwave receiver with the smallest spacing from the microwave transmitter, further unwrap water-continuous fluid phase shift data at the higher of the one or more first frequency, for the microwave receiver with the same or a larger spacing from the microwave transmitter, by ensuring that the unwrapped phase shift data at a higher first frequency or a larger transmitter-receiver spacing be more than the unwrapped phase shift data at a lower first frequency or a smaller transmitter-receiver spacing and train and validate a machine learning neural network model for unwrapping of the phase shift data.

Example 36 includes the non-transitory computer readable storage medium of Example 25, where the threshold is a first threshold, the machine learning model is a neural network model, and where the instructions, when executed, cause the machine to train the neural network using a first portion of an input feature dataset by adjusting weights associated with the neural network to produce an output pattern, the output pattern to correlate reference intermediate flow parameters to respective reference flow rates of the first portion of the input feature dataset, and validate the neural network based on reference intermediate flow parameters from a second portion of the input feature dataset as inputs to the trained neural network, including causing the machine to predict flow rates using the trained neural network calculate an error between the predicted flow rates and the reference flow rates of the second portion of the input feature dataset, and accept the trained neural network in response to the error being less than a second threshold.

Various refinements of the features noted above may exist in relation to various aspects of the present embodiments. Further features may also be incorporated in these various aspects as well. These refinements and additional features may exist individually or in any combination. For instance, various features discussed below in relation to the illustrated embodiments may be incorporated into any of the above-described aspects of the present disclosure alone or in any combination. Again, the brief summary presented above is intended just to familiarize the reader with certain aspects and contexts of some embodiments without limitation to the claimed subject matter.

BRIEF DESCRIPTION OF THE DRAWINGS

FIGS. 12A-12B illustrate example plots of amplitude attenuation change with respect to water liquid ratio of an oil-continuous oil-water mixture.

FIG. 14 illustrates an example table of preferred upper limits of high-operating frequency and low-operating frequency with respect to Venturi throat diameter.

FIG. 15 illustrates an example table of transmitter-receiver arc-separation and a corresponding ratio to wavelength in pure water.

DETAILED DESCRIPTION

Figure 1:
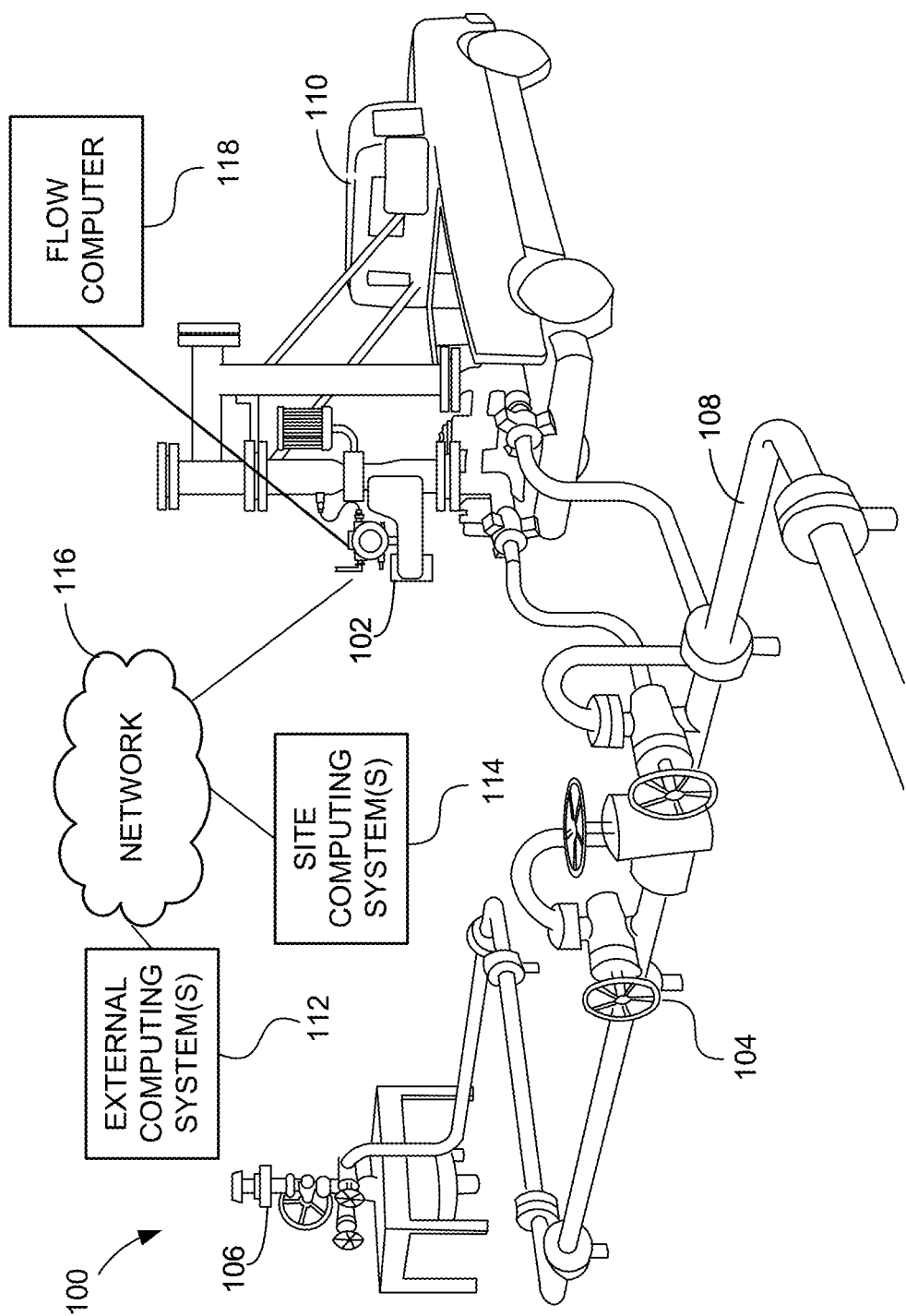
FIG. 1 illustrates an example multiphase flowmeter in accordance with the teachings of this disclosure implemented on an example hydrocarbon production line coupled to an example wellhead.

The figures are not to scale. Wherever possible, the same reference numbers will be used throughout the drawing(s) and accompanying written description to refer to the same or like parts.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

It is to be understood that the present disclosure provides many different embodiments, or examples, for implementing different features of various embodiments. Specific examples of components and arrangements are described below for purposes of explanation and to simplify the present disclosure. These are, of course, merely examples and are not intended to be limiting.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not mandate any particular orientation of the components.

Well testing is often performed to evaluate potential production value of a reservoir (e.g., a hydrocarbon reservoir). During well testing, a test well is drilled to produce a test flow of fluid (e.g., a fluid having multiple phases, a multiphase fluid, etc.) from the reservoir. During the test flow, parameters including fluid pressure, fluid flow rate, etc., may be monitored over a time period. The data collected during well testing may be used to assess the production viability of the reservoir. The costs (e.g., operational costs, capital equipment costs, etc.) associated with performing the testing operations may be relatively substantial. As such, testing operations are preferred to be performed as efficiently as possible.

To efficiently perform such well testing operations, some characteristics of the fluid(s) being produced may be determined such as, for example, the flow rate of the fluid(s). In some instances, the fluid(s) being produced include(s) multiphase fluid(s) such as, for example, water, oil, and/or gas. Determining the flow rate of a multiphase fluid may be more complex, require additional hardware equipment and interpretation computing resources, etc., than determining the flow rate of a single-phase fluid.

In some production pipelines, flowmeters are installed, at surface or subsea, to monitor fluid flow parameters including flow rate, pressure, temperature, salinity, water liquid ratio (WLR), gas volume fraction (GVF), and gas holdup (GHU). For example, for a production line that includes a flow of a fluid having multiple phases (e.g., oil, water, and/or gas phases), the characteristics of each phase of the fluid can be monitored individually. In some instances, a multiphase flowmeter (MPFM) can monitor multiphase flows. The MPFM measures and/or determines flow parameter data, which can be used to measure and/or otherwise characterize performance (e.g., oil, water, and/or gas output capacity) of a surface or subsea wellhead.

Some MPFMs include one or more gamma ray sensors, each of which includes a gamma ray source and a gamma ray detector. The source transmits gamma rays through the fluid and the detector receives the gamma rays. The MPFM can use the transmission attenuation count rate of gamma rays received at the detector to determine one or more of the fluid flow parameters. The MPFM can use the gamma ray measurements to extend the working WLR and/or GVF range of the MPFM. However, existing regulations regarding usage of gamma radiation can limit the number or frequency of use of gamma ray sensors in MPFMs. Additionally, the use of gamma ray sensors in MPFMs may increase operational costs and logistic costs. As a result, options for non-gamma MPFMs are desired.

Example machine-learning multiphase flowmeters are disclosed herein to determine fluid parameters associated with multiphase fluids. Some MPFMs disclosed herein are microwave-venturi MPFMs including microwave transmitter(s), microwave receiver(s), and/or a Venturi meter to measure fluid flow parameters without the use of gamma ray sensors. In MPFMs disclosed herein, the Venturi meter is a measuring device implemented with a constriction or a throat section of a pipe to measure a pressure drop across the pipe inlet and throat, and to determine the flow rate of a fluid through the throat section. The absence of gamma ray sensors in example MPFMs disclosed herein reduces complexity of the flowmeter, thereby reducing production and component costs, and eliminates the need for compliance with regulations regarding usage of gamma radiation.

In some disclosed examples, MPFMs can adaptively select a radio frequency (e.g., frequency) of signals transmitted to the microwave receiver based on dimensions of a pipe and prevailing flow conditions (e.g., whether the flow is water-continuous or oil-continuous, whether the water has low or high salinity or conductivity, etc., and/or a combination thereof). In such disclosed examples, the MPFM can obtain measurements with improved accuracy by using adaptively selected radio frequency signals across a full WLR range.

In examples disclosed herein, the MPFM can execute and/or otherwise implement one or more physics models to determine one or more parameter values associated with the fluid. For example, the one or more physics models can simulate the one or more parameter values by inputting measurement data into a physics-based computer simulation of the fluid flowing through the MPFM. In such examples, the one or more parameter values can include at least one of a water liquid ratio, a gas volume fraction, a gas holdup, a permittivity, a conductivity, a viscosity, a salinity, a density, a pressure, a temperature or a flow rate associated with one or more phases of the fluid.

In some disclosed examples, the MPFM can execute and/or otherwise implement one or more machine learning models to determine the one or more parameter values. For example, the one or more machine learning models can simulate the one or more parameters by inputting measurement data into a trained neural network and observing the outputs of the neural network. In such disclosed examples, the MPFM can execute the one or more machine learning models in combination with or in place of the one or more physics models. Example MPFMs disclosed herein can use measurement data including fluid pressure, temperature, Venturi differential pressure, and/or microwave sensor data to train and/or retrain the one or more machine learning models to improve the determination accuracy of the parameter values using the one or more machine learning models. For example, the MPFM may obtain measurement data across a wide range of fluid characteristics to extend the training database and learning depth of the machine learning models, thereby extending the usable operating range of the machine learning models for predicting the parameter values.

Example MPFMs disclosed herein use artificial intelligence (AI) to characterize multiphase fluids of interest. AI, including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a neural network model is used. Using a neural network model enables the example MPFMs disclosed herein to determine parameter values associated with the fluid flowing through the flowmeter. In general, machine learning models/architectures that are suitable to use in the example approaches disclosed herein include supervised learning artificial neural network models such as two-layer (2-layer) radial basis neural networks (RBN) or learning vector quantization (LVQ) classification neural networks. However, other types of machine learning models could additionally or alternatively be used.

In general, implementing an ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a network of nodes or neurons and connections within the model to transform input data into output data. Additionally, hyperparameters are used as part of the training process to control how the learning is performed (e.g., a learning rate, a number of hidden neuron layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using stochastic gradient descent. However, any other training algorithm may additionally or alternatively be used. In examples disclosed herein, training is performed until the level of error is no longer reducing. In examples disclosed herein, training is performed remotely at an external computing system communicatively coupled to the MPFM, and/or locally at a site computing system coupled to the MPFM. Training is performed using hyperparameters that control how the learning is performed (e.g., a learning rate, a number of hidden layers, a number of neurons in a hidden layer to be used in the machine learning model, etc.). In examples disclosed herein, hyperparameters that control model performance and training speed are the learning rate and regularization parameter(s). Such hyperparameters are selected by, for example, trial and error to reach an optimal model performance. In some examples, Bayesian hyperparameter optimization is utilized to determine an optimal and/or otherwise improved or more efficient network architecture to avoid model overfitting and improve model's overall applicability. In some examples re-training may be performed. Such re-training may be performed in response to, for example, an increase in gas volume fraction, fluid pressure, fluid temperature, oil viscosity, oil density, water salinity or density, or a combination thereof.

Training is performed using training data. In examples disclosed herein, the training data originates from one or more physics models, microwave sensor measurements, fluid temperature measurements, fluid pressure measurements, Venturi differential pressure measurements, data obtained from a second multiphase flowmeter or a test separator coupled to the fluid flow, or gamma ray sensor measurements obtained from a gamma ray multiphase flowmeter. Because supervised training is used, the training data is labeled. Labeling is applied to the training data by a user manually or by an automated data pre-processing system. In some examples, the training data is pre-processed using, for example, a data processor to unwrap phase shift data obtained from a microwave sensor. In some examples, the training data is sub-divided into a first portion of data for training the model, and a second portion of data for validating the model.

Once training is complete, the model is deployed for use as an executable construct that processes an input and provides an output based on the network of nodes and connections defined in the model. The model is stored at a database of an example fluid parameter controller disclosed herein. The model may then be executed by an example machine learning controller of the example fluid parameter controller. In some examples, the machine learning model is executed by a computing system communicatively coupled to and/or otherwise located onboard the MPFM or by an external computing system communicatively coupled to the MPFM.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined.

If the feedback indicates that the accuracy of the deployed model is less than a threshold or other criterion, training of an updated model can be triggered using the feedback and an updated training data set, hyperparameters, etc., to generate an updated, deployed model.

FIG. 1 illustrates an example well site (e.g., a well site environment) 100 including an example flowmeter 102 in accordance with the teachings of this disclosure. In FIG. 1, the flowmeter 102 is a multiphase flowmeter (MPFM) that can measure and/or determine fluid properties of one or more phases of a fluid, such as a multiphase fluid. In FIG. 1, the flowmeter 102 is coupled to an outlet of an example choke manifold 104 that is coupled to an example wellhead 106 via an example production line 108. Fluid from the wellhead 106 flows through the production line 108 and all or a portion of the fluid is redirected to the flowmeter 102 at the choke manifold 104. In FIG. 1, the flowmeter 102 is coupled to an example vehicle 110 to enable the flowmeter 102 to be mobile and/or transferred to and/or coupled to different well sites. In some examples, the flowmeter 102 is coupled to the production line 108 for extended time periods. In example operating conditions, the flowmeter 102 can determine a flow rate respective to each phase of the fluid (e.g., gas, water, and/or oil) flowing therethrough.

In FIG. 1, the flowmeter 102 is communicatively coupled to one or more example external computing systems 112 and one or more example site computing systems 114 via an example network (e.g., a computer network, a wellsite network, etc.) 116. The network 116 of the illustrated example of FIG. 1 is the Internet. However, the network 116 can be implemented using any suitable wired and/or wireless network(s) including, for example, one or more data buses, one or more Local Area Networks (LANs), one or more wireless LANs, one or more cellular networks, one or more private networks, one or more public networks, one or more cloud networks, etc. The network 116 enables a flow computer 118 onboard the flowmeter 102 to be in communication with the external computing system(s) 112 and the site computing system(s) 114. In some examples, the one or more external computing system(s) 112 include cloud computing services. In some examples, the one or more site computing system(s) 114 include edge (distributed) computing framework.

In FIG. 1, the flow computer 118 can store and/or execute physics model(s) and/or machine learning model(s) to determine one or more fluid parameter values. The flow computer 118 can store measurements from the flowmeter 102 as inputs to the physics model(s) and/or the machine learning model(s). In response to determining the one or more fluid parameter values, the flow computer 118 can transmit the determined values to the one or more external computing systems 112 and/or the one or more site computing systems 114.

In FIG. 1, the flowmeter 102 can wirelessly transmit measurements via the flow computer 118 to the one or more external computing systems 112, the one or more site computing systems 114, etc., and/or a combination thereof, for processing of the measurement data and/or for determining the fluid parameter values. In the example of FIG. 1, the external computing system(s) 112 can include computer servers at a location different from the well site 100. In the example of FIG. 1, the site computer system(s) 114 are located at and/or otherwise disposed near the well site 100. The site computer system(s) 114 can include one or more computing devices (e.g., laptops, mobile devices, tablet computers, etc.) that are operated by a user (e.g., an operator, a technician, etc.). Additionally or alternatively, the site computer system(s) 114 can be communicatively coupled to the flowmeter 102 with wired connection(s) to transmit data to and/or receive data from the flowmeter 102.

In the illustrated example of FIG. 1, the external computing system(s) 112 and the site computing system(s) 114 can receive and/or store measurement data obtained from the flow computer 118. In some examples, the flow computer 118, the external computing system(s) 112, and/or the site computing system(s) 114 can execute the physics model(s) and/or the machine learning model(s) based on the measurement data to determine one or more fluid parameters associated with the multiphase fluid from the wellhead 106. In some examples, the flow computer 118 can be configured to control one or more components of the well site 100 based on the one or more fluid parameters. For example, the flow computer 118 can be configured to open or close a valve of the production line 108 in response to determining that a flow rate through the production line 108 is higher or lower than an expected value of the flow rate.

Figure 2:
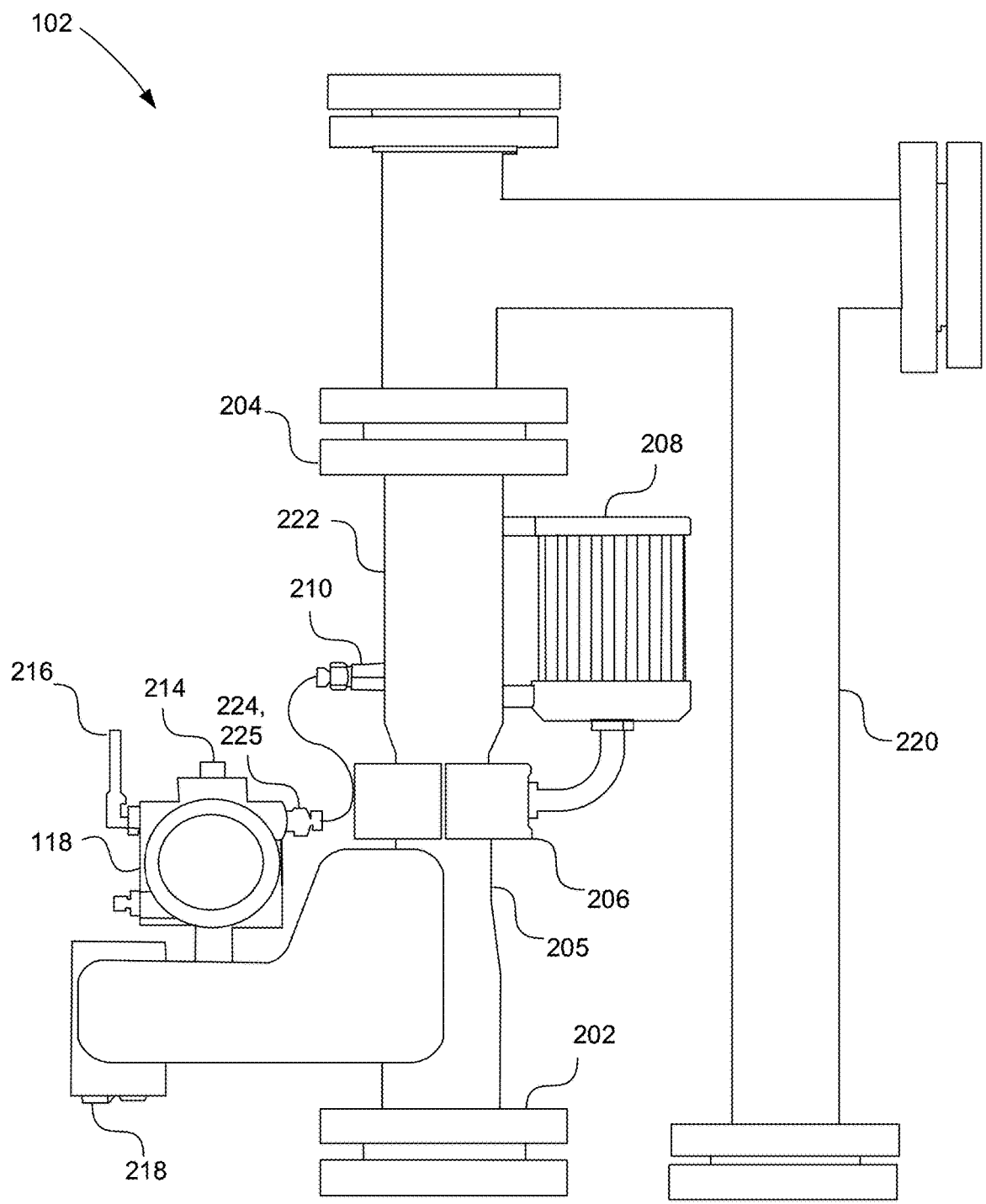
FIG. 2 is another illustration of the example multiphase flowmeter of FIG. 1.

FIG. 2 illustrates a perspective view of the example flowmeter 102 of FIG. 1. In FIG. 2, the flowmeter 102 includes an example inlet flange 202 and an example outlet flange 204. For example, a fluid can enter the inlet flange 202, flow vertically upward through the flowmeter 102 before exiting the flowmeter 102 at the outlet flange 204, and return to the production line 108 thereafter via return piping 220. In FIG. 2, the flowmeter 102 includes the flow computer 118, example microwave antennas 206, example microwave electronics 208, an example thermowell 210, an example multi-variable transmitter 214, an example wireless data transmitter 216, and an example wired data transmitter 218.

In the illustrated example of FIG. 2, the microwave antennas 206 are coupled to a Venturi throat section of a first pipe 222 of the flowmeter 102. In FIG. 2, one or more of the microwave antennas 206 can be microwave transmitter antennas, and one or more of the microwave antennas 206 can be microwave receiver antennas. In example operating conditions, the one or more microwave transmitter antennas can transmit a signal (e.g., low-power microwave radio frequency signal) through the fluid flowing through the first pipe 222 to be received by the one or more microwave receiver antennas. In example operating conditions, as the signal travels and/or otherwise propagates through the fluid, the fluid can attenuate the signal (e.g., cause a reduction of signal strength and/or magnitude) or shift the phase angle of the signal, relative to the respective values of the transmitted signal, before the signal reaches one(s) of the microwave receiver antennas.

In some examples, measurements (e.g., measurement data) associated with the attenuation and/or the phase shift of the signal relate to one or more parameter values associated with the fluid. For example, the flow computer 118 can determine the one or more parameter values based on the attenuation and phase shift measurements. In the illustrated example, the microwave antennas 206 are coupled to the microwave electronics 208 and the microwave electronics 208 are mounted on the first pipe 222. In FIG. 2, the microwave electronics 208 include components that provide power to the microwave antennas 206, logic circuitry to control the selection of transmission frequency or frequencies, logic circuitry to control the selection of the transmitting antenna(s) and the receiving antenna(s), analog or digital circuitry to amplify, digitize, and demodulate signals received by receiving antenna(s), analog or digital circuitry to process demodulated signals to calculate attenuation data and phase shift data of the receiving antenna(s) based on the respective transmitted signal(s), and/or analog or digital circuitry to communicate calculated attenuation data and phase shift data to at least one of the flow computer 118, the external computing system(s) 112, or site computing system(s) to determine fluid parameter values.

In the illustrated example of FIG. 2, the thermowell 210 is metal tubing coupled between the first pipe 222 and a temperature sensor 224 with a temperature sensing element (e.g., PT100) implemented inside of the metal tubing that is in contact with the fluid. In FIG. 2, the thermowell 210 is coupled to the first pipe 222 upstream relative to the microwave antennas 206. The thermowell 210 can transfer heat from the fluid to the temperature sensor 224. The temperature sensor 224 can measure the temperature of the fluid based on the heat transferred from the fluid and transmit the temperature data to at least one of the flow computer 118 or the multi-variable transmitter 214. The multi-variable transmitter 214 also receives pressure data associated with the fluid measured by a pressure sensor 225 coupled to the first pipe 222. The multi-variable transmitter 214 transmits the pressure data to the flow computer 118.

In the illustrated example of FIG. 2, the flow computer 118 stores and/or transmits measurement data that can include at least one of the attenuation data and the phase shift data obtained from the microwave antennas 206, the temperature data obtained from the temperature sensor via the thermowell 210, or the pressure data from the pressure sensor 225. In some examples, the flow computer 118 executes instructions (e.g., machine readable instructions) to process the raw measurement data (e.g., measurement data obtained from a sensor without further processing) and/or determines one or more parameter values associated with the fluid based on the processed raw measurement data. In some examples, the flow computer 118 transmits the raw measurement data to at least one of the external computing systems 112 or the site computing systems 114 of FIG. 1 via the wireless data transmitter 216 and/or the wired data transmitter 218. Additionally or alternatively, the flow computer 118 can receive instructions (e.g., directions, commands, queries, etc.) from the user, a computing device associated with the user, etc., via the site computing systems 114. In the illustrated example, the flow computer 118 is configured to control, via the microwave electronics 208, a frequency of the microwave signal transmitted by the microwave antennas 206. For example, the flow computer 118 can select the frequency based on results from processing of the measurement data via at least one of the flow computer 118, the external computing system 112, or the site computing systems 114. Advantageously, the flow computer 118 can select the frequency based on a prevailing flow condition of the pipe (e.g., whether the flow is oil-continuous or water-continuous) to improve measurement accuracy of the flowmeter 102 across changing flow conditions.

FIG. 3A illustrates internal components of an example implementation of the flowmeter 102 of FIGS. 1 and/or 2 not including a gamma ray source and a gamma ray detector. In FIG. 3A, the fluid flows vertically upward through the first pipe 222 in a direction represented by an upward-oriented arrow 300. Coupled to the first pipe 222 are the microwave antennas 206, an example Venturi meter 302, and an example microwave reflection sensor 304. The microwave antennas 206, the Venturi meter 302, and the microwave reflection sensor 304 can be configured to obtain measurement data associated with the fluid flowing through the first pipe 222. Further, the microwave antennas 206, the Venturi meter 302, and the microwave reflection sensor 304 can be configured to transmit the measurement data to the flow computer 118 of FIG. 2 via the multi-variable transmitter 214 of FIG. 2.

In the illustrated example of FIG. 3A, the microwave antennas 206 include one or more example microwave transmitter antennas 306 and one or more example microwave receiver antennas 308. The transmitter antenna(s) 306 and receiver antenna(s) 308 are coupled to the first pipe 222 at a pipe throat 205 of the Venturi meter 302. An inner diameter of the pipe throat 205 is less than an inner diameter of the first pipe 222 (e.g., by a factor of 2). The transmitter antenna(s) 306 and the receiver antenna(s) 308 are coupled to a cross-section of the pipe throat 205. In the example of FIG. 3A, each of the one or more receiver antennas 308 is at a respective distance from the transmitter antenna(s) 306. In example operating conditions, the transmitter antenna(s) 306 send(s) a respective microwave signal to each of the receiver antennas 308 to determine attenuation data and phase shift data corresponding to a respective transmitter-receiver pair.

In some examples, as illustrated in FIG. 3A, one or more example second microwave transmitter antennas 310 and one or more example second microwave receiver antennas 312 are coupled to a second cross-section of the pipe throat 205. The second transmitter antenna(s) 310 send(s) a respective second microwave signal to each of the second receiver antennas 312 to determine second attenuation data and second phase shift data corresponding to each respective second transmitter-receiver pair. In some examples, the flow computer 118 of FIG. 2 determines the velocity of the fluid through the pipe throat 205 of the first pipe 222 based on cross correlation of the attenuation data and the second attenuation data, or cross correlation of the phase shift data and the second phase shift data. Advantageously, the flow computer 118 can determine one or more flow rates of the fluid in response to determining the velocity of the fluid.

In the illustrated example of FIG. 3A, the Venturi meter 302 is communicatively coupled to the first pipe 222 via a first pressure tap 313A at a first cross-section 314A upstream relative to the pipe throat 205. The Venturi meter 302 is further communicatively coupled via a second pressure tap 313B at a second cross-section 314B of the pipe throat 205. The second cross-section 314B is downstream relative to the first cross-section and upstream relative to the microwave antennas 206. In some examples, the second transmitter antennas 310 and the second receiver antennas 312 may be located at the second cross-section 314B. Narrowing of the pipe diameter at the pipe throat 205 causes the fluid to undergo an increase in velocity and a corresponding pressure drop as the fluid flows into the pipe throat 205. The Venturi meter 302 determines pressure data (measured at the first pressure tap 313A or the second pressure tap 313B) and differential pressure data (measured across the first pressure tap 313A and the second pressure tap 313B) associated with the fluid entering the pipe throat 205. The flow computer 118 of FIG. 2 can receive the pressure data and the differential pressure data from the Venturi meter 302 via the multi-variable transmitter 214 of FIG. 2. In some examples, not illustrated in FIG. 3A, at least one third microwave transmitter antennas and at least one third microwave receiver antennas may be coupled to the second cross-section 314B (of the pressure tap 313B) at the pipe throat 205.

In the illustrated example of FIG. 3A, the microwave reflection sensor 304 is coupled to a third cross-section 314C of the first pipe 222 downstream relative to the pipe throat 205. The microwave reflection sensor 304 includes a microwave transmitter antenna 304A and a microwave receiver antenna 304B. The microwave transmitter antenna 304A of the microwave reflection sensor 304 transmits a signal. The signal reflects off the fluid near a wall of the third cross-section 314C of the first pipe 222 before the signal reaches the microwave receiver antenna 304B of the microwave reflection sensor 304. As such, the microwave reflection sensor 304 determines microwave reflection attenuation data and microwave reflection phase shift data based on the fluid near the wall of the third cross-section 314C of the first pipe 222. In some examples, the microwave transmitter antenna 304A and a microwave receiver antenna 304B of the microwave reflection sensor 304 is the same antenna (e.g., a single antenna based on an open-coaxial probe). Fluid entering the pipe throat 205 increases in velocity due to a narrowing of pipe diameter and, thus, the increase in fluid velocity causes the fluid to be better mixed after exiting the pipe throat 205. Because the third cross-section 314C is located on the first pipe 222 downstream relative to the pipe throat 205, a liquid phase (e.g., containing oil and water) in the fluid near the wall of the first pipe 222 at the third cross-section 314C is well mixed, and there may be reduced gases entrained in the liquid phase of the fluid. Thus, the flow computer 118 of FIG. 2 can use the microwave reflection attenuation data and microwave reflection phase shift data from the microwave reflection sensor 304 to determine improved calculations and/or estimates of salinity and/or water-liquid ratio associated with the fluid (e.g., compared to using only the attenuation data and the phase shift data from the microwave antennas 206). In some examples, the microwave reflection sensor 304 is coupled to a position of the pipe throat 205 downstream from the microwave antennas 206. In some examples, the microwave reflection sensor 304 is coupled to the inlet section (near the first cross-section 314A) of the Venturi meter 302, upstream relative to the pipe throat 205a position. In some examples, the microwave reflection sensor 304 is omitted from the flowmeter 102.

Figure 3:
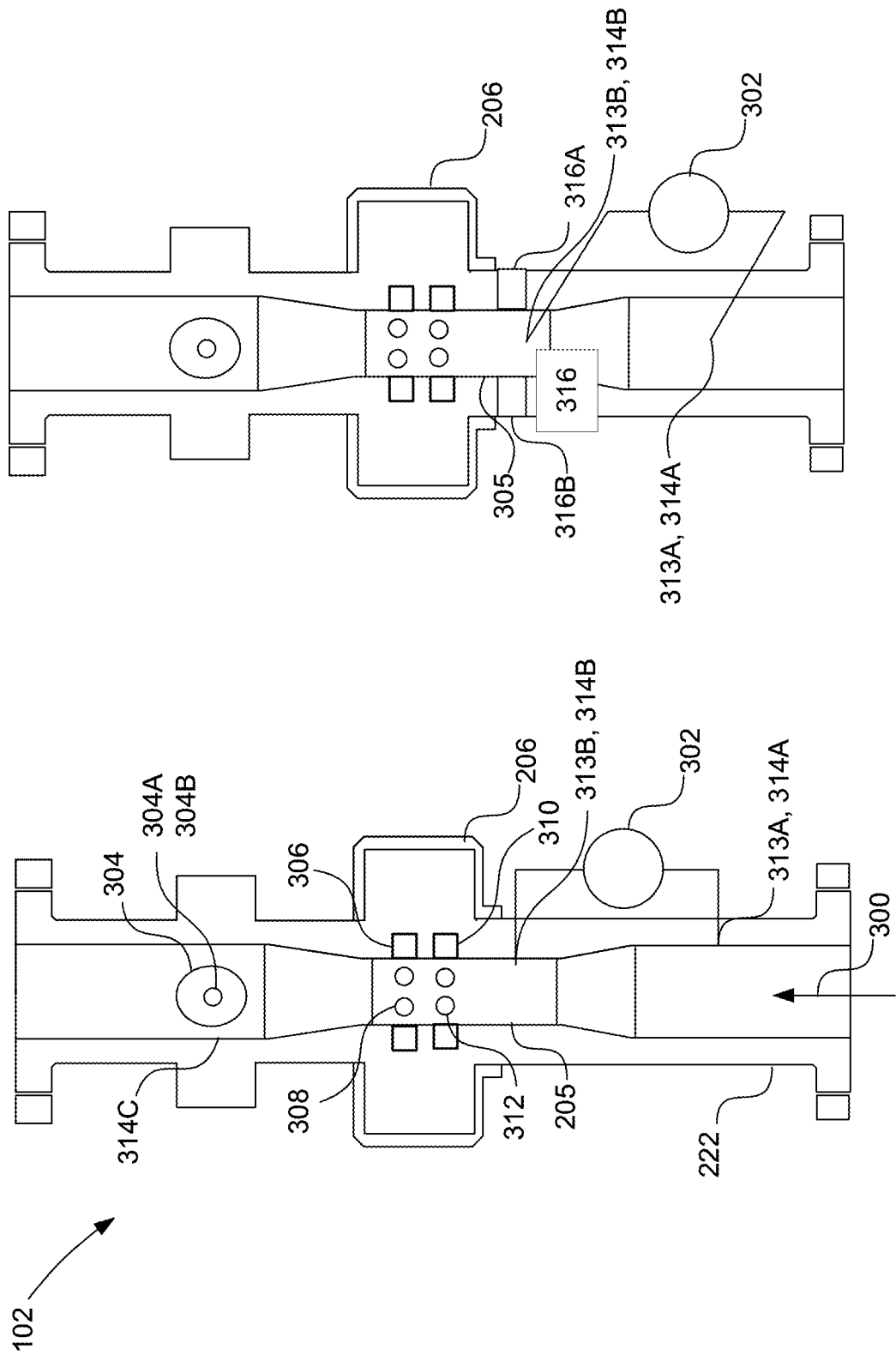
FIG. 3A illustrates internal components of an example implementation of the example multiphase flowmeter of FIGS. 1 and/or 2 not including a gamma ray source and a gamma ray detector.
FIG. 3B illustrates internal components of an example implementation of the example multiphase flowmeter of FIGS. 1, 2, and/or 3A including a gamma ray source and a gamma ray detector.

FIG. 3B illustrates an example implementation of the flowmeter 102 of FIG. 3A including a gamma ray sensor 316. The gamma ray sensor 316 is coupled to the first pipe 222 at the pipe throat 205 upstream relative to the microwave antennas 206. The gamma ray sensor 316 includes a gamma ray source 316A coupled to a cross-section of the pipe throat 205, and a gamma ray detector 316B coupled to the cross-section at a diametrical distance from the gamma ray source 316A. The gamma ray source 316A transmits gamma rays through the fluid, and the gamma ray detector 316B detects the gamma rays and determines the gamma ray count rates. In some example, the direction of gamma rays through the fluid (e.g., diametrically aligned from the source 316A to the detector 316B) is along the second cross-section 314B. The flow computer 118 of FIG. 2 can determine one or more parameter values associated with the fluid based on the gamma ray count rates. In some examples, the gamma ray sensor 316 is included in the flowmeter 102 of FIGS. 1-3A to improve the determination of the one or more parameter values by the flow computer 118. In particular, the gamma ray count rates from the gamma ray sensor 316 can extend the upper range of gas volume fraction for which flow computer 118 can determine the one or more parameters. In some examples, the gamma ray sensor 316 is coupled, as an optional sensor module, to the cross-section of the pipe throat 205 to determine reference water liquid ratio, reference gas holdup, reference gas volume fraction, and/or one or more reference flow rates as training data and/or validation data for the flow computer 118 of the flowmeter 102 without a gamma ray sensor (e.g., the flowmeter 102 of FIG. 3A). In other examples, a second one of the flowmeter 102 including the gamma ray sensor 316 is coupled to the production line 108 of FIG. 1, the second flowmeter to determine reference water liquid ratio, reference gas holdup, reference gas volume fraction, and/or one or more reference flow rates as training data and/or validation data for the flow computer 118 of the flowmeter 102. Advantageously, the flowmeter 102 of FIG. 3A is an improvement over the flowmeter 102 of FIG. 3B because omission of the gamma ray sensor 316 reduces part costs and reduces concerns over compliance with gamma radiation regulations.

Figure 4:
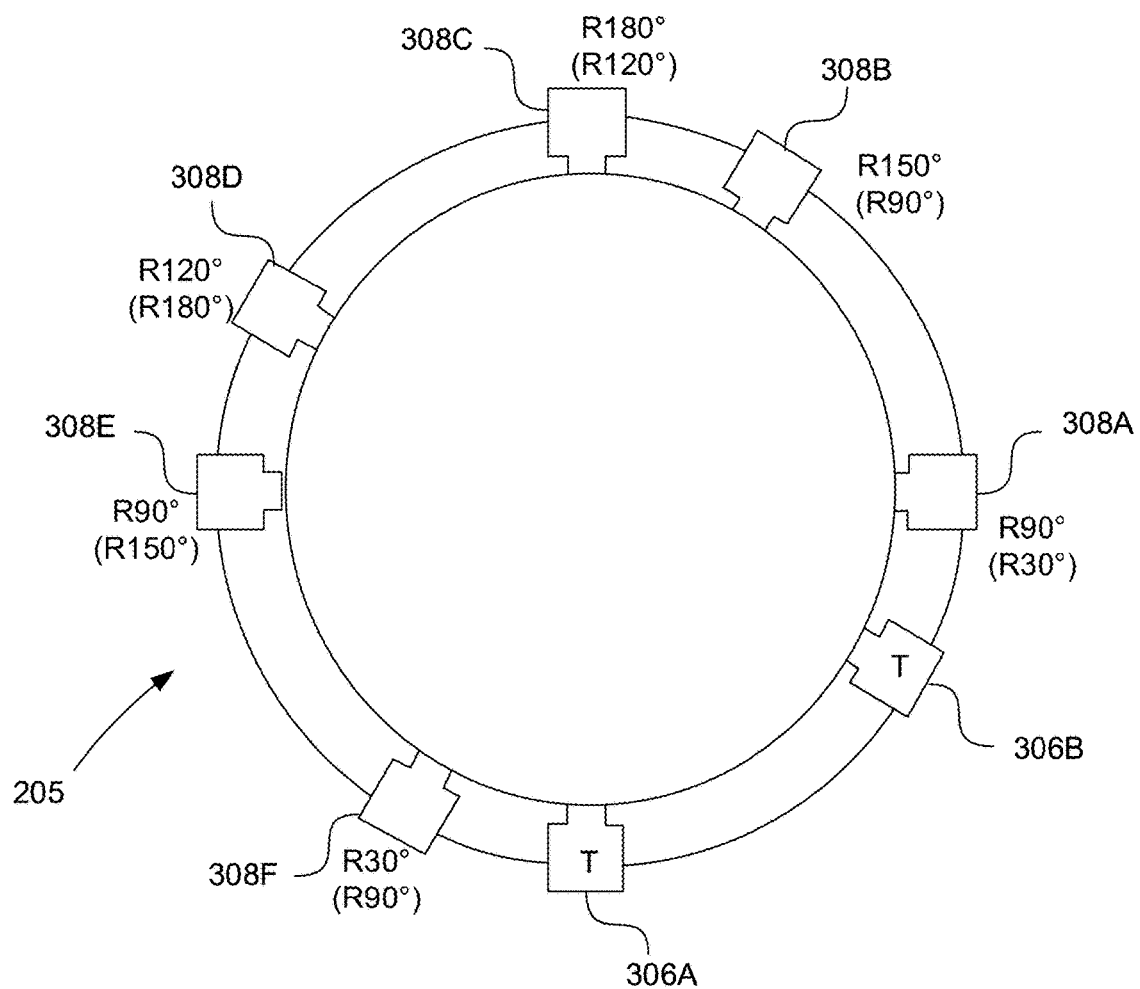
FIG. 4 is a perspective view of the example multiphase flowmeter of FIGS. 1, 2, 3A and/or 3B depicting example locations of microwave transmitters and microwave receivers along a cross-section of pipe.

FIG. 4 is a perspective view of the example multiphase flowmeter of FIGS. 1, 2, 3A, and/or 3B depicting example locations of the microwave transmitter antennas 306 (e.g., first microwave transmitter antennas 306) and the microwave receiver antennas 308 (e.g., first microwave receiver antennas 308) along and/or otherwise surrounding a cross-section of the pipe throat 205. In some examples, the second microwave transmitter antennas 310 and the second microwave receiver antennas 312 are coupled to a second cross-section of the pipe throat 205 based on the same cross-section configuration of the first microwave transmitter antennas 306 and the first microwave receiver antennas 308. In the illustrated example of FIG. 4, six of the microwave receiver antennas 308 (e.g., first receiver 308A, second receiver 308B, third receiver 308C, fourth receiver 308D, fifth receiver 308E, and sixth receiver 308F) are shown coupled to the cross-section at respective radial distances (e.g., angular spacing) from two of the microwave transmitter antennas 306 (e.g., first transmitter 306A and second transmitter 306B). In FIG. 4, the first receiver 308A is 90 degrees counterclockwise relative to the first transmitter 306A and 30 degrees counterclockwise relative to the second transmitter 306B. The second receiver 308B is 150 degrees counterclockwise relative to the first transmitter 306A and 90 degrees counterclockwise relative to the second transmitter 306B. The third receiver 308C is 180 degrees relative to the first transmitter 306A and 120 degrees counterclockwise relative to the second transmitter 306B. The fourth receiver 308D is 120 degrees clockwise relative to the first transmitter 306A and 180 degrees relative to the second transmitter 306B. The fifth receiver 308E is 90 degrees clockwise relative to the first transmitter 306A and 150 degrees clockwise relative to the second transmitter 306B. The sixth receiver 308F is 30 degrees clockwise relative to the first transmitter 306A and 90 degrees clockwise relative to the second transmitter 306B. The measurements corresponding to the two 90-degree receivers per transmitter (e.g., the first receiver 308A and the fifth receiver 308E for the first transmitter 306A, the second receiver 308B and the sixth receiver 308F for the second transmitter 306B) can be used to check axis-symmetry of the vertical gas-liquid flow over the cross-section of the pipe throat 205.

In the illustrated example of FIG. 4, the first transmitter 306A transmits a first plurality of signals (e.g., radio frequency signals) through the fluid. The plurality of signals can be received in parallel by the first receiver 308A, by the second receiver 308B, and up to the sixth receiver 308F. The second transmitter 306B transmits a second plurality of signals through the fluid. The second plurality of signals can be received in parallel by the first receiver 308A, the second receiver 308B, and up to the sixth receiver 308F. In some examples, each signal from each of the first plurality of signals and/or the second plurality of signals have a different radio frequency. In some examples, the radio frequency of each signal is based on a diameter of the pipe throat 205 of the first pipe 222 and/or a prevailing flow condition in the pipe throat 205. In some examples, the radio frequency of each signal can change in response to changes in the prevailing flow condition.

For example, a small change (e.g., close to zero degrees) in phase shift measurements corresponding to the plurality of the signals can indicate that the fluid is oil continuous (e.g., water-liquid ratio is 0.3 or less). In some examples, in response to the flow computer 118 of FIG. 2 determining that the fluid is oil continuous, the transmitter antennas 306 transmit a high frequency signal (e.g., 720 MHz, 960 MHz, etc.) to at least one of the receiver antennas 308. As a result, attenuation measurements corresponding to the high frequency signal in the oil continuous fluid are more sensitive to changes in water-liquid ratio or in gas holdup of the fluid compared to a low frequency signal (e.g., 240 MHz, 320 MHz, etc.), thereby improving accuracy of the flow computer 118 in determining the water-liquid ratio or gas holdup of the fluid. The attenuation measurements corresponding to the high frequency signal in the oil continuous fluid are largely insensitive to changes in water conductivity and/or salinity.

Alternatively, when the fluid is water continuous, attenuation measurements and phase shift measurements are sensitive to changes in the water-liquid ratio, gas holdup and the water conductivity and/or the salinity. In response to the flow computer 118 of FIG. 2 determining that the fluid is water continuous (e.g., in response to determining a substantial change in phase shift measurements), the transmitter antennas 306 transmit the low frequency signal to at least one of the receiver antennas 308. The attenuation measurements and phase shift measurements corresponding to the low frequency signal in the water continuous fluid are lesser in value than attenuation measurements and phase shift measurements corresponding to a high frequency signal in the water continuous fluid. As a result, the flow computer 118 can use the measurements corresponding to the low frequency signal to determine water-liquid ratio, gas holdup and water conductivity and/or salinity of the water continuous fluid. In such examples, the measurements corresponding to the low frequency signal have a higher operating upper limit of water-liquid ratio and a wider water conductivity and/or salinity operating range (e.g., compared to a high frequency signal). In some examples, in response to the flow computer 118 of FIG. 2 determining that the fluid is water continuous and of a high (e.g., more than 90%) gas volume fraction (e.g., in response to determining a small change in phase shift measurements of a few to ten degrees), the transmitter antennas 306 transmit a high frequency signal to at least one of the receiver antennas 308. The attenuation and phase shift measurements corresponding to the high frequency signal in the water continuous, high gas fraction fluid are more sensitive to changes in water-liquid ratio or in gas holdup of the fluid than a low frequency signal, thereby improving accuracy of the flow computer 118 in determining the water-liquid ratio or gas holdup of the fluid.

In the illustrated example of FIG. 4, each signal in the first plurality of signals and/or the second plurality of signals can have a different high frequency or low frequency, and the frequency of each signal can change as the prevailing flow condition changes. Attenuation measurements and phase shift measurements corresponding to each signal can be combined for the six-receiver system, the flow computer 118 to use the combined attenuation measurements and combined phase shift measurements to determine the one or more parameters (e.g., the mixture permittivity, the mixture conductivity, the water permittivity, the water conductivity, the water-liquid ratio, the gas holdup, the gas volume fraction, the mixture density, the gas flow rate, the water flow rate, and/or the oil flow rate) associated with the fluid. Advantageously, the signals in the first plurality of signals and/or the second plurality of signals received by the six receiver antennas 308A to 308F can be combined in a two-transmitter two-receiver configuration. For example, the two-transmitter two-receiver configuration can include measurement data (e.g., attenuation data and phase shift data) based on the first plurality of signals received by the third receiver 308C (e.g., R180°) and the sixth receiver 308F (e.g., R30°) combined with receiver data based on the second plurality of signals received by the fourth receiver (e.g., R180°) 308D and the first receiver 308A (e.g., R30°). In other examples, the two-transmitter two-receiver configuration can include measurement data based on the first plurality of signals received by the fourth receiver 308D (e.g., R120°) and the first receiver 308A (e.g., R90°) combined with receiver data based on the second plurality of signals received by the third receiver 308C (e.g., R120°) and the second receiver 308B (e.g., R90°). The combined measurement data from the two-transmitter two-receiver configuration can be processed by the microwave electronics 208 and/or by the flow computer 118 to obtain drift-free borehole compensated (BHC) attenuation and phase-shift data and/or to determine the one or more parameters (e.g., the mixture permittivity, the mixture conductivity, the water permittivity, the water conductivity, the water-liquid ratio, the gas holdup, the gas volume fraction, the mixture density, the gas flow rate, the water flow rate, and/or the oil flow rate) associated with the fluid.

In the illustrated example of FIG. 4, two microwave transmitter antennas 306 (e.g. the first transmitter 306A and the second transmitter 306B) and six receiver antennas 308 (e.g., the first receiver 308A, the second receiver 308B, etc.) are shown. In other examples, four of the receiver antennas 308 (e.g., the first receiver 308A, the third receiver 308C, the fourth receiver 308D, and the sixth receiver 308F) can be used to implement a 2-transmitter four-receiver system. In such examples, the flow computer 118 of FIG. 2 can determine fluid parameter values based on the four-receiver system that are comparable to fluid parameter values based on a six-receiver system. In some examples, fewer receiver antennas than the four-receiver system can be implemented to reduce hardware costs and improve system reliability of multiphase fluid parameter measurements and/or associated determinations.

In some examples, a first one-transmitter multi-receiver system can be implemented on a first cross-section of the pipe throat 205. In such examples, the first one-transmitter multi-receiver system can include the first transmitter 306A, the sixth receiver 308F (e.g., a first near-wall receiver), and the third receiver 308C (e.g., a first cross-diameter receiver). A second one-transmitter multi-receiver system can be implemented on a second cross-section of the pipe throat 205, where the first cross-section and the second cross-section are separated by a known axial distance. For example, the second one-transmitter multi-receiver system can include as the second transmitter 306B, the first receiver 308A (e.g., a second near-wall receiver), and the fourth receiver 308D (e.g., a second cross-diameter receiver). Cross-correlation of the measurement data between the receivers at the first cross-section and the second cross-section (e.g., between the first cross-diameter receiver and the second cross-diameter receiver, or between the first near-wall receiver and the second near-wall receiver) can be used to determine flow velocity or velocities. Inter cross-section transmitter-receiver measurements can include measurement data for transmitter(s) and receiver(s) at different cross sections (e.g., between the first transmitter and the second near-wall receiver, or between the first transmitter and the second cross-diameter receiver, or between the second transmitter and the first near-wall receiver, or between the second transmitter and the first cross-diameter receiver). Drift-free borehole compensated (BHC) attenuation and phase-shift data can be derived from the inter cross-section transmitter-receiver measurements.

Figure 5:
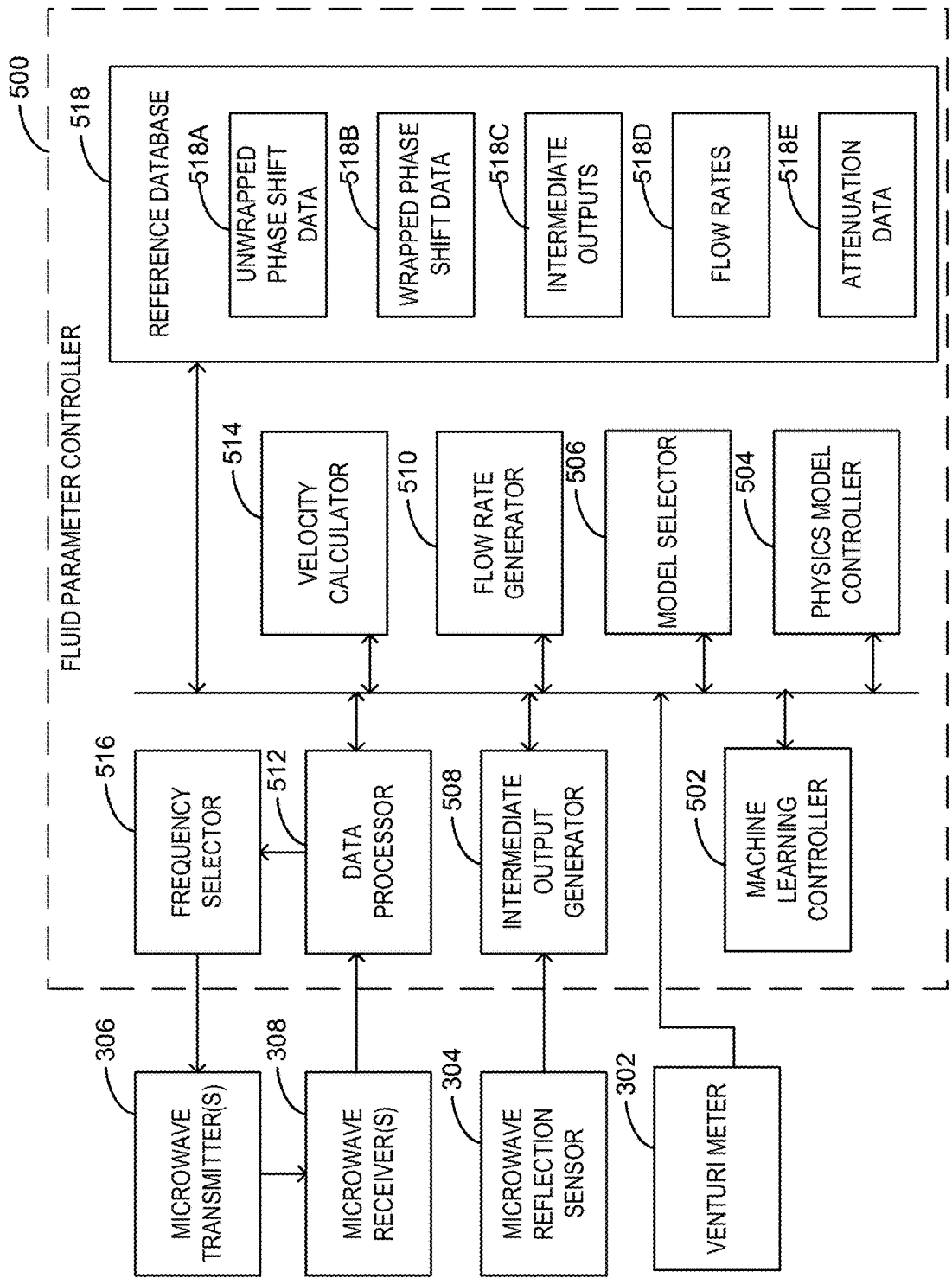
FIG. 5 is a block diagram of an example implementation of a fluid parameter controller including a machine learning controller and a physics model controller that can determine properties associated with a multiphase fluid.

FIG. 5 is a block diagram of an example fluid parameter controller 500 including an example machine learning controller 502 and an example physics model controller 504 that can determine properties (e.g., fluid parameters) associated with a multiphase fluid. The fluid parameter controller 500 includes an example model selector 506, an example intermediate output generator 508, an example flow rate generator 510, an example data processor 512, an example velocity calculator 514, an example frequency selector 516, and an example reference database 518. The fluid parameter controller 500 is coupled to the one or more microwave transmitter antenna (e.g., transmitters) 306, the one or more microwave receiver antennas (e.g., receivers) 308, the microwave reflection sensor 304, and the Venturi meter 302 of FIG. 3A. In some examples, the flow computer 118 implements and/or otherwise executes the fluid parameter controller 500 to determine the one or more fluid parameters associated with the fluid through the flowmeter 102 of FIGS. 1-3A based on measurement data from the one or more microwave transmitters 306, the one or more microwave receivers 308, the microwave reflection sensor 304, and the Venturi meter 302.

In the illustrated example of FIG. 5, the fluid parameter controller 500 includes the machine learning controller 502 to train, validate, retrain, store, and/or execute one or more machine learning models. In some examples, the machine learning models are neural network models, which may include one of a supervised learning artificial neural network models (e.g. a 2-layer radial-basis network (RBN) or a Learning Vector Quantization (LVQ) network) described below in connection with FIGS. 7A-7B and FIGS. 8A-8B, respectively. In other examples, a different neural network model architecture can be used.

In the illustrated example of FIG. 5, the fluid parameter controller 500 includes the machine learning controller 502 to receive input data from at least one of the microwave receivers 308, the microwave reflection sensor 304, the Venturi meter 302, or the reference database 518. For example, the machine learning controller 502 can obtain input data including at least one of attenuation data or phase shift data associated with at least one of the one or more of the microwave receivers 308 or the microwave reflection sensor 304, pressure data, temperature data, differential pressure data, velocity data, or reference data. In response to executing the one or more machine learning models, the machine learning controller 502 can determine a value of the one or more fluid parameters.

In the illustrated example of FIG. 5, the fluid parameter controller 500 includes the physics model controller 504 to store one or more physics models and execute the one or more physics models based on the input data. In some examples, the physics models include derived formulas and/or numerical models. The physics models may be used to determine a value of the one or more fluid parameters based on the input data. For example, the physics model controller 504 can execute machine readable instructions that correspond to one or more formulas, one or more numerical models, etc., to determine fluid parameter(s) of interest based on entering the input data into the one or more formulas, the one or more numerical models, etc.

In the illustrated example of FIG. 5, the fluid parameter controller 500 includes the model selector 506 to determine whether one or more of the physics models and/or one or more of the machine learning models are used to determine a value of the one or more fluid parameters based on the input data. In some examples, the model selector 506 determines a first value of the one or more fluid parameters by invoking (e.g., causing, commanding, directing, instructing, etc.) the physics model controller 504 to execute one or more of the physics models. The model selector 506 can determine whether the first value satisfies a threshold range of values of the one or more fluid parameters and/or whether the error between the determined first value and an expected first value is less than an error threshold. In response to the first value not satisfying the threshold range and/or the error not satisfying the error threshold, the model selector 506 can determine a second value of the one or more fluid parameters by invoking the machine learning model controller 502 to execute one or more of the machine learning models. In some examples, the model selector 506 invokes the machine learning controller 502 before the physics model controller 504. In some examples, the model selector 506 invokes only one of the machine learning controller 502 or the physics model controller 504.

In the illustrated example of FIG. 5, the fluid parameter controller 500 includes the intermediate output generator 508 to generate and/or otherwise determine one or more intermediate outputs (e.g., a water liquid ratio (WLR), a gas volume fraction (GVF), a gas holdup (GHU), a permittivity, a conductivity, a viscosity, a density, and/or a salinity) associated with the fluid by invoking at least one of the machine learning controller 502 or the physics model generator 504 via the model selector 506. In such examples, the intermediate outputs can be used by the flow rate generator 510 to determine one or more flow rates associated with the fluid.

In the illustrated example of FIG. 5, the fluid parameter controller 500 includes the flow rate generator 510 to generate and/or otherwise determine one or more flow rates (e.g., a water flow rate, an oil flow rate, a gas flow rate, and/or a mixture flow rate) associated with the fluid by invoking at least one of the machine learning controller 502 or the physics model generator 504 via the model selector 506.

In the illustrated example of FIG. 5, the fluid parameter controller 500 includes the data processor 512 to receive raw phase shift data and/or raw attenuation data from the one or more microwave receivers 308. In some examples, raw phase shift measurements outside of a range of 0 degrees to 360 degrees may be wrapped. The data processor 512 can unwrap the raw (e.g., wrapped) phase shift measurements by invoking the machine learning controller 502. For example, the machine learning controller 502 can input the wrapped phase shift measurements into a trained neural network model. In such examples, the machine learning controller 502 can execute the trained neural network model to generate corresponding unwrapped phase shift measurements. In some such examples, the trained neural network model can be the Learning Vector Quantization (LVQ) neural network described below in connection with FIGS. 8A and 8B. Additionally or alternatively, the data processor 512 can perform time-series data processing, including at least one of borehole-compensation calculation of different two-transmitter two-receiver combinations, time-averaging, statistical analysis, spectrum analysis or normalization of the phase shift measurements and/or of the attenuation measurements. In some examples, the data processor 512 can perform borehole-compensation calculation of raw attenuation measurements to generate drift-free attenuation data.

In the illustrated example of FIG. 5, the fluid parameter controller 500 includes the velocity calculator 514 to determine a velocity of the fluid based on the attenuation data (e.g., attenuation time-series data) and/or the unwrapped phase shift data (e.g., unwrapped phase shift time-series data) measured from the microwave receivers 308. The velocity calculator 514 can cross-correlate attenuation data and/or unwrapped phase shift data from a first receiver of the microwave receivers 308 with attenuation data and/or unwrapped phase shift data from a second receiver of the second microwave receivers 312. In such examples, the first receiver and the second receiver are coupled to the pipe throat 205 of the first pipe 222 of FIG. 2 at different cross-sections of the pipe throat 205 of the first pipe 222. The velocity calculator 514 can determine the velocity or velocities of the fluid based on the results of the cross-correlation (e.g., inter cross-section transit-time determination) and/or based on one or more flow models of the velocity calculator using the determined GVF or the determined GHU from the intermediate output generator 508. In some examples, the velocity calculator 514 can transmit and/or otherwise provide the velocity or velocities of the fluid to the machine learning controller 502 to be used as an input to one or more of the machine learning models of the machine learning controller 502 for determining a flow rate.

In the illustrated example of FIG. 5, the fluid parameter controller 500 includes the frequency selector 516 coupled to the data processor 512 to select a radio frequency of the one or more signals to be transmitted by the microwave transmitters 306. The frequency selector 516 receives from the data processor 512 a set of unwrapped phase shift data corresponding to each signal transmitted from the microwave transmitter 306 to the respective microwave receiver 308. In response to an absolute value of the unwrapped phase shift values being more than a threshold (e.g., less than 1 degree), the frequency selector 516 can determine that the fluid is water continuous between the microwave transmitter 306 and the respective microwave receiver 308 and, thus, directs the microwave transmitter 306 to transmit a low frequency signal (e.g., 240 MHz, 320 MHz, etc.) to the respective microwave receiver 308. Alternatively, in response to the absolute value of the unwrapped phase shift values being less than the threshold, the frequency selector 516 may determine that the fluid is oil continuous between the microwave transmitter 306 and the respective microwave receiver 308 and, thus, directs the microwave transmitter 306 to transmit a high frequency signal (e.g., 720 MHz, 960 MHz, etc.) to the respective microwave receiver 308.

In the illustrated example of FIG. 5, the fluid parameter controller 500 includes the reference database 518 to store and transmit the reference data (e.g., input feature data) to be used as input to the one or more machine learning models of the machine learning controller 502. In the illustrated example, the reference database 518 further includes reference unwrapped phase shift data 518A, reference wrapped phase shift data 518B, reference intermediate outputs 518C (e.g., reference mixture permittivity, reference mixture conductivity, reference water permittivity, reference water conductivity, reference water density, reference oil permittivity, reference oil density, reference oil viscosity, reference WLR, reference GVF, reference GHU, reference temperature data, reference pressure data, reference differential pressure data), reference flow rates 518D, and reference attenuation data 518E. In some examples, the reference data includes data determined by the one or more physics models. In some examples, the reference data includes measurements obtained by a second MPFM (e.g., the flowmeter 102 of FIG. 3B) coupled to the first pipe 222 (e.g. based on gamma ray system 316 in FIG. 3B) or by a test separator. In some other examples, the second MPFM or by the test separator is coupled to a second pipe different from the first pipe 222 with a second fluid flow through the pipe, where the phase mass flow rates of the second fluid are substantially the same as those of the fluid in the first pipe 222.

The reference database 518 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 518 may additionally or alternatively be implemented by one or more double data rate (DDR) memories, such as DDR, DDR2, DDR3, DDR4, mobile DDR (mDDR), etc. The database 518 may additionally or alternatively be implemented by one or more mass storage devices such as hard disk drive(s), compact disk drive(s), digital versatile disk drive(s), solid-state disk drive(s), etc. While in the illustrated example the database 518 is illustrated as a single database, the database 518 may be implemented by any number and/or type(s) of databases. Furthermore, the data stored in the database 518 may be in any data format such as, for example, binary data, comma delimited data, tab delimited data, structured query language (SQL) structures, etc. The database 518 may additionally or alternatively be implemented in the cloud.

While an example manner of implementing the fluid parameter controller 500 is illustrated in FIG. 5, one or more of the elements, processes and/or devices illustrated in FIG. 5 may be combined, divided, re-arranged, omitted, eliminated and/or implemented in any other way. Further, the example machine learning controller 502, the example physics model controller 504, the example model selector 506, the example intermediate output generator 508, the example flow rate generator 510, the example data processor 512, the example velocity calculator 514, the example frequency selector 516, the example reference database 518, and/or, more generally, the example fluid parameter controller 500 of FIG. 5 may be implemented by hardware, software, firmware and/or any combination of hardware, software and/or firmware. Thus, for example, any of the example machine learning controller 502, the example physics model controller 504, the example model selector 506, the example intermediate output generator 508, the example flow rate generator 510, the example data processor 512, the example velocity calculator 514, the example frequency selector 516, the example reference database 518 and/or, more generally, the example fluid parameter controller 500 of FIG. 5 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays(s) (FPGA(s)) and/or field programmable logic device(s) (FPLD(s)). When reading any of the apparatus or system claims of this patent to cover a purely software and/or firmware implementation, at least one of the example machine learning controller 502, the example physics model controller 504, the example model selector 506, the example intermediate output generator 508, the example flow rate generator 510, the example data processor 512, the example velocity calculator 514, the example frequency selector 516, the example reference database 518 and/or, more generally, the example fluid parameter controller 500 of FIG. 5 is/are hereby expressly defined to include a non-transitory computer readable storage device or storage disk such as a memory, a digital versatile disk (DVD), a compact disk (CD), a Blu-ray disk, etc. including the software and/or firmware. Further still, the example fluid parameter controller 500 of FIG. 5 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
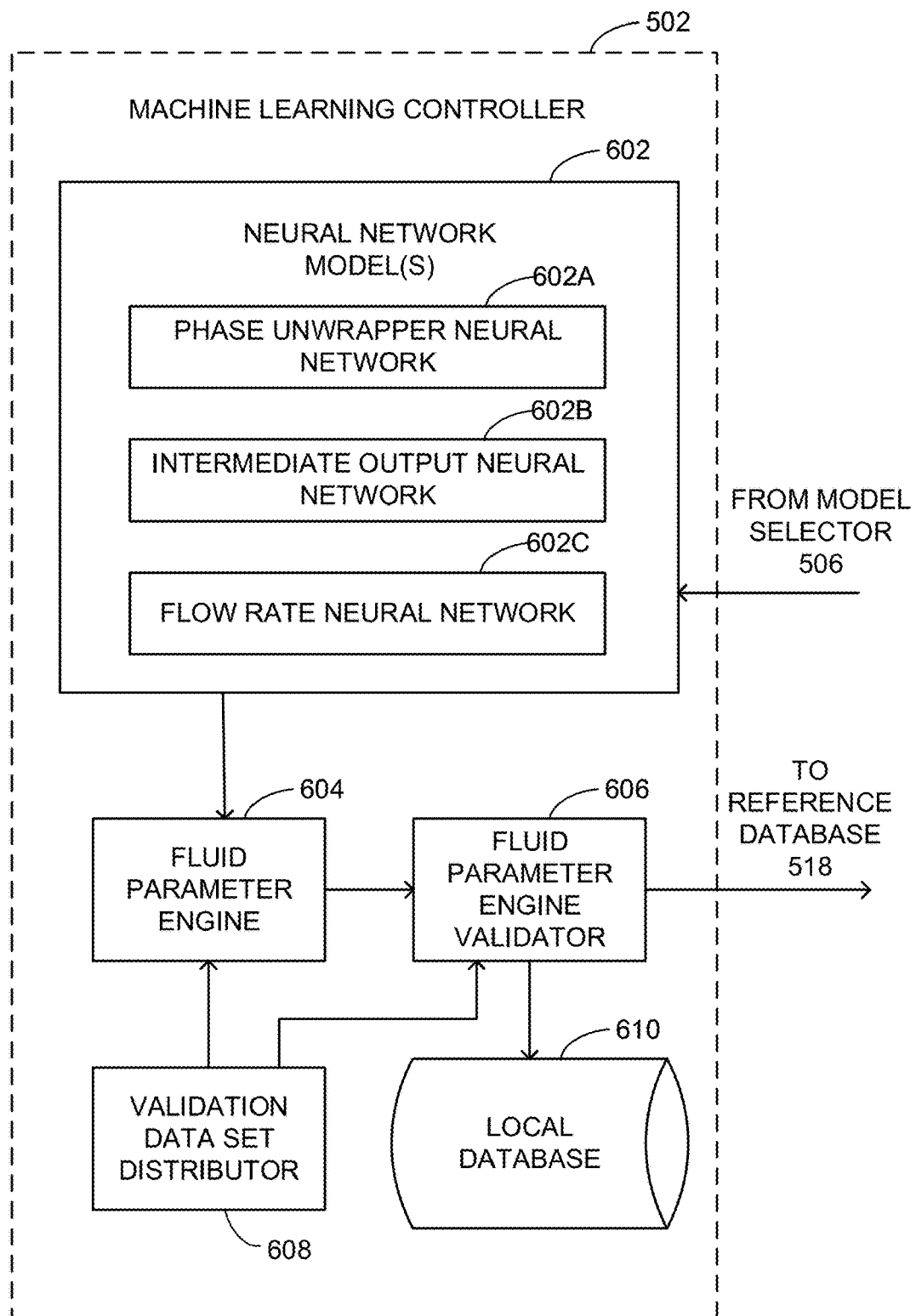
FIG. 6 is a block diagram of an example implementation of the machine learning controller of FIG. 5.

FIG. 6 is a block diagram of an example implementation of the example machine learning controller 502 of FIG. 5. In FIG. 6, the machine learning controller 502 includes one or more example neural network models 602, an example fluid parameter engine 604, an example fluid parameter engine validator 606, an example validation data set distributor 608, and an example local database 610.

In the illustrated example of FIG. 6, the one or more neural network models 602 can be invoked by at least one of the intermediate output generator 508, the flow rate generator 510, or the data processor 512. For example, at least one of the intermediate output generator 508, the flow rate generator 510, or the data processor 512 can instruct the model selector 506 to process data, calculate parameters, etc. In such examples, the model selector 506 can select the one or more neural network models 602 to process the data, calculate the parameters, etc. A different one of the neural network models 602 can be trained to output one or more of the fluid parameters, one or more of the flow rates, or the unwrapped phase shift values based on the input data from the model selector 506. The model selector 506 can determine which one(s) of the neural network models 602 can be used for obtaining a desired output, where the desired output can based on whether the model selector 506 is invoked by the intermediate output generator 508, the flow rate generator 510, or the data processor 512. For example, in response to the data processor 512 sending wrapped phase shift values to the model selector 506, the model selector 506 invokes a first neural network model 602A of the neural network models 602. In such examples, the first neural network model 602A is configured to determine the unwrapped phase shift data corresponding to the wrapped phase shift data.

In some examples, one(s) of the one or more neural networks 602 are artificial neural network(s). An artificial neural network is a computer system architecture model that learns to do tasks and/or provide responses based on evaluation or learning from examples having known inputs and known outputs. A neural network, such as the one or more neural networks 602 of the machine learning controller 502, features a series of interconnected nodes referred to as neurons or nodes. Input nodes are activated from an outside source/stimulus, such as input from the model selector 506. The input nodes activate other internal (e.g. hidden layer) network nodes according to connections between nodes (e.g., governed by machine parameters, prior relationships, etc.). The connections are dynamic and can change based on feedback, training, etc. By changing the number of hidden layers, number of nodes, and/or connections, an output of the one or more neural networks 602 can be improved or optimized to produce more/most accurate results. For example, a second one of the neural networks 602B can be trained using reference data to map input attenuation data and input unwrapped phase shift data to a determination of the one or more fluid parameters (e.g., WLR, GVF, etc.). In some examples, a third one of the neural networks 602C can be trained to map the one or more fluid parameters to a determination of one or more flow rates (e.g., using differential pressure data and/or the WLR and GVF determined by the trained second one of neural networks 602B). In some examples, other machine learning techniques can be implemented.

Machine learning techniques, whether neural networks, deep learning networks, support vector machines, and/or other experiential/observational learning system(s), can be used to generate optimal results. Deep learning is a subset of machine learning that uses a set of algorithms to model high-level abstractions in data (e.g., attenuation data, phase shift data, permittivity data, conductivity data, etc.) using a deep graph with multiple processing layers including linear and non-linear transformations. While many machine learning systems are seeded with initial features and/or network weights to be modified through learning and updating of the machine learning network, a deep learning network trains itself to identify good features for analysis. Using a multi-layered architecture, machines employing deep learning techniques can process raw data (e.g., raw attenuation data, raw phase shift data, etc.) or intermediate data (e.g., permittivity data, conductivity data, etc.) better than machines using conventional machine learning techniques. Examining data for groups of highly correlated values or distinctive themes is facilitated using different layers of evaluation or abstraction.

For example, deep learning that utilizes a convolutional neural network (CNN) segments data using convolutional filters to locate and identify learned, observable features in the data. Each filter or layer of the CNN architecture transforms the input data (e.g., the input data of FIGS. 7A and/or 8A) to increase the selectivity and invariance of the data. This abstraction of the data allows the machine to focus on the features in the data it is attempting to classify and ignore irrelevant background information.

Deep learning operates on the understanding that many data sets include high level features which include low level features. These hierarchies of features can be found in many different forms of data. Learned observable features include objects and quantifiable regularities learned by the machine during supervised learning. A machine provided with a large set of well-classified data is better equipped to distinguish and extract the features pertinent to successful classification of new data.

A deep learning machine that utilizes transfer learning can properly connect data features to certain classifications (e.g., classifications of FIG. 8A) affirmed by a human expert. Conversely, the same machine can, when informed of an incorrect classification by a human expert, update the parameters for classification. Settings and/or other configuration information, for example, can be guided by learned use of settings and/or other configuration information, and, as a system is used more (e.g., repeatedly and/or by multiple users), a number of variations and/or other possibilities for settings and/or other configuration information can be reduced for a given situation.

An example deep learning neural network can be trained on a set of expert classified data, for example. This set of data builds the first parameters for the neural network, and this would be the stage of supervised learning. During the stage of supervised learning, the neural network can be executed to determine whether the desired behavior has been achieved.

Once a desired neural network behavior has been achieved (e.g., a machine has been trained to operate according to a specified threshold, etc.), the machine can be deployed for use (e.g., testing the machine with measurement data from the flowmeter 102, etc.). During operation, neural network classifications can be confirmed or denied (e.g., by an expert user, expert system, reference database, etc.) to continue to improve neural network behavior. The example neural network is then in a state of transfer learning, as parameters for classification that determine neural network behavior are updated based on ongoing interactions. In certain examples, the neural network, such as one of the neural networks 602, can provide direct feedback to another process, such as a fluid parameter engine 604, etc. In certain examples, the one of the neural networks 602 outputs data that is buffered (e.g., via the cloud, etc.) and validated before it is provided to another process.

In the illustrated example of FIG. 6, the machine learning controller 502 includes the one or more neural networks 602 to receive input(s) from the model selector 506. The model selector 506, upon being invoked by the intermediate output generator 508, the flow rate generator 510, or the data processor 512, can retrieve the corresponding reference data (e.g., the reference unwrapped phase shift data 518A, the reference wrapped phase shift data 518B, the reference intermediate outputs 518C, the reference flow rates 518D, the reference attenuation data 518E) from the reference database 518. For example, in response to the data processor 512 invoking the model selector 506, the model selector 506 retrieves reference wrapped phase shift data 518B and corresponding reference unwrapped phase shift data 518A as input to the first neural network 602A of the one or more neural network models 602. The first neural network 602A, through a comparison of the reference wrapped phase shift data 518B and the corresponding reference unwrapped phase shift data 518A, outputs a first algorithm (e.g., a trained phase unwrapper neural network) to the fluid parameter engine 604 to determine (e.g., predict) unwrapped phase shift values based on wrapped phase shift measurements of the microwave antennas 206 of FIG. 3A.

In the illustrated example, in response to the intermediate output generator 508 invoking the model selector 506, the model selector 506 can retrieve reference attenuation data, reference phase shift data, reference temperature data, reference pressure data, and reference differential pressure data and corresponding reference fluid parameters (e.g., reference mixture permittivity, reference mixture conductivity, reference mixture density, reference water permittivity, reference water conductivity, reference water density, reference oil viscosity, reference oil permittivity, reference oil density, reference gas density, reference water-liquid ratio, reference gas holdup, reference gas volume fraction, reference mixture density) from the reference database 518. The model selector 506 can transmit the retrieved data as input(s) to a second neural network 602B of the one or more neural network models 602. The second neural network 602B, through a comparison of the reference attenuation data, the reference phase shift data, the reference temperature data, the reference pressure data, and the reference differential pressure data and the corresponding reference fluid parameters, outputs a second algorithm (e.g., a trained intermediate output neural network) to the fluid parameter engine 604 to determine (e.g., predict) fluid parameter values based on attenuation measurements of the microwave antennas 206 and/or the microwave reflection sensor 304, determined unwrapped phase shift values of the data processor 512, and the temperature measurements, pressure measurements, and differential pressure measurements of the Venturi meter 302 of FIG. 3A and the temperature sensor 224 of FIG. 2.

In the illustrated example, in response to the flow rate generator 510 invoking the model selector 506, the model selector 506 can retrieve the reference fluid parameters, the reference differential pressure data, and reference velocity data and corresponding reference flow rates (e.g., reference mixture flow rate, reference water flow rate, reference oil flow rate, reference gas flow rate) as input to a third neural network 602C of the one or more neural network models 602. The third neural network 602C, through a comparison of the reference fluid parameters, the reference differential pressure data, and the reference velocity data and the corresponding reference flow rates, outputs a third algorithm (e.g., a trained flow rate neural network) to the fluid parameter engine 604 to determine (e.g., predict) flow rate values based on determined fluid parameter values of the intermediate output generator 508, differential pressure measurements of the Venturi meter 302, and determined velocity values of the velocity calculator 514.

The first neural network 602A, the second neural network 602B, and/or the third neural network 602C can be seeded with initial correlations and can then learn from ongoing experience. In some examples, the first neural network 602A, the second neural network 602B, and/or the third neural network 602C continuously receive feedback from the reference database 518 via the model selector 506. In some examples, the first neural network 602A, the second neural network 602B, and/or the third neural network 602C may be combined as single (e.g., unified) neural network.

In some examples, the trained first neural network 602A, the trained second neural network 602B, and/or the trained third neural network 602C (e.g., the trained phase unwrapper neural network, trained intermediate output neural network, and/or the trained flow rate neural network, respectively) are validated using a second portion of input data from the reference database 518 different from the first portion of input data from the reference database 518 used to train the first neural network 602A, the second neural network 602B, and/or the third neural network 602C. For example, 80% of the input data can be used to train the first neural network 602A, the second neural network 602B, and/or the third neural network 602C and 20% of the input data can be used to validate the trained first neural network 602A, the trained second neural network 602B, and/or the trained third neural network 602C deployed to the fluid parameter engine 604. In some examples, a k-fold cross-validation statistical method is used to more representatively train and validate the neural networks 602, resulting in a less biased estimate of machine learning model(s) than other methods, such as a simple train/test split. An appropriately chosen value for k results in a good representation of each train/test group of data samples, such that each train/test group of data samples is large enough to be statistically representative of the broader dataset.

In some examples, the machine learning controller 502 executes a validation process by including a validation data set distributor 608 to distribute validation input data to the fluid parameter engine 604 and to a fluid parameter engine validator 606. Further, the validation data set distributor 608 can distribute known results (e.g., the known unwrapped phase shift values, the known fluid parameter values, and/or the known flow rate values) corresponding to the validation input data to the fluid parameter engine validator 606. The fluid parameter engine 604, using the currently deployed first trained neural network 602A, the second trained neural network 602B, or the third trained neural network 602C, can determine predicted results (e.g., predicted unwrapped phase shift values, predicted fluid parameter values, or predicted flow rate values) based on the validation input data and can distribute the determinations to the fluid parameter engine validator 606.

The fluid parameter engine validator 606 can receive the known results from the validation data set distributor 608 and the determined (e.g., predicted) results from the fluid parameter engine 604. The fluid parameter engine validator 606 can compare the predicted results to the known results to determine a portion of the results that the fluid parameter engine 604 predicted correctly. For example, the fluid parameter engine validator 606 can determine a percentage (e.g., 98% correct, 90% correct, 40% correct, etc.) of the results the fluid parameter engine 604 predicted correctly and compare the percentage to a threshold. In some examples, root-mean-square error (RMSE) is used as a measure of the differences (e.g., deviations, residuals) between the results predicted by a model (e.g. a machine learning model) and the known (e.g. reference) results.

In some examples, the threshold is a predetermined value that is static throughout the operation of the fluid parameter controller 500. In some examples, the threshold is a dynamic value that varies with the quantity of training data that is used by the one or more neural networks 602 to generate the first neural network 602A, the second neural network 602B, and/or the third neural network 602C deployed by the fluid parameter engine 604. In some examples, the fluid parameter engine validator 606 uses a different threshold to validate each of the one or more neural network models 602. In some examples, in response to the result satisfying the threshold (e.g., the result is greater than the threshold, the result is less than the threshold, etc.), the first neural network 602A is deployed to the data processor 512, the second neural network 602B is deployed to the intermediate output generator 508, and/or the third neural network 602C is deployed to the flow rate generator 510 of FIG. 5. In some examples, in response to the result not satisfying the threshold, the fluid parameter engine validator 606 notifies the one or more neural networks 602 that further training/re-training is required.

In some examples, once the first neural network 602A, the second neural network 602B, and the third neural network 602C reach and/or otherwise satisfy a desired level of accuracy (e.g., the result satisfies the threshold), the fluid parameter engine validator 606 can deploy the first neural network 602A to the data processor 512, the second neural network 602B to the intermediate output generator 508, and the third neural network 602C to the flow rate generator 510. Alternatively, in the illustrated example of FIG. 6, the fluid parameter engine validator 606 stores the first neural network 602A, the second neural network 602B, and the third neural network 602C in the reference database 518 from which the data processor 512, the intermediate output generator 508, and the flow rate generator 510 can deploy the corresponding neural network. In the illustrated example of FIG. 6, throughout the operational life of the machine learning controller 502, the one or more neural networks 602 are continuously trained via feedback (e.g., additional measured input data or determined input data) and the fluid parameter engine 604 can be updated based on one or more updated trained neural networks generated by the one or more neural networks 602.

In some examples, once the fluid parameter engine validator 606 validates (e.g., accepts) the one or more trained neural networks, at least one of the trained neural networks deployed from the neural networks 602, neural network output determinations as determined by the fluid parameter engine 604, and/or network validation data as determined by the fluid parameter engine validator 606 can be stored in a local database 610, included in or otherwise implemented by the machine learning controller 502. In some examples, the local database 610 can be implemented by a volatile memory (e.g., an SDRAM, DRAM, RAMBUS RDRAM, etc.) and/or a non-volatile memory (e.g., flash memory). The local database 610 can additionally or alternatively be implemented by one or more DDR memories such as DDR, DDR2, DDR3, mDDR, etc. The local database 610 can additionally or alternatively be implemented by one or more mass storage devices such as hard disk drive(s), compact disk drive(s), digital versatile disk drive(s), etc. While in the illustrated example the local database 610 is illustrated as a single database, the local database 610 can be implemented by any number and/or type(s) of databases. Further, the data stored in the local database 610 can be in any format such as binary data, comma delimited data, tab delimited data, structured query language (SQL) structures, etc.

While an example manner of implementing the machine learning controller 502 of FIG. 5 is illustrated in FIG. 6 one or more of the elements, processes and/or devices illustrated in FIG. 6 may be combined, divided, re-arranged, omitted, eliminated and/or implemented in any other way. Further, the example neural network model(s) 602, the example fluid parameter engine 604, the example fluid parameter engine validator 606, the example validation data set distributor 608, the example local database 610, and/or, more generally, the example machine learning controller 502 of FIG. 6 may be implemented by hardware, software, firmware and/or any combination of hardware, software and/or firmware. Thus, for example, any of the neural network model(s) 602, the example fluid parameter engine 604, the example fluid parameter engine validator 606, the example validation data set distributor 608, the example local database 610, and/or, more generally, the example machine learning controller 502 of FIG. 6 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate array(s) (FPGA(s)), and/or field programmable logic device(s) (FPLD(s)). When reading any of the apparatus or system claims of this patent to cover a purely software and/or firmware implementation, at least one of the example neural network model(s) 602, the example fluid parameter engine 604, the example fluid parameter engine validator 606, the example validation data set distributor 608, the example local database 610, and/or, more generally, the example machine learning controller 502 of FIG. 6 is/are hereby expressly defined to include a non-transitory computer readable storage device or storage disk such as a memory, a digital versatile disk (DVD), a compact disk (CD), a Blu-ray disk, etc. including the software and/or firmware. Further still, the example machine learning controller 502 of FIG. 5 may include one or more elements, processes and/or devices in addition to, or instead of, those illustrated in FIG. 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7A:
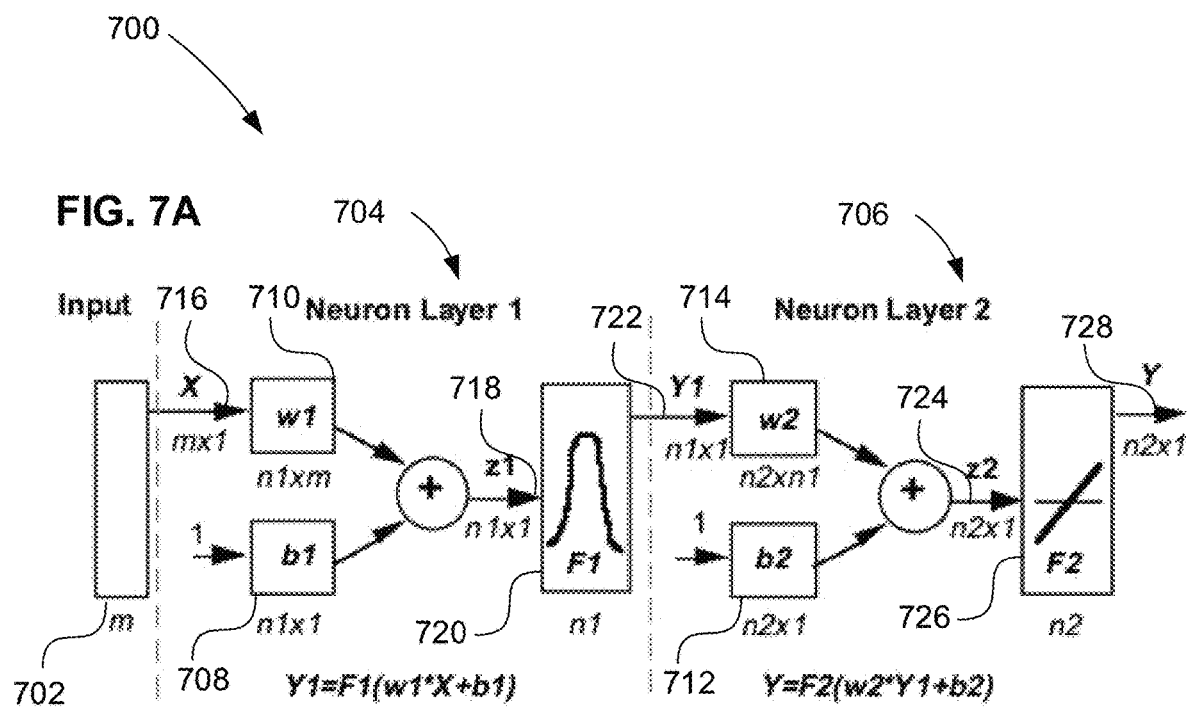
FIG. 7A is a block diagram of an example two-layer neural network model implemented by the machine learning controller of FIGS. 5 and/or 6.

FIG. 7A is a block diagram of an example 2-layer neural network model 700 implemented by the machine learning controller 502 of FIGS. 5 and/or 6. In some examples, the 2-layer neural network model 700 is used for the second neural network of the machine learning controller 502 of FIG. 2. In the illustrated example of FIG. 7A, network inputs 702 include the attenuation data and unwrapped phase shift from the microwave antennas 206 and/or permittivity and conductivity data based on the microwave reflection sensor 304 of FIG. 3A. In some examples, the attenuation data, unwrapped phase shift, the permittivity, and the conductivity data includes time-averaged data M and their respective statistics data δM (e.g., standard deviation, skewness, kurtosis) based on the signals received at the microwave antennas 206 and/or the microwave reflection sensor 304. In some examples, the network inputs 702 further include at least one of the temperature data, the pressure data, and the differential pressure data determined by the temperature sensor 224 of FIG. 2 and/or the Venturi meter 302 of FIG. 3A.

In the illustrated example of FIG. 7A, the 2-layer neural network model 700 includes a first neuron layer (e.g., Neuron Layer 1) 704 and a second neuron layer (e.g., Neuron Layer 2) 706. The first neuron layer 704 includes n1 first neurons, a first bias vector b1 708, and a first weight matrix w1 710. Further, the second neuron layer 706 includes n2 second neurons, a second bias vector b2 712, and a second weight matrix w2 714. The network inputs 702 are described by a network input vector X 716 with vector size m-by-1, where m is the number of inputs (e.g., data points) of the network inputs 702. In the first neuron layer 704, each element of the input vector X 716 is coupled to each of the n1 first neurons through the first weight matrix w1 710, where a size of the first weight matrix 710 is n1-by-m and n1 is the number of first neurons. In Equation 1, the first neuron layer 704 determines a product of the network input vector X and the first weight matrix w1 710, then adds the product to the first bias vector b1 708, where a size of the first bias vector b1 708 is n1-by-1. A result of the determination is a first vector output z1 718 of size n1-by-1. Further, in Equation 2, the first neuron layer 704 performs a mathematical transformation on the first vector output z1 718 using a first transfer function F1 720 to determine a first output vector Y1 722 associated with the first neuron layer 704, where a size of the first output vector Y1 722 is n1-by-1.

$$z1 = w1*X + b1 \quad \text{Equation 1:}$$

$$Y1 = F1(z1) \quad \text{Equation 2:}$$

In the illustrated example of FIG. 7A, the first output vector Y1 722 is an input to the second neuron layer 706. In the second neuron layer 706, each element of the first output vector Y1 722 is coupled to each of the n2 second neurons through the second weight matrix w2 714, where a size of the second weight matrix w2 714 is n2-by-n1 and n2 is the number of second neurons. In Equation 3, the second neuron layer 706 determines a product of the first output vector Y1 722 and the second weight matrix w2 714, then adds the product to the second bias vector b2 712, where a size of the second bias vector b2 712 is n2-by-1. A result of the determination is a second vector output z2 724 of size n2-by-1. Further, in Equation 4, the second neuron layer 706 performs a mathematical transformation on the second vector output z2 724 using a second transfer function F2 726 to determine a second output vector Y 728, where a size of the second output vector Y 728 is n2-by-1.

$$z2 = w2*Y1 + b2 \quad \text{Equation 3:}$$

$$Y = F2(z2) \quad \text{Equation 4:}$$

In the illustrated example, the first transfer function F1 720 is a sigmoid transfer function and the second transfer function F2 726 is a linear transfer function. In some examples, the first transfer function 720 and the second transfer function 726 can be any type of transfer function(s) such as linear, sigmoid, radial basis, nonlinear, etc. Multiple layers give a network greater deep-learning power and flexibility. For example, any function with a finite number of discontinuities can be approximated by a 2-layer network. An example 2-layer network is a standard backpropagation network (BPN), where the BPN includes a sigmoid layer followed by a linear output layer. In the illustrated example of FIG. 7A, the 2-layer neural network model 700 is a radial basis network (RBN). The RBN architecture uses less memory and less time to train than the BPN when many training vectors are available, which is typical of the data generated by the microwave antennas 206 and/or the microwave reflection sensor 304.

Figure 7B:
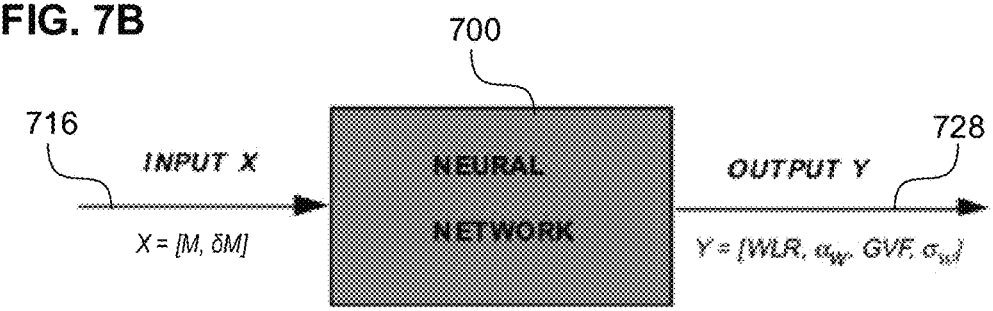
FIG. 7B is a block diagram of the example two-layer neural network model of FIG. 7A having generalized layers.

FIG. 7B is a block diagram of the example 2-layer neural network model 700 of FIG. 7A with the layers generalized. In the illustrated example, the input vector X 716 includes the time-averaged attenuation data, the unwrapped phase shift data, the permittivity, and the conductivity data M, and their respective time-series statistics data δM (e.g. standard deviation, skewness, kurtosis). In some examples, the input vector X 716 may include differential pressure data from the Venturi meter 302 and/or velocity data from the velocity calculator 514. In the illustrated example, the output vector Y 728 includes determined (e.g., predicted) values of water-liquid ratio (WLR), water fraction $\alpha_w$, gas volume fraction (GVF), and water conductivity $\sigma_w$. In other examples, the 2-layer neural network model 700 of FIGS. 7A and/or 7B can be configured to output at least one of the fluid parameters or the one or more flow rates associated with the fluid. In the illustrated example of FIG. 7B, the 2-layer neural network model 700 is implemented as a BPN. In other examples, the 2-layer neural network model 700 can be implemented using any neural network model with two or more layers.

Figure 8A:
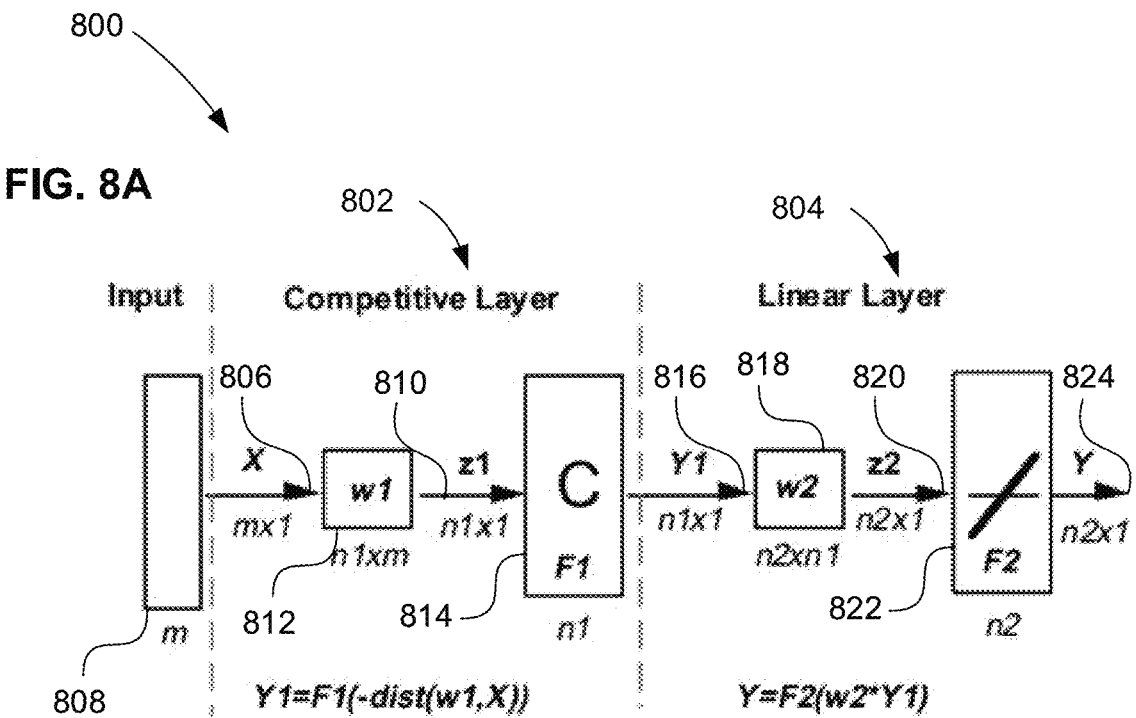
FIG. 8A is a block diagram of an example Learning Vector Quantization (LVQ) neural network model implemented by the example machine learning controller of FIGS. 5 and/or 6.

FIG. 8A is a block diagram of an example Learning Vector Quantization (LVQ) neural network model 800 for phase unwrapping that can be implemented by the example machine learning controller 502 of FIGS. 5 and/or 6. The LVQ neural network model 800 of FIG. 8A includes a competitive layer 802 with n1 neurons and a linear layer 804 with n2 neurons. The competitive layer 802 detects regularities and correlations in an input vector X 806. In the illustrated example, the input vector X 806 includes a time-series of reference phase shift values $\phi_r$ and a time series of to-be-unwrapped phase shift values $\phi_x$, where the input vector X 806 has a size m-by-1 and where m is the number of input values. The n1 neurons of the competitive layer 802 distribute themselves to identify n1 groups (e.g., competitive layer classes, subclasses) of similar input within an input space 808 represented by the input vector X 806, where each neuron of the n1 neurons corresponds to a respective one of the competitive layer classes.

In Equation 5, the competitive layer 802 computes a net input vector z1 810 by finding the negative distance between the input vector X 806 and each row of a n1-by-m weight matrix w1 812, where an i-th row of the weight matrix w1 812 is a weight vector corresponding to an i-th neuron of the n1 neurons (e.g., n1($i$)). The net input vector z1 810 is an input to the competitive transfer function F1 (e.g., C) 814. The competitive transfer function F1 814 selects the neuron n1($i$) whose weight vector is closest to the input vector X 806 (e.g., the neuron n1($i$) that has the least negative distance). In Equation 6, the competitive transfer function 814 sets the i-th element (e.g., the element corresponding to neuron n1($i$)) of an output vector Y1 816 to be 1 and sets all other elements to be zero, where the output vector Y1 816 is of size n1-by-1. The output vector Y1 816 is an input to the linear layer 804.

$$z1 = -\text{dist}(w1, X) \quad \text{Equation 5:}$$

$$Y1 = F1(z1) \quad \text{Equation 6:}$$

The linear layer 804 transforms the n1 competitive layer classes into n2 user-defined target classes, where each of the target classes corresponds to one of the n2 linear neurons of the linear layer 804. In the illustrated example of FIG. 8A, where the LVQ neural network model 800 is implemented for phase unwrapping, each of the n2 target classes corresponds to a degree of wrapping for the to-be-unwrapped phase shift values. For example, target classes G1, G2, and G3 can correspond to 0 degree, 360 degrees, and 720 degrees of wrapping, respectively. In other words, to determine unwrapped phase shift values, the data processor 512 of FIG. 5 adds 0 degree to the phase shift values of G1, 360 degrees to the phase shift values of G2, and 720 degrees to the phase shift values of G3.

The linear layer 804 combines the n1 competitive layer classes into the n2 target classes based on the output vector Y1 816. For example, in response to the linear layer 804 determining that competitive layer classes C1, C2, and C3 are of the target class G2, the linear layer 804 sets weights corresponding to G2 to 1 and weights corresponding to G1 and G3 as zero. The weights are described using an n2-by-n1 linear layer weight matrix w2 818. In Equation 7, the linear layer 804 multiplies the linear layer weight matrix w2 818 by the output vector Y1 816 to determine the linear neuron output z2 820, where z2 820 is of size n2-by-1. In Equation 8, the linear layer 804 transforms the linear neuron output z2 820 using a linear transfer function F2 822 to determine a linear layer output Y 824. In the illustrated example of FIG. 8A, the linear layer output Y 824 is a grouping of the to-be-unwrapped phase shift values.

$$z2 = w2 * Y1 \quad \text{Equation 7:}$$

$$Y = F2(z2) \quad \text{Equation 8:}$$

Figure 8B:
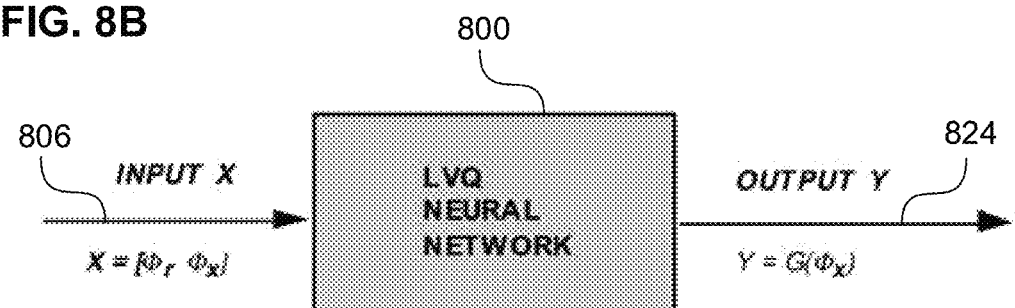
FIG. 8B is a block diagram of an example Learning Vector Quantization (LVQ) neural network model of FIG. 8A having generalized layers.

FIG. 8B is a block diagram of the example LVQ neural network model 800 of FIG. 8A with the layers generalized. In the illustrated example, the input vector X 806 includes the time-series of reference phase shift values $\phi_r$ and the time series of to-be-unwrapped phase shift values $\phi_x$. In the illustrated example, the output vector Y 824 includes the grouping of the to-be-unwrapped phase shift values, where each group corresponds to a degree of wrapping (e.g., 0 degree, 360 degrees, 720 degrees, etc.) of the phase shift values. In some examples, a different neural network model can be used instead of the LVQ neural network model 800.

Figure 9:
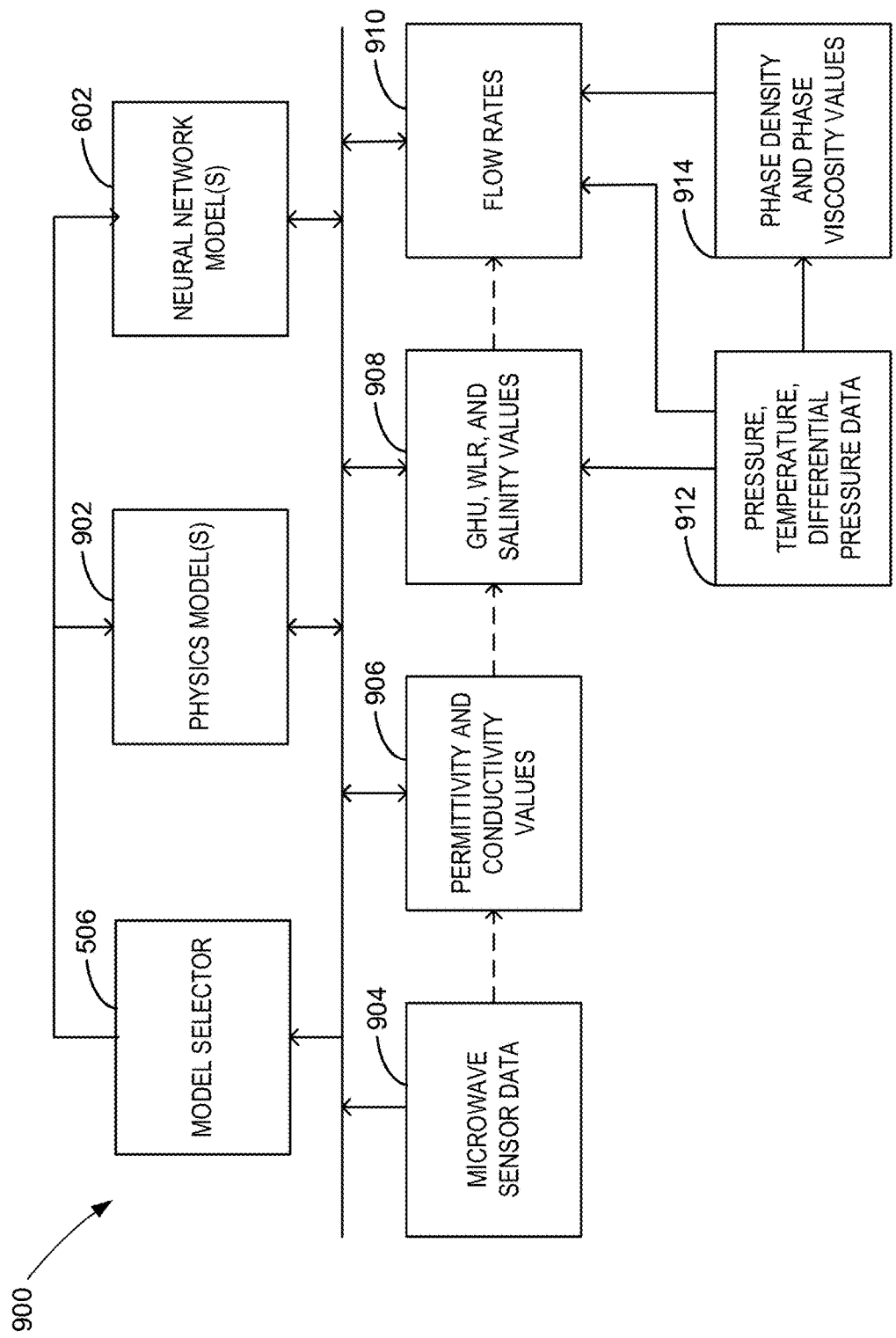
FIG. 9 is a block diagram of a first example data interpretation workflow of the example multiphase flowmeter of FIGS. 1, 2, 3A and/or 3B implementing example neural network models and example physics models.

FIG. 9 is a block diagram of a first example data interpretation workflow 900 of the example flowmeter 102 of FIGS. 1, 2, 3A and/or 3B implementing the example neural network models 602 of FIG. 6 and example physics models 902. The example model selector 506 of FIG. 5 selects between the one or more neural network models 602 and/or the one or more physics models 902 to determine at least one of example permittivity and conductivity values 906, example GHU, WLR, and salinity values 908, or example flow rates 910. The physics models 902 and/or the neural network models 602 receive input data that includes at least one of example microwave sensor data 904, example pressure, temperature, and differential pressure data 912, or example phase density and phase viscosity values 914 to determine at least one of the fluid parameters (e.g., the permittivity and conductivity values 906, the GHU, WLR, and salinity values 908, or the flow rates 910). In some examples, additionally or alternatively, the GHU, WLR, and salinity values 908 can include a GVF value and/or a water conductivity value.

In the illustrated example of FIG. 9, the microwave sensor data 904 includes attenuation data and unwrapped phase shift data measured by at least one of the microwave antennas 206 or the microwave reflection sensor 304. In some examples, the attenuation data and unwrapped phase shift data of the microwave sensor data 904 includes time-series time-averaged data and/or time-series statistics data (e.g., standard deviation, skewness, kurtosis).

In the illustrated example of FIG. 9, the physics models 902 and/or the neural network models 602 determine the permittivity and the conductivity values 906 based on the microwave sensor data 904. In some examples, the permittivity and the conductivity values 906 include at least one of a mixture permittivity, a water permittivity, an oil permittivity, a mixture conductivity, or a water conductivity associated with the fluid flowing through the flowmeter 102.

In the illustrated example of FIG. 9, additionally or alternatively, the physics models 902 and/or the neural network models 602 determine the GHU, the WLR, and the salinity values 908 based on the permittivity and the conductivity values 906, the pressure data, the temperature data, and the differential pressure data 912, and/or the microwave sensor data 904. In some examples, the temperature sensor 224 of FIG. 2 and the Venturi meter 302 of FIG. 3A determine the pressure data, the temperature data, and the differential pressure data 912.

In the illustrated example of FIG. 9, additionally or alternatively, the physics models 902 and/or the neural network models 602 determine the one or more flow rates 910 based on the GHU, the WLR, and the salinity values 908, the pressure data, the temperature data, and the differential pressure data 912, and the phase density and the phase viscosity values 914. In the illustrated example, the one or more flow rates 910 include at least one of a mixture flow rate, a water flow rate, an oil flow rate, or a gas flow rate associated with the fluid through the flowmeter 102.

In the illustrated example of FIG. 9, one or more pressure-volume-temperature (PVT) models determine the phase density and the phase viscosity values 914 based on the pressure data, the temperature data, and the differential pressure data 912. In some examples, the phase density and the phase viscosity values 914 include at least one of a mixture density, a water density, an oil density, a gas density, a mixture viscosity, or an oil viscosity associated with the fluid.

In the illustrated example of FIG. 9, the model selector 506 invokes one of the physics models 902 or one of the neural network models 602 based on the input data received at the model selector 504. For example, in response to the model selector 506 receiving the microwave sensor data 904, the model selector 506 invokes a first model, where the first model is configured to determine the permittivity and the conductivity values 906 based on the microwave sensor data 904. Further, in response to the model selector 506 receiving the determined permittivity and the conductivity values 906, the model selector 506 invokes a second model, where the second model is configured to determine the GHU, the WLR, and the salinity values 908 based on the determined permittivity and the conductivity values 906. Further, in response to the model selector 506 receiving the determined GHU, the WLR, and the salinity values 908, the model selector 506 invokes a third model, where the third model is configured to determine the flow rates 910 based on the determined GHU, the WLR, and the salinity values 908.

In some examples, the first model, the second model, and the third model are one of the physics models 902 or one of the neural network models 602. In some examples, the first model, the second model, and the third model are a combination of one or more of the physics models 902 and one or more of the neural network models 602. In some examples, the model selector 506 can be configured to first select one of the physics models 902 of the physics model controller 504 of FIG. 5 as the first model, the second model, or the third model. The physics model controller 504, in response to being invoked by the model selector 506, executes the first model, the second model, or the third model to determine a first output of the first model, the second model, or the third model.

The model selector 506 determines whether the first output satisfies a threshold. For example, the model selector 506 determines whether the first output is within an expected range of values, where the expected range of values is based on reference data of the reference database 518 of FIG. 5 and/or a user provides the expected range of values to the model selector 506 upon initialization of the flowmeter 102. In response to the first output satisfying the threshold (e.g., the expected range of values), the model selector 506 selects the first output as an output to the first model, the second model, or the third model. Alternatively, in response to the first output not satisfying the threshold, the model selector 506 invokes the machine learning controller 502 of FIG. 5 and/or 6 and executes one of the one or more neural network models 602 to determine a second output. The model selector 506 selects the second output as the output to the first model, the second model, or the third model instead of the first output. In some examples, the model selector 506 determines the first output based on the neural network models 602 and the second output based on the physics models 902.

Figure 10:
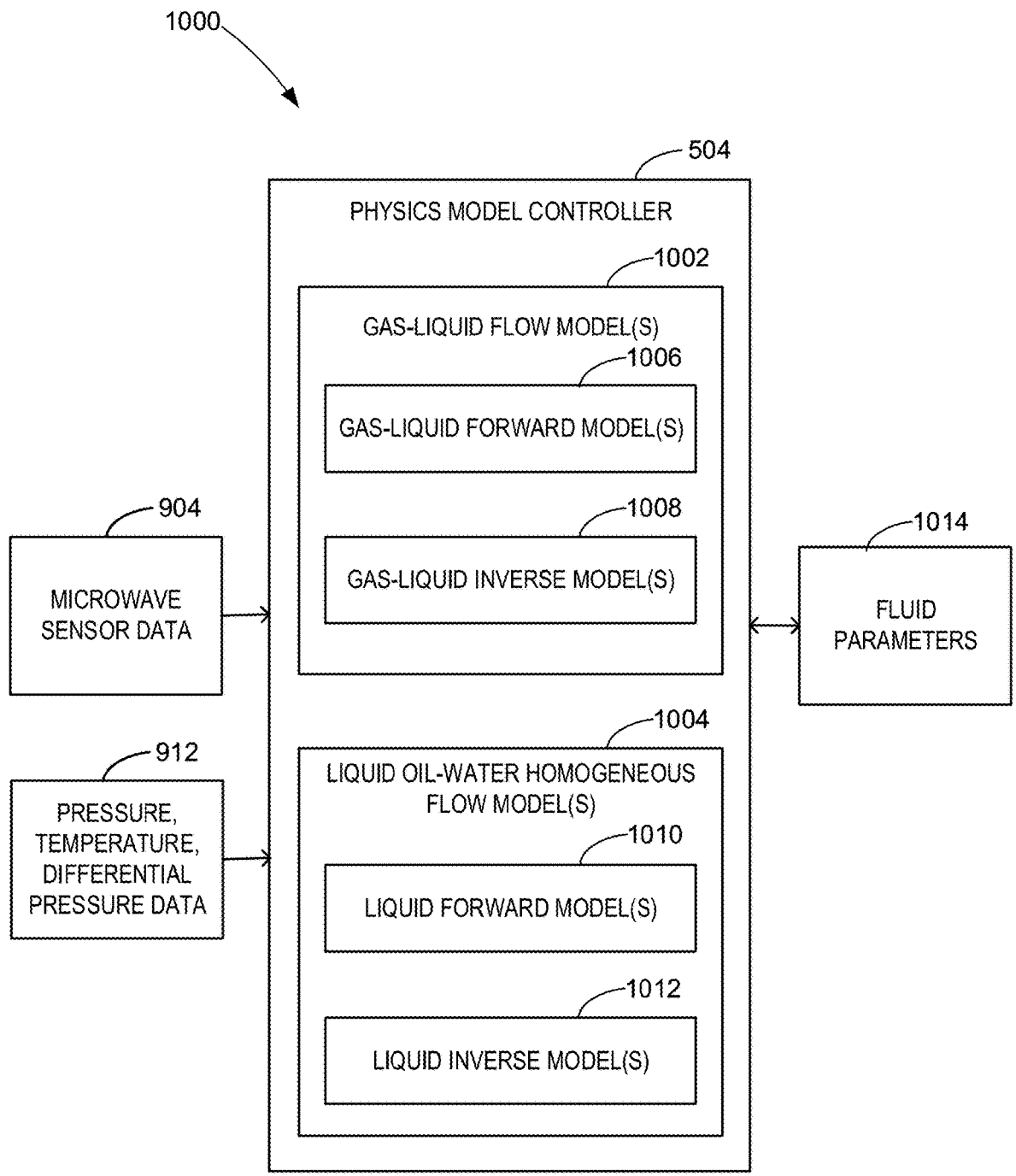
FIG. 10 is a block diagram of an example implementation of the physics model controller of FIG. 5.

FIG. 10 is a block diagram of an example implementation 1000 of the physics model controller 504 of FIG. 5. The physics model controller 504 includes gas-liquid flow models (e.g., gas-liquid models) 1002 and liquid oil-water homogeneous flow models (e.g., liquid homogeneous flow models, oil-water models, liquid models) 1004. The gas-liquid models 1002 further include gas-liquid forward models 1006 and gas-liquid inverse models 1008 corresponding to gas-liquid flow. The liquid models 1004 further include liquid forward models 1010 and liquid inverse models 1012 corresponding to liquid oil-water homogeneous flow. The physics model controller 504 executes one or more of the gas-liquid flow models 1002 and/or the liquid flow models 1004 to determine one or more fluid parameters 1014 based on the microwave sensor data 904 and the pressure data, the temperature data, and the differential pressure data 912 of FIG. 9. In some examples of FIG. 10, the gas-liquid inverse models 1008 or the liquid inverse models 1012 are iterative calculation models, including as part of respective iterative calculation processes the use of the gas-liquid forward models 1006 or the liquid forward models 1010.

In the illustrated example of FIG. 10, the microwave sensor data 904 is an input to at least one of the gas-liquid inverse models 1008 or the liquid inverse models 1012. In some examples, the input further includes at least one of configuration of the microwave antennas 206 (e.g., location of the microwave transmitter antenna(s) 306, the second microwave transmitter antenna(s) 310, the microwave receiver antennas 308, and/or the second microwave receiver antennas 312 of FIG. 3A on the pipe throat 205 of the first pipe 222), a size of the pipe throat 205 of the first pipe 222, a signal radio frequency $f$ of one or more signals transmitted by the microwave transmitter antennas 306 and/or the second microwave transmitter antennas 310, or a pressure P and/or a temperature T of the pressure data, temperature data, and differential pressure data 912 of FIG. 9. In some examples, additionally or alternatively, the input further includes reference data from the reference database 518 of FIG. 5, the reference data to include at least one of reference WLR, reference GHU, or reference salinity associated with the fluid.

In the illustrated example of FIG. 10, the fluid parameters include 1014 include at least one of the permittivity and the conductivity values 906 or the gas holdup, the water-liquid ratio, and the salinity values 908 of FIG. 9. In the illustrated example, the physics model controller 504 generates the fluid parameters 1014 as an output in response to executing at least one of the gas-liquid flow models 1002 or the liquid oil-water homogeneous flow models 1004.

In the illustrated example of FIG. 10, the physics model controller 504 executes one of the gas-liquid flow models 1002 in response to determining that the flow through the flowmeter 102 is gas-liquid flow. For example, the physics model controller 504 determines that the flow is gas-liquid flow in response to the standard deviation in the microwave sensor data 904 being higher than a typical standard deviation associated with a vertical oil-water liquid flow. In Equation 9, the physics model controller 504 executes a first gas-liquid inverse model $F_L^{-1}$ of the gas-liquid inverse models 1008 to determine apparent mixture permittivity $\varepsilon_m$ and apparent mixture conductivity $\sigma_m$ based on attenuation data AT and unwrapped phase shift data PS of the microwave sensor data 904 for a gas-liquid flow distribution. In Equation 10, the physics model controller 504 executes a second gas-liquid inverse model $G_m^{-1}$ to determine the gas-liquid flow water-liquid ratio WLR and the gas holdup GHU based on the determined mixture permittivity $\varepsilon_m$, the determined mixture conductivity $\sigma_m$, and known or determined water permittivity $\varepsilon_w$, water conductivity $\sigma_w$, and oil permittivity $\varepsilon_o$. In examples with an oil-continuous gas-liquid flow, the physics model controller 504 executes the second gas-liquid inverse model $G_m^{-1}$ with phase shift data PS being substantially 0 degrees. Alternatively, in examples with a water-continuous gas-liquid flow, the physics model controller 504 executes the second gas-liquid inverse model $G_m^{-1}$ with PS substantially above zero degrees. In some examples, a lookup table LUT stores values of the salinity s corresponding to a mixture conductivity-permittivity ratio $\sigma_m/\varepsilon_m$, the temperature T and the pressure P. In Equation 11, the physics model controller 504 interpolates between values of the lookup table LUT to determine the salinity s (e.g., for water-continuous flow).

$$(\varepsilon_m, \sigma_m) = F_L^{-1}(AT, PS) \qquad \text{Equation 9:}$$

$$(WLR, GHU) = G_m^{-1}(\varepsilon_m, \sigma_m; [\varepsilon_w, \sigma_w], \varepsilon_o) \qquad \text{Equation 10:}$$

$$s = LUT(\sigma_m/\varepsilon_m; T, P) \qquad \text{Equation 11:}$$

In the illustrated example of FIG. 10, the physics model controller 504, additionally or alternatively, executes one or more of the gas-liquid forward models 1006 to determine one of the fluid parameters 1014 based on the reference data from the reference database 518. In particular, the physics model controller 504 executes a first gas-liquid forward model $G_m$ of Equation 12 to determine effective mixture permittivity $\varepsilon_m$ and effective mixture conductivity $\sigma_m$ of a gas-liquid flow distribution based on the reference WLR, the reference GHU, and a water permittivity $\varepsilon_w$, a water conductivity $\sigma_w$, and an oil permittivity $\varepsilon_o$. In the illustrated example, the first gas-liquid forward model $G_m$ is an explicit or implicit dielectric mixing law (e.g., oil-continuous or water-continuous gas-liquid dielectric mixing law). Additionally or alternatively, the physics model controller 504 executes a second gas-liquid forward model $F_{GL}$ of Equation 13 to determine the attenuation data AT and the phase shift data PS based on the determined effective mixture permittivity $\varepsilon_m$ and the determined effective mixture conductivity $\sigma_m$ from Equation 12.

$$[\varepsilon_m, \sigma_m] = G_m(WLR, GHU; [\varepsilon_w, \sigma_w], \varepsilon_o) \qquad \text{Equation 12:}$$

$$(AT, PS) = F_{GL}(\varepsilon_m, \sigma_m) \qquad \text{Equation 13:}$$

In the illustrated example, the physics model controller 504 determines the water permittivity $\varepsilon_w$ and the water conductivity $\sigma_w$ (e.g., for use in the gas-liquid inverse model of Equation 10 above and/or the gas-liquid forward model of Equation 12 above from the gas-liquid flow models 1002) in Equation 14. Further, the physics model controller 504 determines the oil permittivity $\varepsilon_o$ in Equation 15. Equation 14 is a water dielectric model to determine the water permittivity $\varepsilon_w$ and the water conductivity $\sigma_w$ based on a function $f_w$ of the salinity s, the signal frequency $f$, the temperature T, and the pressure P. Equation 15 is an oil dielectric model to determine the oil permittivity $\varepsilon_o$ based on a function $f_o$ of the pressure P and the temperature T.

$$[\varepsilon_w, \sigma_w] = f_w(s, f; T, P) \qquad \text{Equation 14:}$$

$$\varepsilon_o = f_o(P, T) \qquad \text{Equation 15:}$$

In the illustrated example of FIG. 10, the physics model controller 504 executes one of the liquid flow models 1004 in response to determining that the flow through the flowmeter 102 is liquid oil-water homogeneous flow. In some examples, the physics model controller 504 determines that the flow is liquid oil-water homogeneous flow in response to the determined GHU being substantially zero and/or the differential pressure being above a threshold to induce sufficient oil-water mixing. In Equation 16, the physics model controller 504 executes a first liquid inverse model $F_L^{-1}$ of the liquid inverse models 1012 to determine liquid permittivity $\varepsilon_L$ and liquid conductivity $\sigma_L$ based on the attenuation data AT and the phase shift data PS. In some examples, the first gas-liquid inverse model of Equation 9 (e.g., to determine the apparent mixture permittivity and the apparent mixture conductivity) is calculated from the first liquid inverse model of Equation 16. Further, in Equation 17, the physics model controller 504 executes a second liquid inverse model $G_L^{-1}$ of the liquid inverse models 1012 (including, for an oil-continuous or a water-continuous oil-water liquid homogeneous mixture) to determine the WLR based on the determined liquid permittivity $\varepsilon_L$ and the determined liquid conductivity $\sigma_L$ from Equation 16 (e.g., with known input or determined water permittivity $\varepsilon_w$, water conductivity $\sigma_w$, and oil permittivity $\varepsilon_o$).

$$(\varepsilon_L, \sigma_L) = F_L^{-1}(AT, PS) \qquad \text{Equation 16:}$$

$$WLR = G_L^{-1}(\varepsilon_L, \sigma_L; [\varepsilon_w, \sigma_w], \varepsilon_o) \qquad \text{Equation 17:}$$

In the illustrated example of FIG. 10, the physics model controller 504, additionally or alternatively, executes one or more of the liquid forward models 1010 to determine one of the fluid parameters 1014 based on the reference data from the reference database 518. In particular, the physics model controller 504 executes a first liquid forward model $G_L$ of Equation 18 to determine the liquid permittivity $\varepsilon_L$ and the liquid conductivity $\sigma_L$ based on the reference WLR, the water permittivity $\varepsilon_w$ and the water conductivity $\sigma_w$ from Equation 14, and the oil permittivity $\varepsilon_o$ from Equation 15. In the illustrated example, the first liquid forward model $G_L$ is an explicit or implicit dielectric mixing law (e.g., for an oil-continuous or a water-continuous oil-water liquid homogeneous mixture). Additionally or alternatively, the physics model controller 504 executes a second liquid forward model $F_L$ of Equation 19 to determine the attenuation data AT and the phase shift data PS based on the determined liquid permittivity $\varepsilon_L$ and the determined liquid conductivity $\sigma_L$ from Equation 18.

$$[\varepsilon_L, \sigma_L] = G_L(WLR, [\varepsilon_w, \sigma_w], \varepsilon_o) \qquad \text{Equation 18:}$$

$$(AT, PS) = F_L(\varepsilon_L, \sigma_L) \qquad \text{Equation 19:}$$

Figure 11:
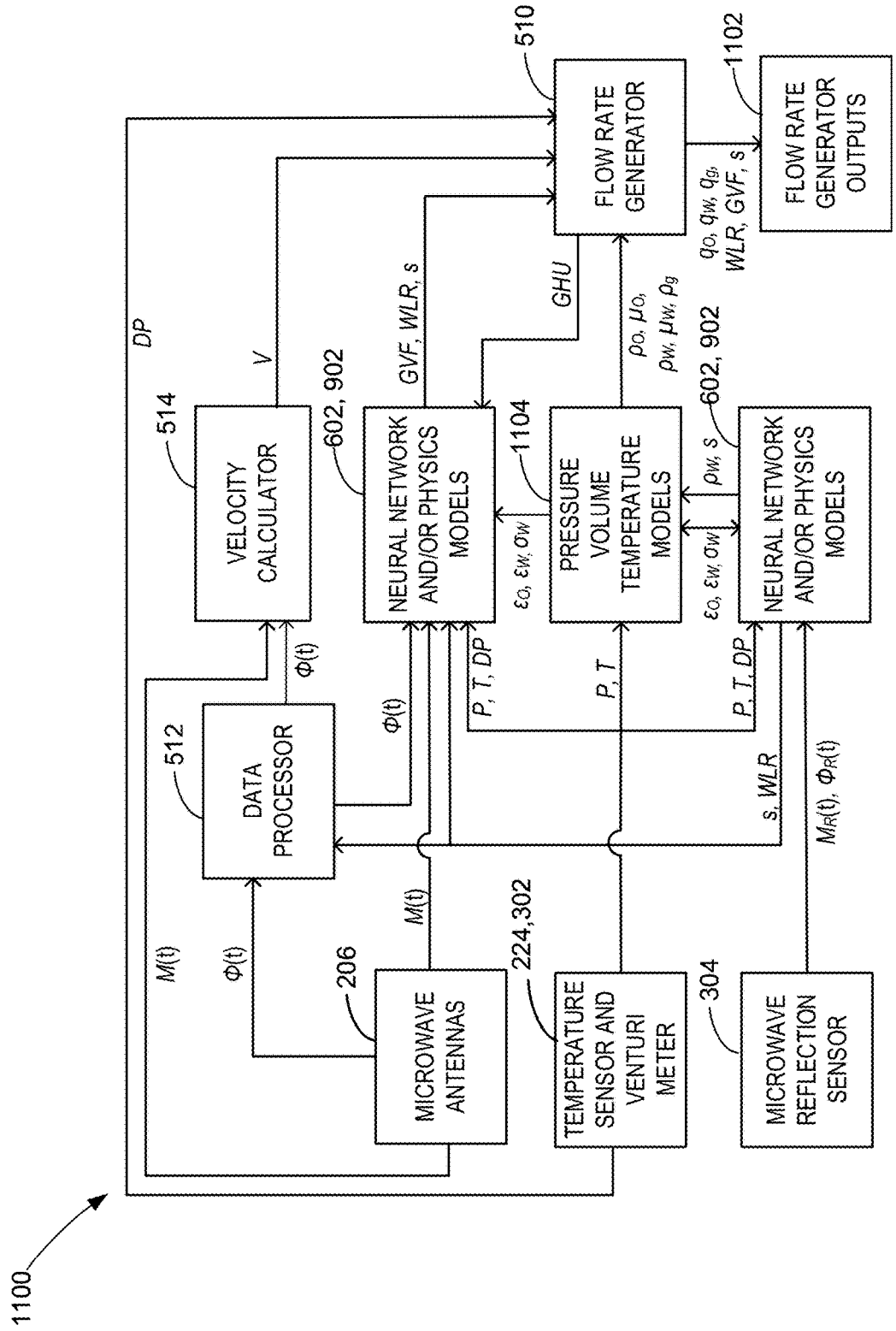
FIG. 11 is a block diagram of a second example data interpretation workflow of the example multiphase flowmeter of FIGS. 1, 2, 3A and/or 3B.

FIG. 11 is a block diagram of a second example data interpretation workflow 1100 of the flowmeter 102 of FIGS. 1, 2, 3A and/or 3B. The data interpretation workflow 1100 of FIG. 11 illustrates the flow of data from the microwave antennas 206, the temperature sensor 224, the Venturi meter 302, and the microwave reflection sensor 304 of FIGS. 2-3A. The output of the data interpretation workflow 1100 includes example flow rate generator outputs 1102 from the flow rate generator 510 of FIG. 5. The illustrated example of FIG. 11 further includes the data processor 512 and the velocity calculator 514 of FIG. 5, the neural network models 602 of FIG. 6, the physics models 902 of FIG. 9, and example pressure volume temperature (PVT) models 1104. In the illustrated example, the physics model controller 504 of FIGS. 5 and/or 10 executes the physics models 902 and the PVT models 1104.

In the illustrated example of FIG. 11, the microwave antennas 206 output attenuation data M(t) to the velocity calculator 514 and to a first set of the neural network models 602 or and/or the physics models 902. Further, the microwave antennas 206 output phase shift data Φ(t) to the data processor 512. The data processor 512 unwraps the phase shift data Φ(t) and outputs the unwrapped phase shift data Φ(t) to the first set of the neural network models 602, the physics models 902, and/or to the velocity calculator 514. In the illustrated example of FIG. 11, the microwave reflection sensor 304 outputs microwave reflection sensor attenuation data $M_R(t)$ and microwave reflection sensor phase shift data $\Phi_R(t)$ to a second set of the neural network models 602 and/or the physics models 902. In some examples, the microwave reflection sensor 304 outputs mixture permittivity data $\varepsilon_R(t)$ and mixture conductivity data $\sigma_R(t)$ to the second set of the neural network models 602 and/or the physics models 902. In some examples, the first set of the neural network models 602 or and/or the physics models 902 and the second set of the neural network models 602 or and/or the physics models 902 are combined (e.g. unified) into a single set.

In the illustrated example of FIG. 11, the temperature sensor 224 and the Venturi meter 302 output pressure data P and temperature data T to the PVT models 1104. In the illustrated example, the temperature sensor 224 and the Venturi meter 302 output differential pressure data DP to the flow rate generator 510, and further output the pressure data P, the temperature data T, and the differential pressure data DP to the first set and to the second set of the neural network models 602 or and/or the physics models 902.

In the illustrated example of FIG. 11, the PVT models 1104 determine at least one of gas permittivity $\varepsilon_g$, oil permittivity $\varepsilon_o$, water permittivity $\varepsilon_w$, oil density $\rho_o$, oil viscosity $\mu_o$, water density $\rho_w$, water viscosity $\mu_w$, water conductivity $\sigma_w$, or gas density $\rho_g$ based on the pressure data P and the temperature data T. In the illustrated example, the PVT models 1104 include Equation 14 and Equation 15 associated with the gas-liquid flow models 1002 and/or the liquid (oil-water) flow models 1004 of FIG. 10. The PVT models 1104 output the gas permittivity $\varepsilon_g$, oil permittivity $\varepsilon_o$, the water permittivity $\varepsilon_w$, and the conductivity $\sigma_w$ to the first set and the second set of the neural network models 602 or and/or the physics models 902. Further, the PVT models 1104 output the oil density $\rho_o$, the oil viscosity $\mu_o$, the water density $\rho_w$, the water viscosity $\mu_w$, and the gas density $\rho_g$ to the flow rate generator 510.

In the illustrated example of FIG. 11, the first set of the neural network models 602 or and/or the physics models 902 determines GVF, WLR, and salinity s based on at least one of the attenuation data M(t) and the unwrapped phase data $\Phi(t)$ from the microwave antennas 206, the pressure data P, the temperature data T, the differential pressure data DP, the gas permittivity $\varepsilon_g$, the oil permittivity $\varepsilon_o$, the water permittivity $\varepsilon_w$, or the conductivity $\sigma_w$. In the illustrated example, the first set of the neural network models 602 or and/or the physics models 902 outputs the GVF, the WLR, and the salinity s to the flow rate generator 510.

In the illustrated example of FIG. 11, the second set of the neural network models 602 or and/or the physics models 902 determines the WLR and the salinity s based on at least one of the microwave reflection sensor attenuation data $M_R(t)$, the microwave reflection sensor phase shift data $\Phi_R(t)$ the pressure data P, the temperature data T, the differential pressure data DP, the gas permittivity $\varepsilon_g$, the oil permittivity $\varepsilon_o$, the water permittivity $\varepsilon_w$, or the conductivity $\sigma_w$. In the illustrated example, the second set of the neural network models 602 or and/or the physics models 902 outputs the WLR and the salinity s to the data processor 512 and to the first set of the neural network models 602 or and/or the physics models 902. In the illustrated example, the second set of the neural network models 602 or and/or the physics models 902 can determine water permittivity $\varepsilon_w$ or water conductivity $\sigma_w$ based on an updated salinity s (e.g., from Equation 14), where the updated salinity s is determined from the mixture permittivity data $\varepsilon_m(t)$ and the mixture conductivity data $\sigma_m(t)$ derived from the microwave reflection sensor 304 (e.g., from Equation 11). The updated salinity s can provide an updated water density $\rho_w$ (e.g., together with the determined water permittivity $\varepsilon_w$ or water conductivity $\sigma_w$) to the PVT models 1104 via an appropriate water property calculation model.

In the illustrated example of FIG. 11, the velocity calculator 514 determines a velocity V based on cross correlation of the attenuation data M(t) and/or the unwrapped phase data $\Phi(t)$ from the microwave antennas 206. In the illustrated example, the velocity calculator 514 outputs the velocity V to the flow rate generator 510.

In the illustrated example of FIG. 11, the flow rate generator 510 determines an oil flow rate $q_o$, a water flow rate $q_w$, and a gas flow rate $q_g$ based on the velocity V, the differential pressure DP, the GVF, the WLR, the oil density $\rho_o$, the oil viscosity $\mu_o$, the water density $\rho_w$ (e.g. updated by the determined salinity s), the water viscosity $\mu_w$, and the gas density $\rho_g$. The flow rate generator 510 generates the flow rate generator outputs 1102, where the flow rate generator outputs 1102 include the oil flow rate $q_o$, the water flow rate $q_w$, the gas flow rate $q_g$, the WLR, the GVF, and the salinity s. In the illustrated example, the flow rate generator 510 further outputs a determined value of GHU to the first set of the neural network models 602 or and/or the physics models 902.

FIG. 12A illustrates an example plot 1200 of amplitude attenuation change with respect to water liquid ratio of a fluid through the flowmeter 102 of FIGS. 1-3A. In the example plot 1200, the fluid is an oil-continuous oil-water mixture (e.g., the phase shift change with respect to water liquid ratio is substantially zero degree). In the illustrated example of FIG. 12A, an example microwave transmitter antenna (e.g., the microwave transmitter antenna 306 of FIG. 4) transmits a high-frequency signal (e.g., 960 MHz signal) to an example near-spacing receiver, an example medium-spacing receiver, and an example far-spacing receiver.

In the illustrated example of FIG. 12A, the example plot 1200 includes a first high-frequency plot 1200A for the near-spacing receiver, a second high-frequency plot 1200B for the medium-spacing receiver, and a third high-frequency plot 1200C for the far-spacing receiver. The example near-spacing receiver (e.g., the sixth receiver 308F or the fifth receiver 308E relative to the first transmitter 306A of FIG. 4) is at a first distance (e.g., 30 degrees, 90 degrees) from the microwave transmitter antenna. The example medium-spacing receiver (e.g., the second receiver 308B or the fourth receiver antenna 308D relative to the first transmitter 306A) is at a second distance (e.g., 150 degrees, 120 degrees) from the microwave transmitter antenna. The example far-spacing receiver (e.g., the third receiver antenna 308C relative to the first transmitter 306A) is at a third distance (e.g., 180 degrees) from the microwave transmitter antenna. In the illustrated example, the second distance is greater than the first distance, and the third distance is greater than the first distance and the second distance.

FIG. 12B illustrates an example second plot 1202 of amplitude attenuation change with respect to water liquid ratio based on the transmitter-receiver configuration of FIG. 12A. In the illustrated example of FIG. 12B, the microwave transmitter antenna transmits a low-frequency signal (e.g., 360 MHz) to the near-spacing antenna, the medium-spacing antenna, and the far-spacing antenna. The example second plot 1202 includes a first low-frequency plot 1202A for the near-spacing receiver, a second low-frequency plot 1202B for the medium-spacing receiver, and a third low-frequency plot 1200C for the far-spacing receiver.

In FIGS. 12A and 12B, the first plot 1200 and the second plot 1202 are based on data associated with oil-continuous fluid (e.g., fluid with WLR of 0.3 or less). In the oil-continuous fluid, the attenuation measurements associated with the high-frequency (e.g., 960 MHz) signal of FIG. 12A are more sensitive to changes in the WLR of the fluid than the attenuation measurements associated with the low-frequency (e.g., 360 MHz) signal of FIG. 12B. For example, as the value of the WLR of the fluid increases from 0 to 0.3, attenuation values of the high-frequency plots (e.g., the first high-frequency plot 1200A, the second high-frequency plot 1200B, and the third high-frequency plot 1200C) of FIG. 12A increase or decrease at a faster rate than the attenuation values of the respective low-frequency plots (e.g., the first low-frequency plot 1202A, the second low-frequency plot 1202B, and the third low-frequency plot 1202C) of FIG. 12B. Accordingly, the intermediate output generator 508 of FIG. 5 can more accurately determine the WLR of the oil-continuous fluid based on the attenuation values of the high-frequency plots compared to the attenuation values of the low-frequency plots. As such, the frequency selector 516 of FIG. 5 is configured to, in response to the frequency selector 516 determining that the fluid is oil-continuous, select the high-frequency (e.g., 960 MHz, etc.) signal to be transmitted from the microwave transmitter(s) 306 to the microwave receiver(s) 308 of FIG. 3A. In some examples, the reference database 518 stores the data of the first plot 1200 and the second plot 1202 for use by the machine learning controller 502 and/or the physics model controller 504 of FIG. 5 to determine the WLR of a fluid flowing through the flowmeter 102.

FIGS. 13A-13D illustrate example plots (e.g., a first plot 1300, a second plot 1302, a third plot 1304, and a fourth plot 1306) of amplitude attenuation change and phase shift with respect to water liquid ratio of a water-continuous oil-water mixture (e.g., a fluid with WLR between 0.5 and 1.0). The amplitude attenuation measurements and the phase shift measurements of FIGS. 13A and 13B, respectively, are associated with a high-frequency signal (e.g., 960 MHz). Further, the amplitude attenuation measurements and the phase shift measurements of FIGS. 13C and 13D, respectively, are associated with a low-frequency signal (e.g., 360 MHz).

In the illustrated examples of FIGS. 13A-13D the high-frequency signal or the low-frequency signal is transmitted by a microwave transmitter (e.g., the microwave transmitter antennas 306 of FIGS. 3A and 4) to a plurality of microwave receivers. The plurality of microwave receivers includes an example first near receiver, an example first medium receiver, and an example first far receiver associated with a water-continuous fluid with low water conductivity (e.g., 5 S/m), and an example second near receiver, an example second medium receiver, and an example second far receiver associated with a water-continuous fluid with high water conductivity (e.g., 15 S/m). In the illustrated examples of FIGS. 13A-13D, the first near receiver and the second near receiver are at a first distance (e.g., 30 degrees, 90 degrees) from the microwave transmitter. The first medium receiver and the second medium receiver are at a second distance (e.g., 120 degrees, 150 degrees) from the microwave transmitter. The first far receiver and the second far receiver are at a third distance (e.g., 180 degrees) from the microwave transmitter. In the illustrated example, the second distance is greater than the first distance, and the third distance is greater than the first distance and the second distance.

Figure 13A:
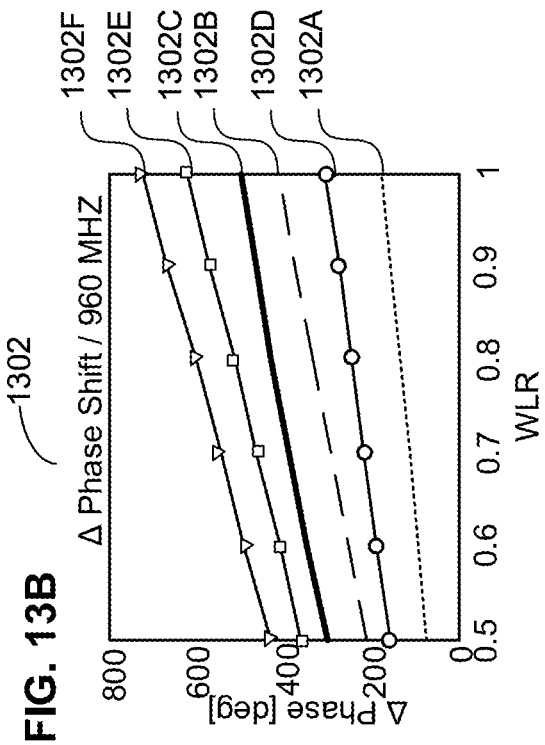
FIGS. 13A-13D illustrate example plots of amplitude attenuation change and phase shift with respect to water liquid ratio of a water-continuous oil-water mixture.

In the illustrated examples of FIG. 13A, the first example plot 1300 includes the amplitude attenuation change measurements with respect to the water liquid ratio for the high-frequency signal. The first example plot 1300 includes an example first high-frequency attenuation plot 1300A associated with the first near receiver, an example second high-frequency attenuation plot 1300B associated with the first medium receiver, an example third high-frequency attenuation plot 1300C associated with the first far receiver, an example fourth high-frequency attenuation plot 1300D associated with the second near receiver, an example fifth high-frequency attenuation plot 1300E associated with the second medium receiver, and an example sixth high-frequency attenuation plot 1300F associated with the second far receiver.

Figure 13B:
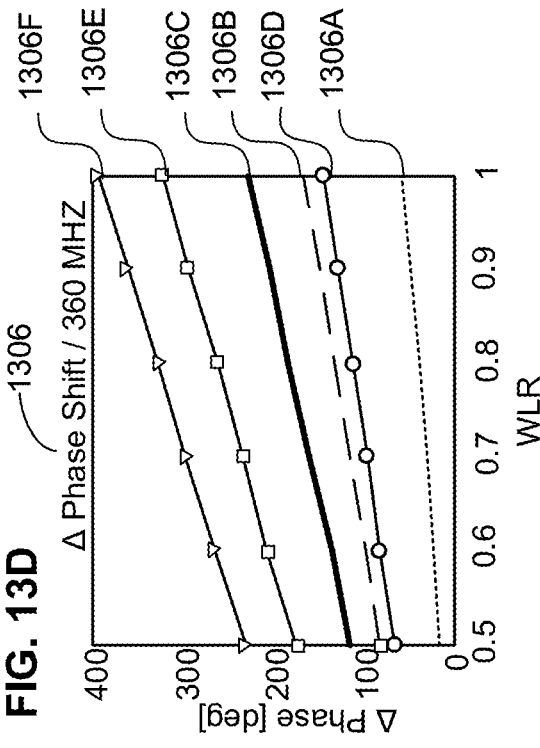

In the illustrated examples of FIG. 13B, the second example plot 1302 includes the phase shift measurements with respect to the water liquid ratio for the high-frequency signal. The second example plot 1302 includes an example first high-frequency phase shift plot 1302A associated with the first near receiver, an example second high-frequency phase shift plot 1302B associated with the first medium receiver, an example third high-frequency phase shift plot 1302C associated with the first far receiver, an example fourth high-frequency phase shift plot 1302D associated with the second near receiver, an example fifth high-frequency phase shift plot 1302E associated with the second medium receiver, and an example sixth high-frequency phase shift plot 1302F associated with the second far receiver.

Figure 13C:
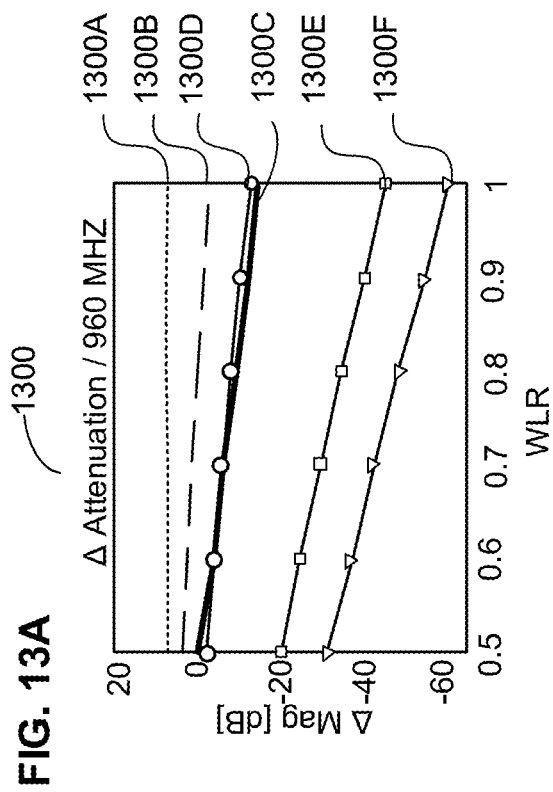

In the illustrated examples of FIG. 13C, the third example plot 1304 includes the amplitude attenuation change measurements with respect to the water liquid ratio for the low-frequency signal. The third example plot 1304 includes an example first low-frequency attenuation plot 1304A associated with the first near receiver, an example second low-frequency attenuation plot 1304B associated with the first medium receiver, an example third low-frequency attenuation plot 1304C associated with the first far receiver, an example fourth low-frequency attenuation plot 1304D associated with the second near receiver, an example fifth low-frequency attenuation plot 1304E associated with the second medium receiver, and an example sixth low-frequency attenuation plot 1304F associated with the second far receiver.

Figure 13D:
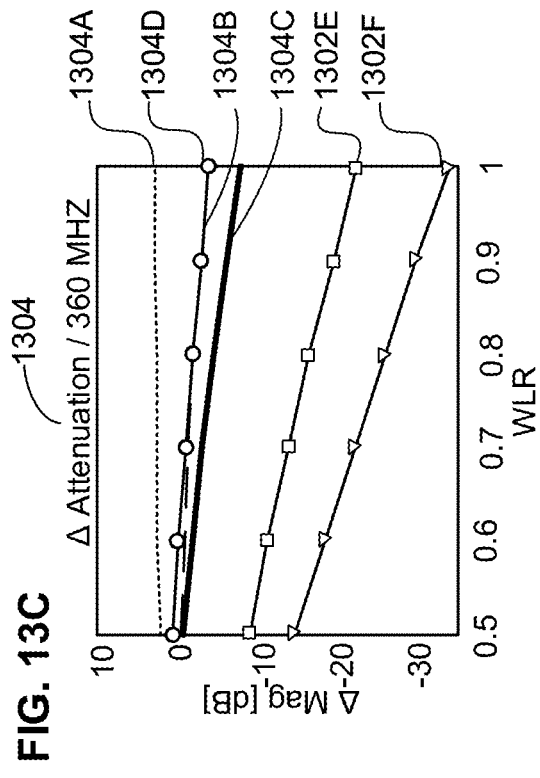

In the illustrated examples of FIG. 13D, the fourth example plot 1306 includes the phase shift measurements with respect to the water liquid ratio for the low-frequency signal. The fourth example plot 1306 includes an example first low-frequency phase shift plot 1306A associated with the first near receiver, an example second low-frequency phase shift plot 1306B associated with the first medium receiver, an example third low-frequency phase shift plot 1306C associated with the first far receiver, an example fourth low-frequency phase shift plot 1306D associated with the second near receiver, an example fifth low-frequency phase shift plot 1306E associated with the second medium receiver, and an example sixth low-frequency phase shift plot 1306F associated with the second far receiver.

In the illustrated examples of FIGS. 13A and 13C, the amplitude attenuation change measurements generally decrease as the water liquid ratio increases. Alternatively, in the illustrated examples of FIGS. 13B and 13D, the phase shift measurements generally increase as the water liquid ratio increases. However, the amplitude attenuation change measurements for the high-frequency signal in FIG. 13A generally decrease at a faster rate than the amplitude attenuation change measurements for the low-frequency signal in FIG. 13C. Similarly, the phase shift measurements for the high-frequency signal in FIG. 13B generally increase at a faster rate than the phase shift measurements for the low-frequency signal in FIG. 13D. In particular, the phase shift measurements for the high-frequency signal in FIG. 13B are generally greater than the phase shift measurements for the low-frequency signal in FIG. 13D and, thus, the phase shift measurements have more wrapping (e.g., for phase shift values greater than 360 degrees) for the high-frequency signal compared to the low-frequency signal.

In disclosed examples, the data processor 512 of FIG. 5 unwraps the phase shift measurements based on one or more neural network models (e.g., the neural network models 602 of FIGS. 6, 9 and 11). The phase shift measurements for the low-frequency signal of FIG. 13D have less wrapping than the phase shift measurements for the high-frequency signal of FIG. 13B. Thus, the data processor 512 does less or no phase unwrapping of the phase shift measurements for the low-frequency signal and, in turn, reduces error due to phase unwrapping. As such, the frequency selector 516 of FIG. 5 is configured to, in response to the frequency selector 516 determining that the fluid is water-continuous (e.g., the phase shift change is substantially above zero degree), select the low-frequency signal for transmission by the microwave transmitter(s) 306 to reduce the error due to phase unwrapping. In some examples, the reference database 518 stores the measurements of the example plots of FIGS. 13A-13D for use by the machine learning controller 502 and/or the physics model controller 504 of FIG. 5 to determine the WLR of a fluid through the flowmeter 102.

FIG. 14 illustrates an example table 1400 of preferred upper limits of high-operating frequency and low-operating frequency with respect to throat diameter (e.g., an inner diameter of the pipe throat 205 of FIG. 3A) for the Venturi meter 302 of FIGS. 3A, 5, and 11. The example table 1400 includes an example first row 1402 for a throat diameter of 56 mm, an example second row 1404 for a throat diameter of 40 mm, an example third row 1406 for a throat diameter of 29 mm, and an example fourth row 1408 for a throat diameter of 19 mm. The example first row 1402, the example second row 1404, the example third row 1406, and the example fourth row 1408 include a preferred upper limit for high-frequency signals (e.g., for oil-continuous fluid) and a preferred upper limit for low-frequency signals (e.g., for water-continuous fluid) corresponding to the throat diameter. In the illustrated example of FIG. 14, the preferred upper limit for high-frequency signals is based on a fluid with phase-inversion water-liquid ratio of 0.7, where the phase-inversion water-liquid ratio is the water-liquid ratio value at which the fluid changes from oil-continuous to water-continuous. Further, the preferred upper limit for low-frequency signals is based on a fluid with a water-liquid ratio of 1.0.

In the illustrated example of FIG. 14, the example first row 1402, corresponding to the throat diameter of 56 mm, includes a value of 740 MHz for the preferred upper limit for high-frequency signals and a value of 350 MHz for the preferred upper limit for low-frequency signals. For example, the frequency selector 516 of FIG. 5 is configured to, in response to the frequency selector 516 determining that the fluid is oil-continuous, select a high-frequency signal less than 740 MHz (e.g., 720 MHz) to be transmitted by the microwave transmitter(s) 306 with the pipe throat 205 having a diameter of 56 mm. Further, the frequency selector 516 of FIG. 5 is configured to, in response to the frequency selector 516 determining that the fluid is water-continuous, select a low-frequency signal less than 350 MHz (e.g., 240 MHz) to be transmitted by the microwave transmitter(s) 306 with the pipe throat 205 having a diameter of 56 mm.

In the illustrated example of FIG. 14, the example second row 1404, corresponding to the throat diameter of 40 mm, includes a value of 1000 MHz for the preferred upper limit for high-frequency signals and a value of 490 MHz for the preferred upper limit for low-frequency signals. For example, the frequency selector 516 of FIG. 5 is configured to, in response to the frequency selector 516 determining that the fluid is oil-continuous, select the high-frequency signal to be less than 1000 MHz (e.g., 960 MHz) to be transmitted by the microwave transmitter(s) 306 with the pipe throat 205 having a diameter of 40 mm. Further, the frequency selector 516 of FIG. 5 is configured to, in response to the frequency selector 516 determining that the fluid is water-continuous, select the low-frequency signal to be less than 490 MHz (e.g., 360 MHz) to be transmitted by the microwave transmitter(s) 306 with the pipe throat 205 having a diameter of 40 mm.

In the illustrated example of FIG. 14, the example third row 1406, corresponding to the throat diameter of 29 mm, includes a value of 1400 MHz for the preferred upper limit for high-frequency signals and a value of 680 MHz for the preferred upper limit for low-frequency signals. For example, the frequency selector 516 of FIG. 5 is configured to, in response to the frequency selector 516 determining that the fluid is oil-continuous, select the high frequency signal to be less than 1400 MHz (e.g., 960 MHz) to be transmitted by the microwave transmitter(s) 306 with the pipe throat 205 having a diameter of 29 mm. Further, the frequency selector 516 of FIG. 5 is configured to, in response to the frequency selector 516 determining that the fluid is water-continuous, select the low-frequency signal to be less than 680 MHz (e.g., 360 MHz) to be transmitted by the microwave transmitter(s) 306 with the pipe throat 205 having a diameter of 29 mm.

In the illustrated example of FIG. 14, the example fourth row 1408, corresponding to the throat diameter of 19 mm, includes a value of 2200 MHz for the preferred upper limit for high-frequency signals and a value of 1000 MHz for the preferred upper limit for low frequency signals. For example, the frequency selector 516 of FIG. 5 is configured to, in response to the frequency selector 516 determining that the fluid is oil-continuous, select the high-frequency signal to be less than 2200 MHz (e.g., 1960 MHz) to be transmitted by the microwave transmitter(s) 306 with the pipe throat 205 having a diameter of 19 mm. Further, the frequency selector 516 of FIG. 5 is configured to, in response to the frequency selector 516 determining that the fluid is water-continuous, select the low-frequency signal to be less than 1000 MHz (e.g., 720 MHz, or 960 MHz) to be transmitted by the microwave transmitter(s) 306 with the pipe throat 205 having a diameter of 19 mm.

In some examples, the example table 1400 includes additional or alternative values for the throat diameter and the corresponding preferred upper limit for high-frequency signals and preferred upper limit for low-frequency signals. In some examples, the reference database 518 stores the example table 1400 for use by the frequency selector 516 to select the frequency of the signal transmitted by the microwave transmitter(s) 306. Advantageously, in response to the frequency selector 516 selecting the frequency based on the preferred upper limit for high-frequency signals and/or the preferred upper limit for low-frequency signals of the table 1400, the frequency selector 516 improves sensitivity of attenuation measurements and phase shift measurements associated with the fluid.

FIG. 15 illustrates a second example table 1500 of transmitter-receiver arc-separation (e.g., circumferential arc-separation) and a corresponding ratio to a wavelength (e.g., plane-wave wavelength) in pure water. The example table 1500 includes an example first row 1502 for a receiver angle of 30 degrees, an example second row 1504 for a receiver angle of 60 degrees, an example third row 1506 for a receiver angle of 90 degrees, an example fourth row 1508 for a receiver angle of 120 degrees, an example fifth row 1510 for a receiver angle of 150 degrees, and an example second row 1512 for a receiver angle of 180 degrees.

In the example table 1500, the receiver angle is an angular distance between a transmitter (e.g., the microwave transmitter antenna 306 of FIGS. 3A and 4) and a receiver (e.g., one of the microwave receivers 308B-308G of FIG. 4) on a cross-section of pipe (e.g., the pipe throat 205 of FIG. 3A). Further, the example table 1500 includes an arc length in radians between the transmitter and the receiver, an arc length in centimeters between the transmitter and the receiver, and a ratio of the arc length in centimeters to an example wavelength. In the illustrated example of FIG. 15, the cross-section of pipe has an inner diameter of 4 inches (e.g., 10 cm) and the fluid through the pipe is pure water. Further, the example wavelength is 4.2 cm for an 800 MHz signal transmitted by the transmitter to the receiver.

In the illustrated example of FIG. 15, the example first row 1502 corresponds to the receiver (e.g., the sixth receiver antenna 308G of FIG. 4, relative to the first transmitter antenna 306) coupled to the pipe at a receiver angle of 30 degrees from the transmitter. The example first row 1502 includes a value of $\pi R/6$ radians for the arc length in radians, where R in the radius of the pipe (e.g., 2 inches). Further, the example first row 1502 includes a value of 2.66 cm for the arc length in centimeters, and a value of 0.64 for the ratio of arc length in centimeters to the wavelength (e.g., indicating that phase-shift in water is approximately $0.64 \times 2\pi$, or no phase wrapping between 0 to $2\pi$).

In the illustrated example of FIG. 15, the example second row 1504 corresponds to the receiver coupled to the pipe at a receiver angle of 60 degrees from the transmitter. The example second row 1504 includes a value of $\pi R/3$ radians for the arc length in radians. Further, the example second row 1504 includes a value of 5.32 cm for the arc length in centimeters, and a value of 1.28 for the ratio of arc length in centimeters to the wavelength (e.g., indicating that phase-shift in water is approximately $1.28 \times 2\pi$, or with 1-fold phase wrapping).

In the illustrated example of FIG. 15, the example third row 1506 corresponds to the receiver (e.g., the first receiver antenna 308B of FIG. 4, the fifth receiver antenna 308F of FIG. 4, relative to the first transmitter antenna 306) coupled to the pipe at a receiver angle of 90 degrees from the transmitter. The example third row 1506 includes a value of $\pi R/2$ radians for the arc length in radians. Further, the example third row 1506 includes a value of 7.98 cm for the arc length in centimeters, and a value of 1.91 for the ratio of arc length in centimeters to the wavelength (e.g., indicating that phase-shift in water is approximately $1.91 \times 2\pi$, or with nearly 2-fold phase wrapping).

In the illustrated example of FIG. 15, the example fourth row 1508 corresponds to the receiver (e.g., the fourth receiver antenna 308E of FIG. 4, relative to the first transmitter antenna 306) coupled to the pipe at a receiver angle of 120 degrees from the transmitter. The example fourth row 1508 includes a value of $2\pi R/3$ radians for the arc length in radians. Further, the example fourth row 1508 includes a value of 10.63 cm for the arc length in centimeters, and a value of 2.55 for the ratio of arc length in centimeters to the wavelength (e.g., indicating that phase-shift in water is approximately $2.55 \times 2\pi$, or with 2-fold phase wrapping).

In the illustrated example of FIG. 15, the example fifth row 1510 corresponds to the receiver (e.g., the second receiver antenna 308C of FIG. 4, relative to the first transmitter antenna 306) coupled to the pipe at a receiver angle of 150 degrees from the transmitter. The example fifth row 1510 includes a value of $5\pi R/6$ radians for the arc length in radians. Further, the example fifth row 1510 includes a value of 13.29 cm for the arc length in centimeters, and a value of 3.19 for the ratio of arc length in centimeters to the wavelength (e.g., indicating that phase-shift in water is approximately $3.19 \times 2\pi$, or with 3-fold phase wrapping).

In the illustrated example of FIG. 15, the example sixth row 1512 corresponds to the receiver (e.g., the third receiver antenna 308D of FIG. 4, relative to the first transmitter antenna 306) coupled to the pipe at a receiver angle of 180 degrees from the transmitter. The example sixth row 1512 includes a value of $\pi R$ radians for the arc length in radians. Further, the example sixth row 1512 includes a value of 15.95 cm for the arc length in centimeters, and a value of 3.83 for the ratio of arc length in centimeters to the wavelength (e.g., indicating that phase-shift in water is approximately $3.83 \times 2\pi$, or with nearly 4-fold phase wrapping).

In the example table 1500 of FIG. 15, the values of the ratio of arc length in centimeters to the wavelength indicates the amount of phase wrapping for phase shift measurements based on the 800 MHz signal in water. For example, the receiver at a receiver angle of 30 degrees has no phase wrapping (e.g., the ratio of arc length in centimeters to the wavelength is less than 1.0). Further, the ratio is larger for a first receiver at a greater receiver angle compared to a second receiver at a lesser receiver angle. For example, the ratio of the first receiver at the receiver angle of 180 degrees (e.g., 3.83 for the sixth row 1512) is greater than the ratio of the second receiver at the receiver angle of 90 degrees (e.g., 1.91 for the third row 1506). In such examples, phase shift measurements corresponding to the first receiver have more phase wrapping compared to the phase shift measurements corresponding to the second receiver.

In some examples, additionally or alternatively, the example table 1500 of FIG. 15 includes one or more values of the receiver angle, the arc length in radians, the arc length in centimeters, and the ratio of the arc length in centimeters to the wavelength for different values of the pipe inner diameter and/or the signal frequency. In some examples, the reference database 518 of FIG. 5 stores the example table 1500 for use by the data processor 512 of FIG. 5 to determine the amount of phase wrapping of phase shift measurements from the microwave receiver(s) 308.

In some examples, the data processor 512 of FIG. 5 can unwrap the phase shift data (e.g., baseline phase shift data) of a first one of the microwave receivers 308 (e.g., a near receiver) to determine the unwrapped baseline phase shift data. The unwrapped baseline phase shift data can be used by the data processor 512 to determine the amount of phase wrapping of phase shift measurements from the microwave receiver(s) 308. In such examples, the near receiver is the one of the microwave receivers 308 at a smallest distance (e.g., angular spacing, radial distance, transmitter-receiver spacing) from the respective one of the microwave transmitters 306. In such examples, the baseline phase shift data is based on a low-frequency signal received by the near receiver. Further, the data processor can unwrap the phase shift data (e.g., water-continuous fluid phase shift data) for a second one of microwave receivers 308 (e.g., a far receiver). In such examples, the far receiver is a larger distance from the respective one of the microwave transmitters 306 than the near receiver. In some such examples, the far receiver and the near receiver can be at the same distance from the respective one of the microwave transmitters 306. In some examples, the water-continuous fluid phase shift data is based on a high-frequency signal (e.g., having higher frequency than the low-frequency signal received by the near receiver) received by the far receiver. In such examples, the data processor 512 can ensure that the unwrapped water-continuous fluid phase shift data values are greater (e.g., larger) than the unwrapped baseline phase shift data values. In some examples, the reference wrapped phase shift data 5186 of FIG. 5 includes the baseline phase shift data and/or the water-continuous fluid phase shift data. Additionally or alternatively, the reference unwrapped phase shift data 518A of FIG. 5 may include the unwrapped baseline phase shift data and/or the unwrapped water-continuous fluid phase shift data. The machine learning controller 502 of FIGS. 5 and/or 6 can train the phase unwrapper neural network 602A of FIG. 6 based on the baseline phase shift data and/or the water-continuous fluid phase shift data.

Figure 16:
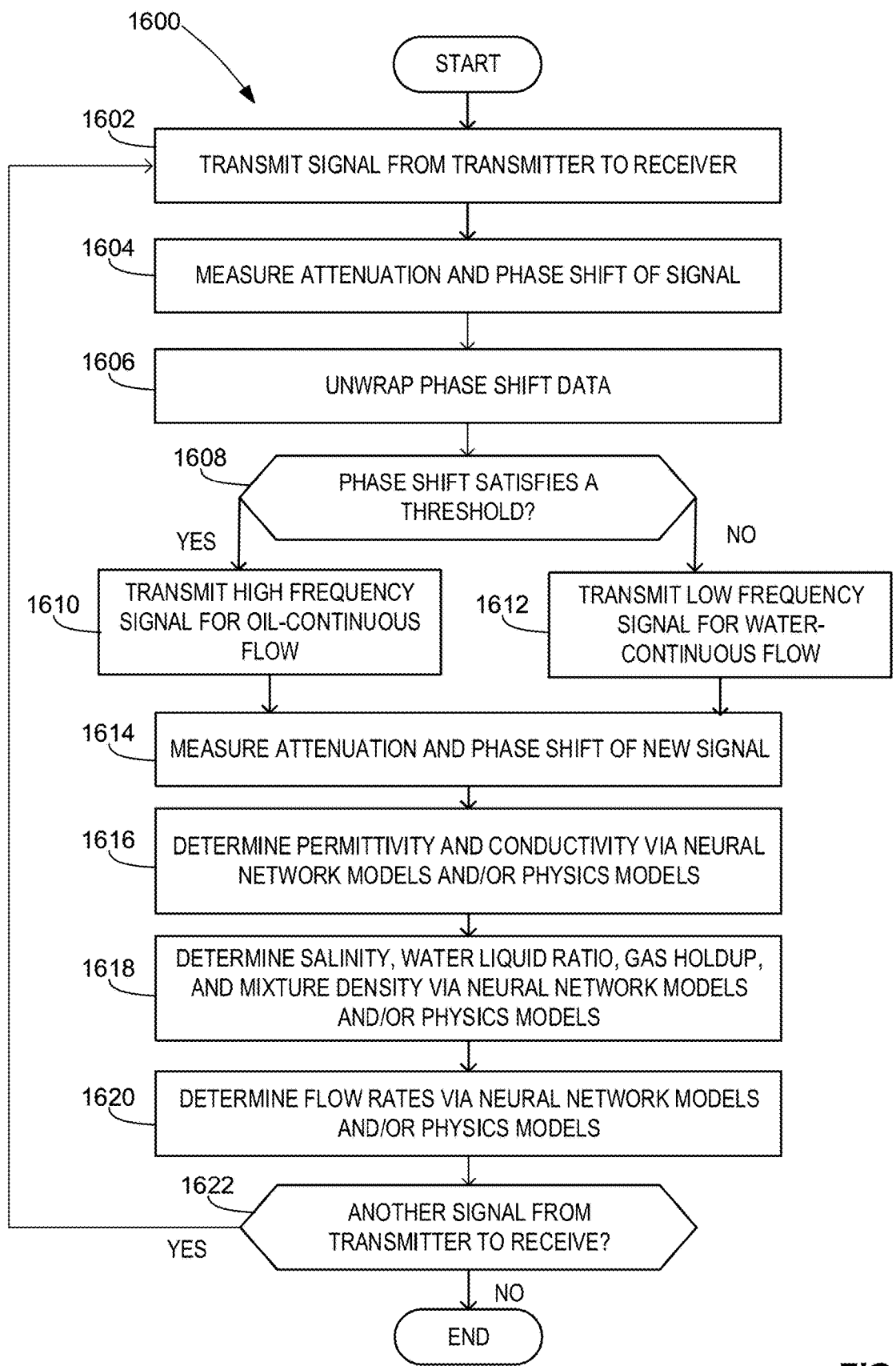
FIG. 16 is a flowchart representative of example machine readable instructions that may be executed to implement the fluid parameter controller of FIG. 5, and/or, more generally, the example multiphase flowmeter of FIGS. 1, 2, 3A and/or 3B, to determine example flow rates associated with a multiphase fluid.
Figure 17:
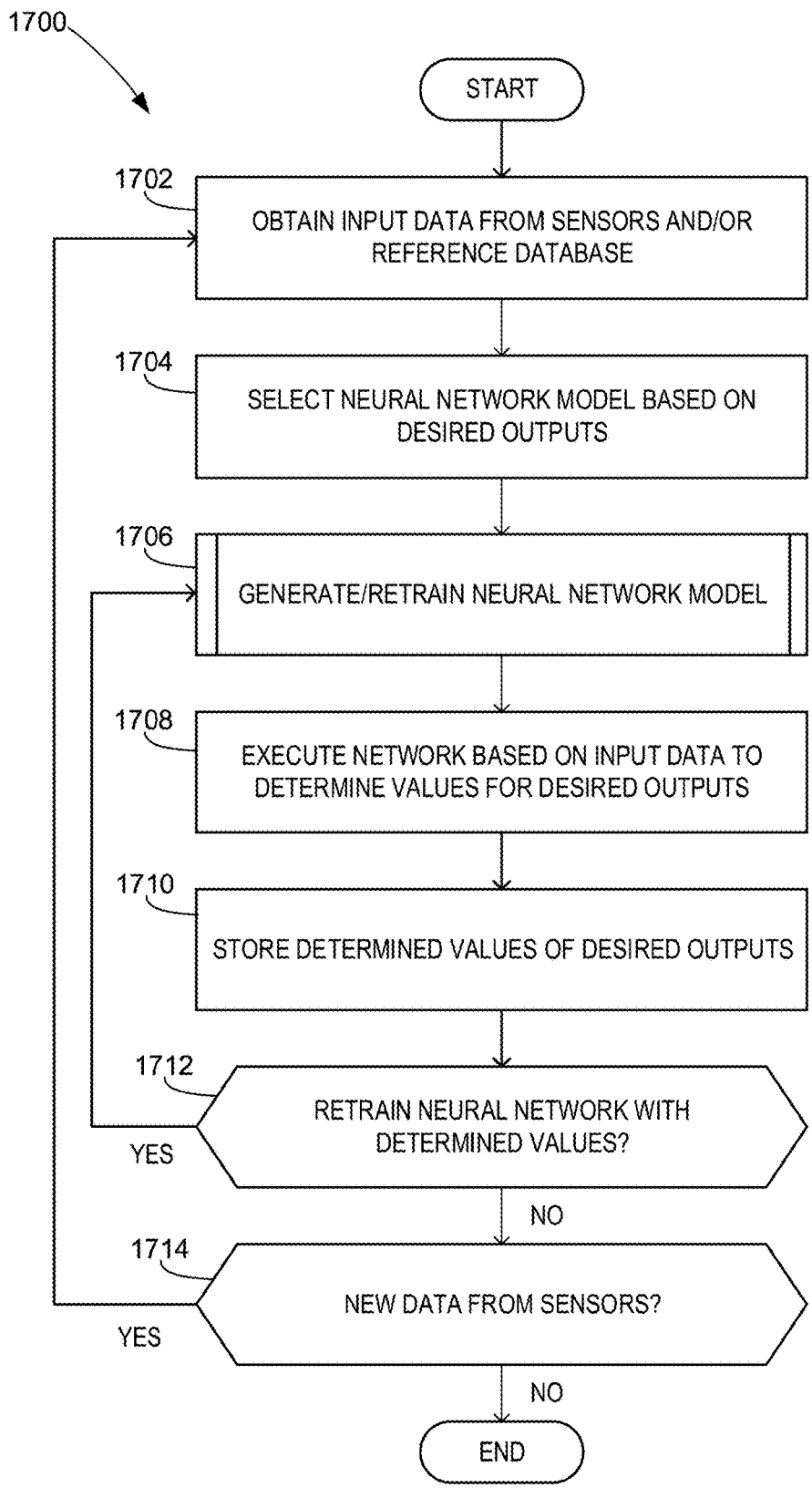
FIG. 17 is a flowchart representative of example machine readable instructions that may be executed to implement the machine learning controller of FIGS. 5 and/or 6, the fluid parameter controller of FIG. 5, and/or, more generally, the example multiphase flowmeter of FIGS. 1, 2, 3A and/or 3B, to execute the example neural network model(s) of FIG. 6 to determine example fluid parameters associated with a multiphase fluid.

Flowcharts representative of example hardware logic, machine readable instructions, hardware implemented state machines, and/or any combination thereof for implementing the fluid parameter controller 500 and the machine learning controller 502 of FIGS. 5 and/or 6 is shown in FIGS. 16, 17, and/or 18. The machine readable instructions may be one or more executable programs or portion(s) of an executable program for execution by a computer processor and/or processor circuitry, such as the processor 1912 shown in the example processor platform 1900 discussed below in connection with FIG. 19. The program may be embodied in software stored on a non-transitory computer readable storage medium such as a CD-ROM, a floppy disk, a hard drive, a DVD, a Blu-ray disk, or a memory associated with the processor 1912, but the entire program and/or parts thereof could alternatively be executed by a device other than the processor 1912 and/or embodied in firmware or dedicated hardware. Further, although the example program is described with reference to the flowcharts illustrated in FIGS. 16, 17, and/or 18, many other methods of implementing the example fluid parameter controller 500 and/or the example machine learning controller 502 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 16, 17, and/or 18 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 16 is a flowchart representative of example machine readable instructions 1600 that may be executed to implement the fluid parameter controller 500 of FIG. 5, and/or, more generally, the flowmeter 102 of FIGS. 1, 2, 3A and/or 3B, to determine example flow rates associated with a multiphase fluid. The machine readable instructions 1600 of FIG. 16 begin at block 1602, at which the microwave transmitter(s) 306 of FIGS. 3A, 4, and 5 transmit a microwave signal to the respective one(s) of the microwave receiver(s) 308 of FIGS. 3A and 5. For example, the frequency selector 516 of FIG. 5 can invoke the microwave transmitter(s) 306 to transmit the microwave signal having a first frequency.

At block 1604, the fluid parameter controller 500 measures attenuation data and phase shift data based on the microwave signal transmitted by the one or more microwave transmitter(s) 306. For example, the data processor 512 of FIG. 5 can measure the attenuation data and the phase shift data based on the microwave signal received by the receiver(s) 308.

At block 1606, the fluid parameter controller 500 unwraps the phase shift data. For example, the data processor 512 of FIG. 5 can unwrap the phase shift data by executing one of the neural network models 602 of the machine learning controller 502 of FIGS. 5 and 6.

At block 1608, the fluid parameter controller 500 determines whether the unwrapped phase shift data satisfies a threshold. For example, the frequency selector 516 of FIG. 5 receives the unwrapped phase shift data and determines whether an absolute value of the unwrapped phase shift data satisfies the threshold (e.g., a threshold value of 1 degree).

In response to the frequency selector 516 determining that the absolute value of the unwrapped phase shift values is more than or equal to the threshold, the process moves to block 1610. Alternatively, in response to the frequency selector 516 determining that the absolute value of the unwrapped phase shift values is less than the threshold, the process moves to block 1612.

At block 1610, the fluid parameter controller 500 invokes the microwave transmitter(s) 306 to transmit a high frequency signal for oil-continuous flow. For example, the frequency selector 516 determines that the fluid is oil-continuous and directs the microwave transmitter(s) 306 to transmit the high frequency signal (e.g., 720 MHz, 960 MHz, etc.) to the microwave receiver(s) 308.

At block 1612, the fluid parameter controller 500 invokes the microwave transmitter(s) 306 to transmit a low frequency signal for water-continuous flow. For example, the frequency selector 516 determines that the fluid is water-continuous and directs the microwave transmitter(s) 306 to transmit the low frequency signal (e.g., 240 MHz, 320 MHz, etc.) to the microwave receiver(s) 308.

At block 1614, the fluid parameter controller 500 measures new attenuation data and new phase shift data for a new signal (e.g., the high frequency signal and/or the low frequency signal). For example, the one or more microwave receivers 308 measure new attenuation data and new phase shift data based on the high frequency signal or the low frequency signal received by the one or more microwave receivers 308.

At block 1616, the fluid parameter controller 500 determines permittivity and conductivity via the neural network model(s) 602 and/or the physics model(s) 902 of FIG. 9. For example, the intermediate output generator 508 of FIG. 5 determines the permittivity and the conductivity of the fluid based on the new attenuation data and the new phase shift data. In some examples, the intermediate output generator 508 determines the permittivity and the conductivity by executing one or more models of the neural network models 602 and/or the physics model(s) 902. In some examples, the model selector 506 of FIGS. 5 and 9 selects the one or more models.

At block 1618, the fluid parameter controller 500 determines salinity, water-liquid ratio, gas holdup, and mixture density via the neural network model(s) 602 and/or the physics model(s) 902. For example, the intermediate output generator 508 determines the salinity, the water-liquid ratio, the gas holdup, and the mixture density of the fluid based on the permittivity, the conductivity, the new attenuation data, and the new phase shift data. In some examples, the intermediate output generator 508 determines the salinity, the water-liquid ratio, the gas holdup, and the mixture density by executing one or more second models of the neural network models 602 and/or the physics model(s) 902. In some examples, the model selector 506 selects the one or more second models.

At block 1620, the fluid parameter controller 500 determines one or more flow rates via the neural network model(s) 602 and/or the physics model(s) 902. For example, the flow rate generator 510 of FIG. 5 determines the one or more flow rates of the fluid based on at least one of the pressure data, the differential pressure data, the salinity, the water-liquid ratio, the gas holdup, the mixture density, the permittivity, the conductivity, the new attenuation data, or the new phase shift data. In some examples, the flow rate generator 510 determines the one or more flow rates using one or more third models of the neural network models 602 and/or the physics model(s) 902. For example, the model selector 506 selects the one or more third models. In some examples, the one or more flow rates include at least one of a mixture flow rate, a water flow rate, a gas flow rate, or an oil flow rate associated with the fluid.

At block 1622, the fluid parameter controller 500 determines whether there is another signal from the microwave transmitter(s) 306 to receive. For example, the frequency selector 516 determines whether the microwave transmitter(s) 306 is/are to transmit another signal to be received by the one or more microwave receivers 308. In response to the fluid parameter controller 500 determining that another signal is to be received, the process returns to block 1602. Alternatively, in response to the fluid parameter controller 500 determining that no more signals are to be received, the process ends.

FIG. 17 is a flowchart representative of example machine readable instructions 1700 that may be executed to implement the machine learning controller 502 of FIGS. 5 and/or 6, the fluid parameter controller 500 of FIG. 5, and/or, more generally, the example multiphase flowmeter 102 of FIGS. 1, 2, 3A and/or 3B, to execute the example neural network model(s) 602 of FIG. 6 to determine example fluid parameters associated with a multiphase fluid.

The machine readable instructions 1700 of FIG. 17 begin at block 1702, at which the fluid parameter controller 500 obtains input data from one or more sensors (e.g., the microwave receiver(s) 308 of FIGS. 3, 4, and/or 5, the microwave reflection sensor 304 of FIGS. 3, 5, and/or 11, the Venturi meter 302 of FIGS. 3, 5, and 11, the temperature sensor 224 of FIGS. 2 and/or 11) and/or the reference database 518 of FIG. 5. For example, the model selector 506 of FIGS. 5 and/or 9 obtains at least one of first attenuation data and first phase shift data from the microwave receiver(s) 308, second attenuation data and second phase shift data from the microwave reflection sensor 304, pressure data and differential pressure data from the Venturi meter 302, or temperature data from the temperature sensor 224. In some examples, the model selector 506 obtains at least one of the reference unwrapped phase shift data 518A, the reference wrapped phase shift data 518B, the reference intermediate outputs 518C, the reference flow rates 518D, or the reference attenuation data 518E of FIG. 5 from the reference database 518.

At block 1704, the fluid parameter controller 500 selects a neural network model from the neural network model(s) 602 of the machine learning controller 502 based on desired outputs (e.g., unwrapped phase shift values, fluid parameter(s), and/or flow rate(s)). For example, in response to the data processor 512 of FIG. 5 invoking the model selector, the model selector 506 selects the phase unwrapper neural network 602A based on the desired outputs being the unwrapped phase shift values. In another example, in response to the intermediate output generator 508 of FIG. 5 invoking the model selector 506, the model selector 506 selects the intermediate output neural network 602B based on the desired outputs being the fluid parameter(s) (e.g., mixture permittivity, mixture conductivity, water permittivity, water conductivity, water density, water viscosity, oil viscosity, oil permittivity, oil density, gas permittivity, gas density, water-liquid ratio, gas holdup, gas volume fraction, mixture viscosity, and/or mixture density). In another example, in response to the flow rate generator 510 of FIG. 5 invoking the model selector 506, the model selector 506 selects the flow rate neural network 602C based on the desired outputs being the flow rate(s) (e.g., mixture flow rate, gas flow rate, water flow rate, and/or oil flow rate).

Figure 18:
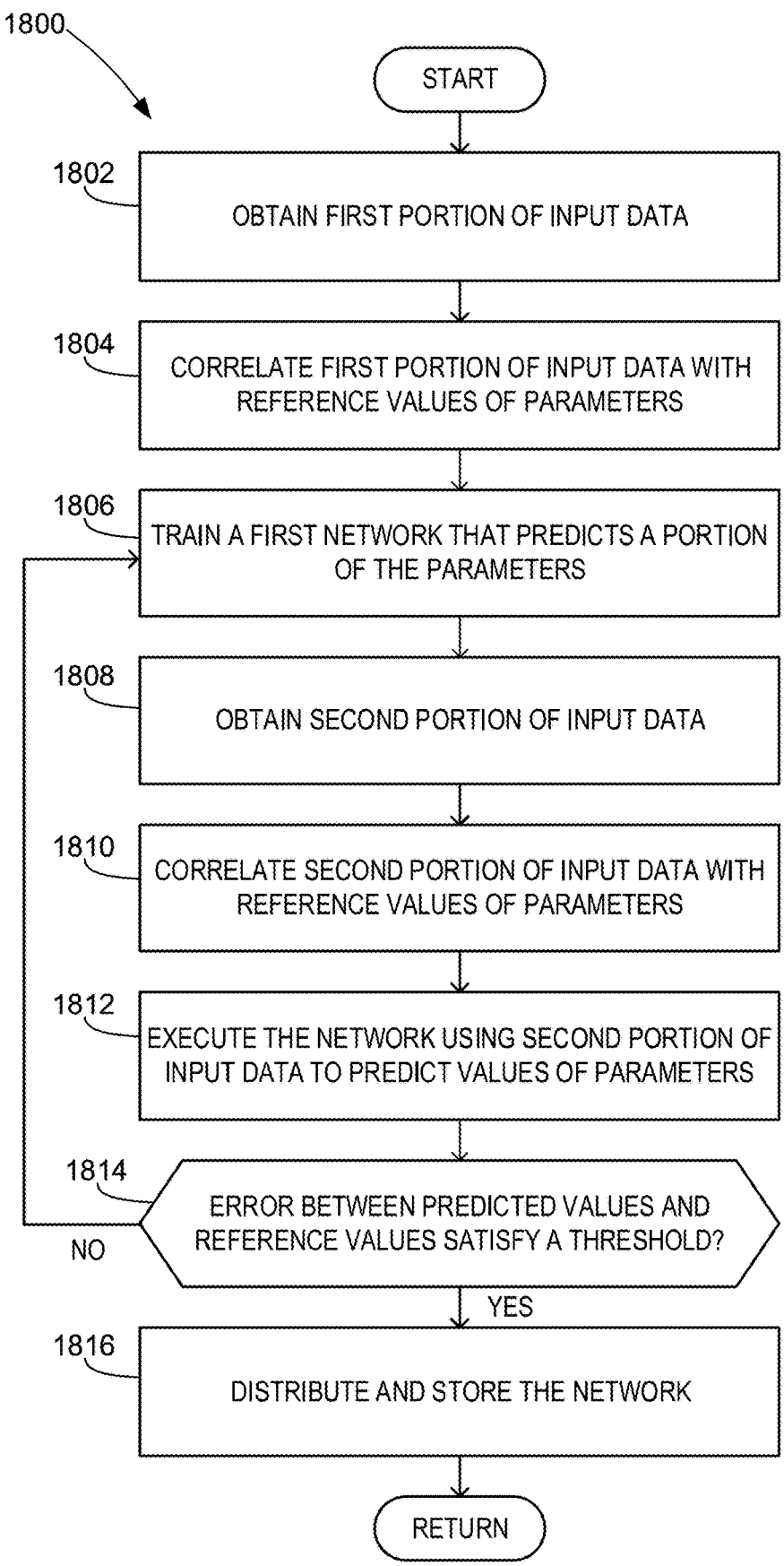
FIG. 18 is a flowchart representative of example machine readable instructions that may be executed to implement the machine learning controller of FIGS. 5 and/or 6, the fluid parameter controller of FIG. 5, and/or, more generally, the example multiphase flowmeter of FIGS. 1, 2, 3A and/or 3B, to generate the example neural network model(s) of FIG. 6.

At block 1706, further described in conjunction with FIG. 18, the machine learning controller 502 generates and/or retrains the neural network model(s) 602 based on the input data obtained from the model selector 506. For example, once the machine learning controller 502 validates the neural network(s), the machine learning controller 502 deploys the trained neural network model(s) 602 to the data processor 512, the intermediate output generator 508, and/or the flow rate generator 510 and processing proceeds to block 1708.

At block 1708, the fluid parameter controller 500 executes one of the neural network model(s) 602 based on the input data to determine values for the desired outputs. For example, in response to the model selector 506 selecting the phase unwrapper neural network 602A, the data processor 512 executes the phase unwrapper neural network 602A to determine (e.g., predict) the unwrapped phase shift values. In another example, in response to the model selector 506 selecting the intermediate output neural network 602B, the intermediate output generator 508 executes the intermediate output neural network 602B to determine the fluid parameter(s) (e.g., intermediate outputs). In another example, in response to the model selector 506 selecting the flow rate neural network 602C, the flow rate generator 510 executes the flow rate neural network 602C to determine the flow rate(s).

At block 1710, the fluid parameter controller 500 stores the determined values of the desired outputs. For example, the data processor 512 stores the determined values of the unwrapped phase shift in the reference database 518. In another example, the intermediate output generator 508 stores the determined values of the fluid parameter(s) in the reference database 518. In another example, the flow rate generator 510 stores the determined values of the fluid parameter(s) in the reference database 518.

At block 1712, the fluid parameter controller 500 determines whether the neural network(s) 602 is/are to be retrained with the determined values of the desired outputs. For example, in response to the machine learning controller 502 determining that one or more of the neural network(s) 602 is/are to be retrained, the process returns to block 1706. Alternatively, in response to the machine learning controller 502 determining that one or more of the neural network(s) is/are not to be retrained, the process moves to block 1714.

At block 1714, the fluid parameter controller 500 determines whether new data is obtained from the one or more sensors. For example, in response to the model selector 506 obtaining at least one of new attenuation data and new phase shift data from the microwave receiver(s) and/or the microwave reflection sensor 304, new pressure data and differential pressure data from the Venturi meter 302, or new temperature data from the temperature sensor 224, the process returns to block 1702. Alternatively, in response to the model selector 506 not obtaining new data, the process ends.

FIG. 18 is a flowchart representative of example machine readable instructions 1800 that may be executed to implement the machine learning controller 502 of FIGS. 5 and/or 6, the fluid parameter controller 500 of FIG. 5, and/or, more generally, the example multiphase flowmeter 102 of FIGS. 1, 2, 3A and/or 3B, to generate and/or retrain the example neural network model(s) 602 in association with block 1706 of FIG. 17. The machine readable instructions 1800 of FIG. 18 begin at block 1802, at which the machine learning controller 502 obtains (e.g., retrieves) a first portion of the input data from the model selector 506. For example, the model selector 506 sends the first portion of the input data to the one or more neural network models 602. The input data includes reference input data (e.g., at least one of the reference unwrapped phase shift data 518A, the reference wrapped phase shift data 518B, the reference intermediate outputs 518C, the reference flow rates 518D, or the reference attenuation data 518E) from the reference database 518 and sensor data (e.g., attenuation data, phase shift data, pressure data, differential pressure data, temperature data) from at least one of the microwave receiver(s) 308, the microwave reflection sensor 304, the Venturi meter 302, or the temperature sensor 224.

At block 1804, the machine learning controller 502 correlates the first portion of the input data with reference values of one or more parameters (e.g., unwrapped phase shift, intermediate outputs, flow rates). For example, the phase unwrapper neural network 602A correlates the reference wrapped phase shift data 518B with the reference unwrapped phase shift data 518A from the first portion of the input data. In some examples, the reference wrapped phase shift data can include the phase shift data from the microwave receiver(s) 308. In another example, the intermediate output neural network 602B correlates the reference wrapped phase shift data 518A and/or the sensor data with the reference intermediate outputs 518C from the first portion of the input data. In other examples, the flow rate neural network 602C correlates the reference intermediate outputs 518C with the reference flow rates 518D from the first portion of the input data.

At block 1806, utilizing the first portion of the input data and the correlated one or more parameters, the machine learning controller 502 generates a trained neural network (e.g., the trained phase unwrapper neural network 602A, the trained intermediate output neural network 602B, the trained flow rate neural network 602C) using machine learning techniques which are described in further detail in accordance with FIG. 6. In some examples, the one of the neural networks 602 distributes the trained neural network to the fluid parameter engine 604.

At block 1808, the machine learning controller 502 obtains a second portion of the input data from the model selector 506. For example, the model selector 506 sends the second portion of the input data to the validation data set distributor 608.

At block 1810, the machine learning controller 502 correlates the second portion of the input data with the reference values of the one or more parameters. For example, the phase unwrapper neural network 602A correlates the reference wrapped phase shift data 518B with the reference unwrapped phase shift data 518A from the second portion of the input data. In another example, the intermediate output neural network 602B correlates the reference unwrapped phase shift data 518A and/or the sensor data with the reference intermediate outputs 518C from the second portion of the input data. In other examples, the flow rate neural network 602C correlates the reference intermediate outputs 518C with the reference flow rates 518D from the second portion of the input data.

At block 1812, the machine learning controller 502 executes the trained neural network using the second portion of the input data to determined predicted values of the one or more parameters. For example, the fluid parameter engine 604 executes the trained phase unwrapper neural network 602A based on the reference wrapped phase shift data 518B from the second portion of the input data to determine predicted values of the unwrapped phase shift. In another example, the fluid parameter engine 604 executes the trained intermediate output neural network 602B based on the reference unwrapped phase shift data 518A and/or the sensor data from the second portion of the input data to determine predicted values of intermediate outputs. In other examples, the fluid parameter engine 604 executes the trained flow rate neural network 602C based on the reference intermediate outputs 518C from the second portion of the input data to determine predicted values of flow rates.

At block 1814, the machine learning controller 502 determines whether an error between the predicted values of the one or more parameters and the reference values of the one or more parameters from the second portion of the input data satisfy a threshold. For example, the fluid parameter engine validator 606 compares the predicted values of the unwrapped phase shift to the reference unwrapped phase shift 518A from the second portion of the input data to determine a quantity (e.g. an RMSE) of predictions that are correct. In other examples, the fluid parameter engine validator 606 compares the predicted values of the intermediate outputs to the reference intermediate outputs 518C from the second portion of the input data to determine the quantity of predictions that are correct. In some examples, the fluid parameter engine validator 606 compares the predicted values of the flow rates to the reference flow rates 518D from the second portion of the input data to determine the quantity of predictions that are correct. In response to the fluid parameter engine validator 606 determining that the quantity of predictions that are correct satisfies the threshold, the process proceeds to block 1816. Alternatively, in response to the fluid parameter engine validator 606 determining that the quantity of predictions that are correct does not satisfy the threshold, the process returns to block 1806.

At block 1816, the machine learning controller 502 distributes and stores the trained neural network. For example, the fluid parameter engine validator 606 distributes the trained phase unwrapper neural network 602A to the reference database 518 and/or the data processor 512 of FIG. 5 and stores the trained phase unwrapper neural network 602A in the local database 610. In another example, the fluid parameter engine validator 606 distributes the trained intermediate output neural network 602B to the reference database 518 and/or the intermediate output generator 508 of FIG. 5 and stores the trained intermediate output neural network 602B in the local database 610. In some examples, the fluid parameter engine validator 606 distributes the trained flow rate neural network 602C to the reference database 518 and/or the flow rate generator 510 of FIG. 5 and stores the trained flow rate neural network 602C in the local database 610. In response to the completion of block 1816, the example instructions 1800 end and the process returns to block 1708 of the example instructions 1700 of FIG. 17.

Figure 19:
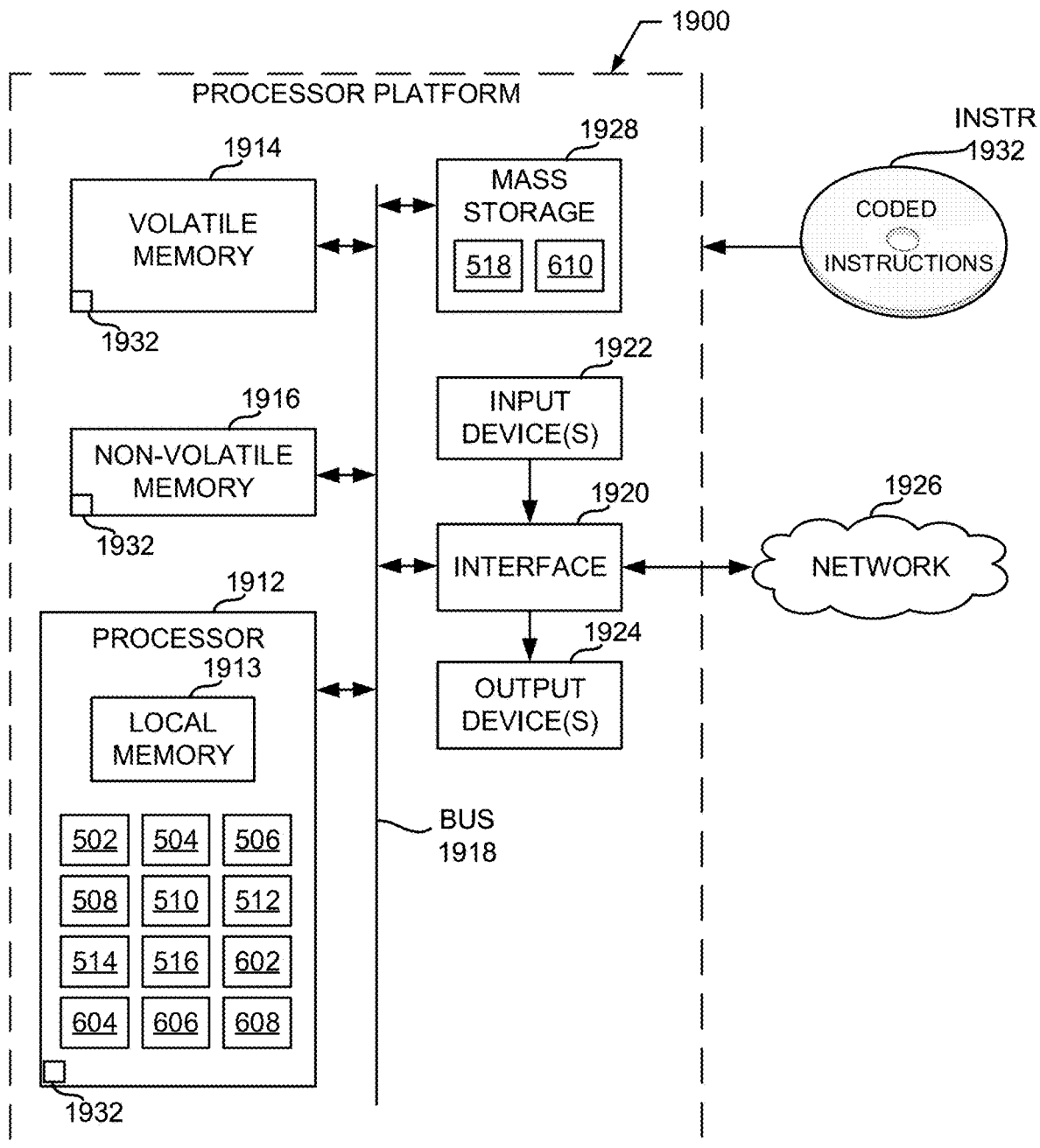
FIG. 19 is a block diagram of an example processor platform structured to execute the example machine readable instructions of FIGS. 16-18 to implement the example fluid parameter controller of FIG. 5, and/or, more generally, the example multiphase flowmeter of FIGS. 1, 2, 3A and/or 3B.

FIG. 19 is a block diagram of an example processor platform 1900 structured to execute the instructions of FIGS. 16, 17 and/or 18 to implement the fluid parameter controller 500 and/or the machine learning controller 502 of FIGS. 5 and/or 6. The processor platform 1900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1900 of the illustrated example includes a processor 1912. The processor 1912 of the illustrated example is hardware. For example, the processor 1912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1912 implements the machine learning controller 502, the physics model controller 504, the model selector 506, the intermediate output generator 508, the flow rate generator 510, the data processor 512, the velocity calculator 514, the frequency selector 516, the neural network model(s) 602, the fluid parameter engine 604, the fluid parameter engine validator 606, and the validation data set distributor 608.

The processor 1912 of the illustrated example includes a local memory 1913 (e.g., a cache). The processor 1912 of the illustrated example is in communication with a main memory including a volatile memory 1914 and a non-volatile memory 1916 via a bus 1918. The volatile memory 1914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1916 may be implemented by flash memory and/or any other desired type of memory device. Access to the main memory 1914, 1916 is controlled by a memory controller.

The processor platform 1900 of the illustrated example also includes an interface circuit 1920. The interface circuit 1920 may be implemented by any type of interface standard, such as an Ethernet interface, a universal serial bus (USB), a Bluetooth® interface, a near field communication (NFC) interface, and/or a PCI express interface.

In the illustrated example, one or more input devices 1922 are connected to the interface circuit 1920. The input device(s) 1922 permit(s) a user to enter data and/or commands into the processor 1912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1924 are also connected to the interface circuit 1920 of the illustrated example. The output devices 1924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1920 of the illustrated example, thus, typically includes a graphics driver card, a graphics driver chip and/or a graphics driver processor.

The interface circuit 1920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1900 of the illustrated example also includes one or more mass storage devices 1928 for storing software and/or data. Examples of such mass storage devices 1928 include floppy disk drives, hard drive disks, compact disk drives, Blu-ray disk drives, redundant array of independent disks (RAID) systems, and digital versatile disk (DVD) drives. In this example, the one or more mass storage devices 1928 implement the reference database 518 of FIG. 5 and/or the local database 610 of FIG. 6.

The machine executable instructions 1932 of FIGS. 16, 17 and/or 18 may be stored in the mass storage device 1928, in the volatile memory 1914, in the non-volatile memory 1916, and/or on a removable non-transitory computer readable storage medium such as a CD or DVD.

In the specification and appended claims: the terms "connect," "connection," "connected," "in connection with," and "connecting" are used to mean "in direct connection with" or "in connection with via one or more elements;" and the term "set" is used to mean "one element" or "more than one element." Further, the terms "couple," "coupling," "coupled," "coupled together," and "coupled with" are used to mean "directly coupled together" or "coupled together via one or more elements." As used herein, the terms "up" and "down," "upper" and "lower," "upwardly" and "downwardly," "upstream" and "downstream;" "above" and "below;" and other like terms indicating relative positions above or below a given point or element are used in this description to more clearly describe some embodiments of the disclosure.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

The following claims are hereby incorporated into this Detailed Description by this reference, with each claim standing on its own as a separate embodiment of the present disclosure.

The invention claimed is:

1. A multiphase flowmeter to determine flow parameters of a fluid, the multiphase flowmeter comprising:
   a microwave transmitter to transmit a signal through a fluid;
   a microwave receiver to, in response to receiving the signal, determine at least one of attenuation data or phase shift data based on the signal;
   a sensor to obtain at least one of pressure data, temperature data, or differential pressure data associated with the fluid;
   an intermediate-output generator to determine intermediate flow parameters based on at least one of the attenuation data, the phase shift data, the pressure data, the temperature data, or the differential pressure data, the intermediate flow parameters including at least one of a water liquid ratio, a gas volume fraction, a gas holdup, a permittivity, a conductivity, a viscosity, a salinity, or a density associated with the fluid;

a flow rate generator to determine a flow rate for respective phases in the fluid based on at least one of the attenuation data, the phase shift data, the pressure data, the temperature data, the differential pressure data, or the intermediate flow parameters; and a model selector to select at least one of a physics model or a machine learning model for determining at least one of the intermediate flow parameters or at least one of the flow rates of the respective phases, the model selector to:

invoke the physics model to determine a first value of at least one of intermediate flow parameters or at least one of the flow rates of the respective phases; and in response to an error corresponding to the first value not being less than a threshold, invoke the machine learning model to determine a second value of the intermediate flow parameters or the flow rates of the respective phases.

2. The multiphase flowmeter of claim 1, wherein the threshold is a first threshold, and further including a frequency selector for selecting the frequency of the signal transmitted between the microwave transmitter and the microwave receiver, the frequency selector to:

compare unwrapped phase shift data to a second threshold;

determine whether the fluid is water-continuous or oil-continuous based on whether the unwrapped phase shift data satisfies the second threshold;

in response to determining that the fluid is water-continuous, select one or more first frequencies of the signal; and in response to determining that the fluid is oil-continuous, select one or more second frequencies of the signal, the one or more second frequencies greater than the one or more first frequencies, the signal to be generated based on the one or more first frequencies or the one or more second frequencies.

3. The multiphase flowmeter of claim 2, wherein:

the microwave transmitter is coupled to a pipe at a first position of a first cross-section of the pipe, the pipe including the fluid, the fluid to flow through the pipe; and the microwave receiver is coupled to the pipe at a second position at the first cross-section of the pipe.

4. The multiphase flowmeter of claim 3, wherein the microwave receiver is a first microwave receiver, and further including one or more second microwave receivers coupled to the pipe at the first cross-section at respective distances away from the microwave transmitter, the one or more second microwave receivers to measure second attenuation data and second phase shift data.

5. The multiphase flowmeter of claim 4, wherein the microwave transmitter is a first microwave transmitter, and further including:

a second microwave transmitter coupled to the pipe at a first position of a second cross-section of the pipe; and one or more third microwave receivers coupled to the pipe at respective second positions of the second cross-section of the pipe, the second positions at respective distances away from the second microwave transmitter, the one or more third microwave receivers to measure third attenuation data and third phase shift data.

6. The multiphase flowmeter of claim 5, further including a microwave reflection sensor coupled to the pipe at a third cross-section downstream or upstream from the first cross-section and the second cross-section, the microwave reflection sensor to measure fourth attenuation data and fourth phase shift data based on the fluid proximate a wall of the pipe, the intermediate-output generator to determine at least one of the permittivity, the conductivity of the fluid proximate the wall of the pipe, the salinity, or the water liquid ratio associated with the fluid flowing through the pipe based on the fourth attenuation data and the fourth phase shift data.

7. The multiphase flowmeter of claim 6, wherein the sensor is a Venturi meter coupled to the pipe upstream relative to the microwave transmitter and the microwave receiver, the Venturi meter coupled to the pipe between a fourth cross-section of the pipe and a fifth cross-section of the pipe downstream from the fourth cross-section, a diameter of the fourth cross-section larger than a diameter of the fifth cross-section, the diameter of the fifth cross-section equal to the diameter of the first cross-section and the second cross-section, and the Venturi meter to measure at least one of the differential pressure between the fourth cross-section and the fifth cross-section.

8. The multiphase flowmeter of claim 5, further including a velocity calculator to calculate a velocity of the fluid flowing through the pipe based on cross correlation of combined attenuation data or combined unwrapped phase shift data, the combined attenuation data or the combined unwrapped phase shift data to include at least one of the attenuation data and the phase shift data from the first microwave receiver, the second attenuation data and the second phase shift data from the one or more second microwave receivers, or the third attenuation data and the third phase shift data from the one or more third microwave receivers.

9. The multiphase flowmeter of claim 8, wherein the machine learning model is a neural network, and further including a machine learning controller to:

train the neural network using a first portion of an input feature dataset by adjusting weights associated with the neural network to produce an output pattern, the output pattern to mathematically correlate the input data from the first portion of the input feature dataset to respective reference output intermediate flow parameters from the first portion of the input feature dataset, the input data to include at least one of the combined attenuation data, the combined unwrapped phase shift data, the temperature data, the pressure data, the differential pressure data, the permittivity, the conductivity, the viscosity, or the density, the output intermediate flow parameters to include at least one of the water liquid ratio, the gas volume fraction, the gas holdup, or the salinity; and validate the neural network based on the input data from a second portion of the input feature dataset as inputs to the trained neural network, the validating including:

predicting the output intermediate flow parameters using the trained neural network;

calculating an error between predicted output intermediate flow parameters and the reference intermediate flow parameters from the second portion of the input feature dataset; and accepting the trained neural network in response to the error being less than a third threshold.

10. The multiphase flowmeter of claim 9, wherein the fluid is from a first fluid flow, and wherein the input feature dataset includes data from at least one of the physics model, a second multiphase flowmeter coupled to a second fluid flow that is substantially same in phase mass flow rate as the first fluid, or a gamma ray multiphase flowmeter coupled to the first fluid flow or the second fluid flow, the gamma ray multiphase flowmeter including a gamma ray sensor.

11. The multiphase flowmeter of claim 5, wherein the machine learning model is a neural network, and further including a data processor to:
    unwrap baseline phase shift data, the baseline phase shift data based on a second signal received by a near receiver, the second signal having a lower of the one or more first frequencies, the near receiver being one of the first microwave receiver or one of the one or more second microwave receivers at a smallest distance from the first microwave transmitter;
    further unwrap, based on the unwrapped baseline phase shift data, water-continuous fluid phase shift data, the water-continuous fluid phase shift data based on a third signal received by a far receiver, the third signal having a higher of the one or more first frequencies, the far receiver being a second one of the first microwave receiver or one of the one or more second microwave receivers at a far-distance from the first microwave transmitter larger than the smallest distance, unwrapped water-continuous fluid phase shift data greater than the unwrapped baseline phase shift data; and
    train the neural network using a first portion of an input feature dataset by adjusting weights associated with the neural network to produce an output pattern, the output pattern to mathematically correlate reference wrapped phase shift data from the first portion of the input feature dataset to respective reference unwrapped phase shift data from the first portion of the input feature dataset, the reference wrapped phase shift data to include at least one of the baseline phase shift data or the water-continuous fluid phase shift data, the reference unwrapped phase shift data to include at least one of the unwrapped baseline phase shift data or the unwrapped water-continuous fluid phase shift data; and
    validate the neural network based on a second portion of the input feature dataset as inputs to the trained neural network, the validating including:
        predicting unwrapped phase shift data using the trained neural network;
        calculating an error between predicted unwrapped phase shift data and the reference unwrapped phase shift data from the second portion of the reference dataset; and
        accepting the trained neural network in response to the error being less than a third threshold.

12. The multiphase flowmeter of claim 1, wherein the threshold is a first threshold, the machine learning model is a neural network, and further including a machine learning controller to:
    train the neural network using a first portion of an input feature dataset by adjusting weights associated with the neural network to produce an output pattern, the output pattern to mathematically correlate reference intermediate flow parameters to respective reference flow rates of the first portion of the input feature dataset; and
    validate the neural network based on reference intermediate flow parameters from a second portion of the input feature dataset as inputs to the trained neural network, the validating including:
        predicting flow rates using the trained neural network;
        calculating an error between predicted flow rates and the reference flow rates of the second portion of the input feature dataset; and
        accepting the trained neural network in response to the error being less than a second threshold.

13. A method to determine fluid flow parameters from a multiphase flow, the method comprising:
    transmitting a signal through a fluid flow using a microwave transmitter;
    in response to receiving the signal at a microwave receiver, determining at least one of attenuation data or phase shift data based on the signal;
    obtaining at least one of pressure data, temperature data, or differential pressure data associated with the fluid;
    determining intermediate flow parameters based on at least one of the attenuation data, the phase shift data, the pressure data, the temperature data, or the differential pressure data, the intermediate flow parameters including at least one of a water liquid ratio, a gas volume fraction, a gas holdup, a permittivity, a conductivity, a viscosity, a salinity, or a density associated with the fluid;
    determining a flow rate for respective phases in the fluid based on at least one of the attenuation data, the phase shift data, the pressure data, the temperature data, the differential pressure data, or the intermediate flow parameters; and
    selecting at least one of a physics model or a machine learning model for determining at least one of the intermediate flow parameters or at least one of the flow rates of the respective phases by:
        invoking the physics model to determine a first value of at least one of the intermediate flow parameters or at least one of the flow rates of the respective phases; and
        in response to the first value not satisfying an error being less than a threshold, invoking the
            machine learning model to determine a second value of the intermediate flow parameters or the flow rates of the respective phases.

14. The method of claim 13, wherein the threshold is a first threshold, and further including:
    unwrapping the phase shift data;
    comparing the unwrapped phase shift data to a second threshold;
    determining whether the fluid is water-continuous or oil-continuous based on whether the phase shift data satisfies the second threshold;
    in response to determining that the fluid is water-continuous, select one or more first frequencies of the signal; and
    in response to determining that the fluid is oil-continuous, select one or more second frequencies of the signal, the second one or more frequencies greater than the first one or more frequencies, the signal to be generated based on the one or more first frequencies or the one or more second frequencies.

15. The method of claim 14, wherein the microwave transmitter is coupled to a pipe at a first position at a first cross-section of a pipe, the pipe including the fluid, the fluid to flow through the pipe, and the microwave receiver is coupled to a second position at the first cross-section of the pipe.

16. The method of claim 13, wherein the machine learning model is a neural network, and further including:
    training the neural network using a first portion of an input feature dataset by adjusting weights associated with the neural network to produce an output pattern, the output pattern to correlate reference intermediate flow parameters to respective reference flow rates of the first portion of the input feature dataset; and validating the neural network based on reference intermediate flow parameters from a second portion of the input feature dataset as inputs to the trained neural network, the validating including:
predicting flow rates using the trained neural network;
calculating an error between predicted flow rates and the reference flow rates of the second portion of the input feature dataset; and
accepting the trained neural network in response to the error being less than a third threshold.

17. A non-transitory computer readable storage medium for determining fluid flow parameters comprising instructions that, when executed, cause a machine to at least:
transmit a signal through a fluid flow using a microwave transmitter;
in response to receiving the signal at a microwave receiver, determine at least one of attenuation data or phase shift data based on the signal;
obtain at least one of pressure data, temperature data, or differential pressure data associated with the fluid;
determine intermediate flow parameters based on at least one of the attenuation data, the phase shift data, the pressure data, the temperature data, or the differential pressure data, the intermediate flow parameters including at least one of a water liquid ratio, a gas volume fraction, a gas holdup, a permittivity, a conductivity, a viscosity, a salinity, or a density associated with the fluid;
determine a flow rate for respective phases in the fluid based on at least one of the attenuation data, the phase shift data, the pressure data, the temperature data, the differential pressure data, or the intermediate flow parameters; and
select at least one of a physics model or a machine learning model for determining at least one of the intermediate flow parameters or at least one of the flow rates of the respective phases by:
invoking the physics model to determine a first value of at least one of the intermediate flow parameters or at least one of the flow rates of the respective phases; and
in response to the first value not satisfying an error being less than
a threshold, invoking the
machine learning model to determine a second value of the intermediate flow parameters or the flow rates of the respective phases.

18. The non-transitory computer readable storage medium of claim 17, wherein the threshold is a first threshold, and the instructions, when executed, cause the machine to:
unwrap the phase shift data;
compare the unwrapped phase shift data to a second threshold;
determine whether the fluid is water-continuous or oil-continuous based on whether the phase shift data satisfies the second threshold;
in response to determining that the fluid is water-continuous, select one or more a first frequency of the signal; and
in response to determining that the fluid is oil-continuous, select one or more a second frequency of the signal, the second frequency greater than the first frequency, the signal to be generated based on the first frequency or the second frequency.

19. The non-transitory computer readable storage medium of claim 17, wherein the microwave transmitter is coupled to a pipe at a first position at a first cross-section of a pipe, the pipe including the fluid, the fluid to flow through the pipe, the microwave receiver is coupled to a second position at the first cross-section of the pipe, and the instructions, when executed, cause the machine to determine at least one of attenuation data or phase shift data based on the signal received at the microwave receiver.

20. The non-transitory computer readable storage medium of claim 17, wherein the threshold is a first threshold, the machine learning model is a neural network model, and the instructions, when executed, cause the machine to:
train the neural network using a first portion of an input feature dataset by adjusting weights associated with the neural network to produce an output pattern, the output pattern to correlate reference intermediate flow parameters to respective reference flow rates of the first portion of the input feature dataset; and
validate the neural network based on reference intermediate flow parameters from a second portion of the input feature dataset as inputs to the trained neural network, including causing the machine to:
predict flow rates using the trained neural network;
calculate an error between predicted flow rates and the reference flow rates of the second portion of the input feature dataset; and
accept the trained neural network in response to the error being less than a second threshold.

* * * * *